US012766468B2

(12) United States Patent
Cevik

(10) Patent No.: US 12,766,468 B2
(45) Date of Patent: Oct. 20, 2026

(54) MULTI-FUNCTIONAL MOLYBDENUM-IRON NANOSHEETS AND NANOCOMPOSITES THEREOF

(71) Applicant: Imam Abdulrahman Bin Faisal University, Dammam (SA)

(72) Inventor: Emre Cevik, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 392 days.

Patent file contains an affidavit/declaration under 37 CFR 1.130(b).

(21) Appl. No.: 18/424,168

(22) Filed: Jan. 26, 2024

(65) Prior Publication Data

US 2025/0242312 A1 Jul. 31, 2025

(51) Int. Cl.
*B01D 69/14* (2006.01)
*B01D 61/14* (2006.01)
(Continued)

(52) U.S. Cl.
CPC ...... *B01D 69/14111* (2022.08); *B01D 61/147* (2013.01); *B01D 67/0079* (2013.01);
(Continued)

(58) Field of Classification Search
CPC .............. B01D 69/14111; B01D 69/02; B01D 71/0223; B01D 71/34; B01D 61/147;
(Continued)

(56) References Cited

U.S. PATENT DOCUMENTS 9,466,831 B2 10/2016 Long et al.

FOREIGN PATENT DOCUMENTS

CN 106423182 B 5/2019
CN 111715233 A 9/2020

OTHER PUBLICATIONS

Iqbal, Arfa et al. "Tailored Multifunctional Molybdenum-Iron Nanosheets for Enhanced Membrane Filtration and Excellent Electrocatalytic Performance for Hydrogen Evolution Reaction." Journal of cleaner production 421: n. pag. Web. (Year: 2023).*

(Continued)

*Primary Examiner* — Ekandra S. Miller-Cruz
*Assistant Examiner* — Mahmoud Motaz Abdel Latif
(74) *Attorney, Agent, or Firm* — Oblon, McClelland, Maier & Neustadt, L.L.P.

(57) ABSTRACT

The present disclosure is directed to a molybdenum iron composition that includes 55 to 60 weight percent $MoFe_2$, 33 to 37 weight percent $Mo_{5.08}Fe_{7.92}$, and 5 to 10 weight percent $MoO_3$ based on the total weight of the composition. The composition is in the form of nanosheets. A nanocomposite membrane including the molybdenum iron composition is also provided. The nanocomposite membrane includes 0.01 to 0.5% molybdenum iron composition by weight uniformly distributed in a polyvinylidene fluoride polymeric matrix based on a total weight of the nanocomposite membrane. The nanocomposite membrane of the present disclosure finds application in filtration of a contaminated feed mixture and for generating hydrogen.

20 Claims, 43 Drawing Sheets

(51) Int. Cl.

| | |
|---|---|
| ***B01D 67/00*** | (2006.01) |
| ***B01D 69/02*** | (2006.01) |
| ***B01D 71/02*** | (2006.01) |
| ***B01D 71/34*** | (2006.01) |
| ***C01G 39/00*** | (2006.01) |
| ***C02F 1/44*** | (2023.01) |
| ***C02F 101/22*** | (2006.01) |
| ***C02F 101/30*** | (2006.01) |
| ***C25B 1/04*** | (2021.01) |
| ***C25B 11/091*** | (2021.01) |

(52) U.S. Cl.
CPC ........... *B01D 69/02* (2013.01); *B01D 71/022* (2013.01); *B01D 71/0223* (2022.08); *B01D 71/34* (2013.01); *C01G 39/00* (2013.01); *C02F 1/444* (2013.01); *C25B 1/04* (2013.01); *C25B 11/091* (2021.01); *B01D 2325/02* (2013.01); *B01D 2325/02833* (2022.08); *B01D 2325/02834* (2022.08); *C02F 2101/22* (2013.01); *C02F 2101/308* (2013.01)

(58) Field of Classification Search
CPC .............. B01D 67/0079; B01D 71/022; B01D 2325/02834; B01D 2325/02833; B01D 2325/02; C01G 39/00; C25B 1/04; C25B 11/091; C02F 1/444; C02F 2101/22; C02F 2101/308
See application file for complete search history.

(56) References Cited

OTHER PUBLICATIONS

Gustavsson et al. ; In-situ activated hydrogen evolution by molybdate addition to neutral and alkaline electrolytes ; J. Electrochem. Sci. Eng. 2(3) ; Aug. 30, 2012 ; 16 Pages.
Yao et al. ; Nonprecious bimetallic (Mo, Fe)—N/C nanostructures loaded on PVDF membrane for toxic CrIV reduction from water ; Journal of Hazardous Materials, vol. 389 ; May 5, 2020 ; 7 Pages.
Chen et al. ; High-performance bifunctional Fe-doped molybdenum oxide-based electrocatalysts with in situ grown epitaxial heterojunctions for overall water splitting ; International Journal of Hydrogen Energy, vol. 45, Issue 46 ; Sep. 21, 2020 ; 7 Pages.

* cited by examiner

| Element | Weight (%) |
|---|---|
| C | 55.99 |
| F | 35.98 |
| Cl | 0.77 |
| S | 2.36 |
| N | 4.89 |

| Element | Weight (%) |
|---|---|
| C | 49.91 |
| F | 34.18 |
| Cl | 0.30 |
| Na | 1.05 |
| S | 2.72 |
| N | 3.80 |

MULTI-FUNCTIONAL MOLYBDENUM-IRON NANOSHEETS AND NANOCOMPOSITES THEREOF

STATEMENT REGARDING PRIOR DISCLOSURE BY THE INVENTION

Aspects of the present disclosure are described in Cevik, E. et al., "Tailored multifunctional molybdenum-iron nanosheets for enhanced membrane filtration and excellent electrocatalytic performance for hydrogen evolution reaction" published in Volume 421, Journal of Cleaner Production, which is incorporated herein by reference in its entirety.

STATEMENT OF ACKNOWLEDGEMENT

Support provided by the Deputyship for Research & Innovation, Ministry of Education in Saudi Arabia is gratefully acknowledged.

BACKGROUND

Technical Field

The present disclosure relates to molybdenum-iron (MoFe) nanosheets, and more particularly, relates to molybdenum-iron (MoFe) nanosheets and nanocomposites used for the treatment of liquids by membrane filtration and for generating hydrogen.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Water pollution is becoming a major concern due to increasing industrialization and urbanization. Water released from various industries and construction sites contains pollutants like toxic metals, organic and inorganic matter, sediments, and textile effluent dyes, which pose serious health hazards to humans and the ecosystem. Various water treatment methods are being implemented to purify water and make it reusable for utilization by living beings and as protection against the harmful effects of untreated water. Conventional water treatment methods, like coagulation, advanced oxidation, adsorption, and membrane filtration, generate huge sludge volumes, may cause serious health problems, and are not cost-effective.

Demand for increased energy production is becoming another global issue as 80% of the world's energy demands are met by the use of fossil fuels, which not only have limited availability but also lead to emissions of harmful substances. Such emissions are known to cause serious impacts on the environment, including global warming and climate change. Hydrogen may be relied upon as an energy carrier, having almost zero greenhouse gas emissions. Hydrogen can be produced from renewable sources of energy and resources, one of them being water. Electrochemical water splitting has emerged as a promising approach for the hydrogen evolution reaction (HER) to produce clean energy. The role of nanocatalysts in hydrogen evolution reactions is being explored. Various noble metals such as platinum, palladium, iridium, and ruthenium have been used as catalysts in different industries; however, owing to their limited availability and high costs, such metals cannot be used for large-scale applications.

To overcome such issues, various nanomaterials are being investigated for their efficiency and usability. For example, tungsten oxide nanoparticles have been shown as an effective adsorbent that can be used for the degradation of Rhodamine-B dye with high HER activity [M. Rahman, T. Sarmah, P. Dihingia, R. Verma, S. Sharma, Kirti, D. N. Srivastava, L. M. Pandey, M. Kakati, Bulk synthesis of tungsten-oxide nanomaterials by a novel, plasma chemical reactor configuration, studies on their performance for waste-water treatment and hydrogen evolution reactions, *Chemical Engineering Journal.* 428 (2022) 131111]. $FeS_2$, CuS, and $NiS_2$ nanoparticles have been used for hydrogen production as well as indigo carmine dye removal. Such metal sulfides have been reported to show 88% dye removal with hydrogen evolution [A. M. Huerta-Flores, L. M. Torres-Martínez, E. Moctezuma, A. P. Singh, B. Wickman, Green synthesis of earth-abundant metal sulfides ($FeS_2$, CuS, and $NiS_2$) and their use as visible-light active photocatalysts for $H_2$ generation and dye removal, *J Mater Sci: Mater Electron.* 29 (2018) 11613-11626]. Fabrication of nanocomposite membranes increases hydrogen evolution, and such membranes could be a potential alternative for noble metal-based flexible electrocatalysts towards large-scale hydrogen production from water splitting [X. Zheng, Y. Xiao, X. Miao, Y. Wang, Y. Chen, T. Hu, X. Gong, C. Wu, G. Wang, H. Liu, Structure tailorable and flexible electrospun Poly(vinylidene fluoride) @WS2 membrane with enhanced hydrogen evolution reaction activity and mechanical properties, *Polymer Testing.* 113 (2022) 107668]. Molybdenum carbide and $Ni^0$ nanoparticles embedded into nitrogen-doped carbon materials ($Mo_xNi_y$@N—C) through one-step thermal treatment, which was then loaded on a PVDF film to obtain the catalytic membranes ($Mo_xNi_y$@N—C/PVDF). The $Mo_xNi_y$@N—C/PVDF membranes showed catalytic efficiency in chromium removal and hydrogen generation [Y. Yao, Y. Hu, M. Yu, C. Lian, M. Gao, J. Zhang, G. Li, S. Wang, Nitrogen-doped carbon encapsulating molybdenum carbide and nickel nanostructures loaded with PVDF membrane for hexavalent chromium reduction, *Chemical Engineering Journal.* 344 (2018) 535-544].

Although nanomaterials have been developed in the past, there still exists a need to develop nanomaterials that are available in abundance and are cost-effective. Accordingly, an objective of the present disclosure is to provide improved nanomaterials such as, for example, molybdenum-iron (MoFe) nanosheets and nanocomposites. MoFe nanosheets and nanocomposites have advantageous physicochemical properties and are efficient in the purification of liquids, especially water, and hydrogen generation.

SUMMARY

In an exemplary embodiment, a molybdenum iron composition is disclosed. The molybdenum iron composition includes 55 to 60 weight percent $MoFe_2$, 33 to 37 weight percent $Mo_{5.08}Fe_{7.92}$, and 5 to 10 weight percent $MoO_3$ based on a total weight of the composition. The composition is in the form of nanosheets.

In some embodiments, a nanocomposite membrane is provided. The nanocomposite membrane includes molybdenum iron composition in an amount of 0.01 to 0.5 percent by weight based on a total weight of the nanocomposite membrane. The molybdenum iron particles in the nanocomposite membrane are uniformly distributed in a polyvinylidene fluoride polymeric matrix.

In some embodiments, the nanosheets are formed of a plurality of overlaying layers with exposed ridges between layers. The overlapping layers have particles with a size of 0.1 to 3.0 μm on the surface.

In some embodiments, the nanocomposite membrane has a membrane porosity of 70 to 85 percent based on a ratio of a volume of pores to a total volume of the membrane.

In some embodiments, the nanocomposite membrane has an average pore size diameter of 0.1 to 2.0 μm and a water contact angle of 75 to 100°.

In an exemplary embodiment, a method of filtration of water is disclosed. The method comprises contacting the nanocomposite membrane with a contaminated feed mixture wherein the contaminated feed mixture comprises at least water and one or more pollutants. The method further includes collecting a permeate passing through the membrane to obtain a purified composition having a reduced amount of the pollutants.

In one embodiment, the membrane has a flux rate of 140 to 300 L $m^{-2}$ $h^{-1}$.

In some embodiments, the membrane has a removal efficiency of total organic carbon of 50 to 85% by weight based on an initial weight of the pollutants.

In some embodiments, the membrane has a flux recovery ratio of 85 to 99%.

In some embodiments, one or more pollutants are selected from the group consisting of methylene blue, malachite green, eriochrome black T, and a combination thereof. The membrane has a removal efficiency of 80 to 100% by weight based on an initial weight of the pollutants.

In some embodiments, the one or more pollutants is selected from the group consisting of one or more barium salts, one or more aluminum salts, one or more nickel salts, one or more copper salts, one or more chromium salts, one or more cadmium salts, one or more lead salts, one or more potassium salts, one or more zinc salts, one or more magnesium salts, one or more calcium salts, one or more sodium salts, one or more silicates, one or more acids, and a combination thereof.

In some embodiments, the membrane has a removal efficiency of total dissolved solids of 40 to 70% by weight based on an initial weight of the pollutants.

In some embodiments, the membrane has a removal efficiency of turbidity of 95 to 100% by weight based on an initial weight of the pollutants.

In some embodiments, the membrane has a removal efficiency of one or more chromium salts, one or more cadmium salts, and one or more lead salts of 80 to 100% by weight based on an initial weight of the one or more chromium salts, the one or more cadmium salts, and the one or more lead salts.

In another exemplary embodiment, a method of hydrogen evolution is disclosed. The method comprises contacting an electrochemically active surface comprising the molybdenum iron composition with a solution comprising at least water and an electrolyte and applying a potential to the electrochemically active surface to generate a hydrogen gas. In some embodiments, the electrochemically active surface area has a double-layer capacitance of 8 to 12 mF $cm^{-2}$. In some embodiments, the electrochemically active surface area has a Tafel plot slope of 110 to 130 mV $dec^{-1}$.

These and other aspects of non-limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of the present disclosure (including alternatives and/or variations thereof) and many of the attendant advantages thereof will be readily obtained as the same becomes better understood by reference to the following detailed description of the embodiments when considered in connection with the accompanying drawings, wherein.

DETAILED DESCRIPTION

Figure 1A:
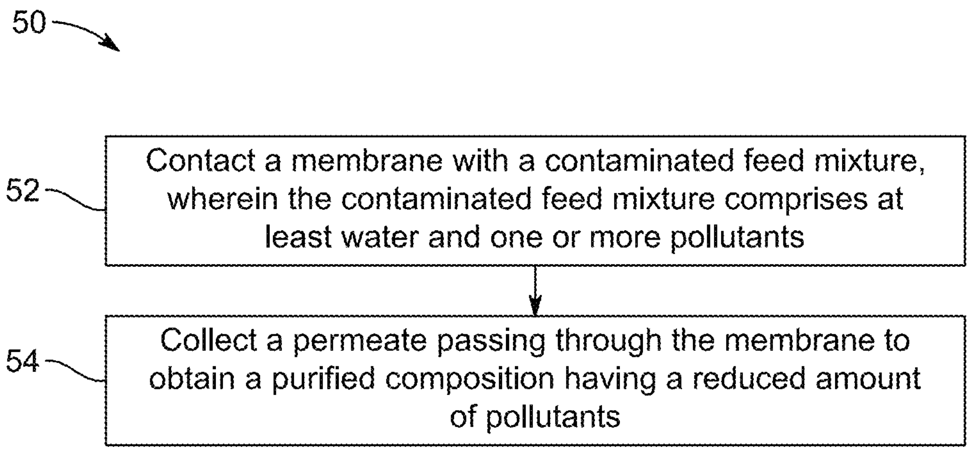
FIG. 1A is a flowchart depicting a method of filtration of a contaminated feed mixture, according to certain embodiments.

In the following description, it is understood that other embodiments may be utilized, and structural and operational changes may be made without departure from the scope of the present embodiments disclosed herein.

Reference will now be made in detail to specific embodiment or features, examples of which are illustrated in the accompanying drawings. Whenever possible, corresponding or similar reference numbers will be used throughout the drawings to refer to the same or corresponding parts. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, "compound" refers to a chemical entity or substance comprised of two or more different types of atoms. A compound may exist as a solid, liquid, or gas. A compound may be in a crude mixture or isolated and purified.

As used herein, "composition" refers to an arrangement, type, and/or ratio of atoms in molecules of chemical substances. A composition may specify the identity, arrangement, and ratio of chemical elements comprising a compound by way of chemical and atomic bonds.

A "nanosheet," as used herein, refers to a two-dimensional nanostructure with a thickness of 1 to 100 nm.

As used herein, the term "membrane" refers to a porous structure that is capable of separating components of a homogeneous or heterogeneous fluid. A membrane may be a layer of varying thickness of semi-permeable material that may be used for solute separation as a transmembrane pressure is applied across the membrane. A degree of selectivity may be based on membrane composition, charge, and porosity. Membranes may have symmetric or asymmetric pores, wherein a membrane with asymmetric pores have variable pore diameters. Membranes may be used for microfiltration, ultrafiltration, nanofiltration, and reverse osmosis process. In particular, "pores" in the context of the present disclosure indicate voids allowing fluid communication between different sides of the material. Pores may have a varying pore size, pore size distribution, and pore morphology, such as pore shape and surface roughness. The pores may be made up of a network of interconnected channels. More particular in use when a homogeneous or heterogeneous fluid is passed through the membrane, some components of the fluid may pass through the pores of the membrane into a "permeate stream," while some components of the fluid can be retained by the membrane and can thus accumulate in a "retentate," and/or some components of the fluid can be rejected by the membrane into a "rejection stream." The homogeneous or heterogeneous fluid that enters the membrane may be referred to herein as a "feed stream" or a "feed." Membranes can be of various thicknesses with homogeneous or heterogeneous structures. Membranes can be in the form of flat sheets or bundles of hollow fibers. Membranes can also be in various configurations including, but not limited to, spiral wound, tubular, hollow fiber, and other configurations identifiable to a skilled person upon a reading of the present disclosure. Membranes may also be classified according to their pore diameter. Membranes can be neutral or charged, and particle transport can be active or passive. The latter can be facilitated by pressure, concentration, and chemical or electrical gradients of the membrane process.

As used herein, "particle size" and "pore size" may be considered the lengths or longest dimensions of a particle and a pore opening, respectively.

As used herein, the term "membrane porosity" refers to the void volume fraction of a membrane and can be calculated by dividing the volume of the pores by the total volume of the membrane.

As used herein, the term "filtration" refers to the mechanical or physical operation or process which can be used for separating components of homogeneous or heterogeneous solutions. Filtration may use a filter medium to separate components of homogeneous and heterogenous solutions. The filter medium may be a physical separator, such as a membrane, a chemical separator or gradient, an electrical separator or gradient, and any separator or gradient known in the art for separating solutions. Filtration may be used to separate solids from liquids, solids from gases, and/or liquids from other liquids. Filtration may be gravity-driven, pressure-driven, and/or vacuum-driven.

As used herein, the term "water contact angle" is used to evaluate the hydrophobic or hydrophilic nature of a surface. A surface having a water contact angle of less than 90° is considered hydrophilic, and a surface having a water contact angle of more than 90° is considered hydrophobic.

As used herein, the term "flux rate" refers to the rate of flow of a substance per unit area in a defined period of time. Flux rate may refer to the removal of a soluble material from a liquid per unit area per time.

As used herein, the term "electrode" refers to an electrical conductor that contacts a non-metallic part of a circuit, e.g., a semiconductor, an electrolyte, a vacuum, or air.

As used herein, "working electrode" refers to the electrode in an electrochemical cell/device/sensor/system on which the electrochemical reaction of interest is occurring.

As used herein, "counter-electrode" is an electrode used in an electrochemical cell for voltammetric analysis or other reactions in which an electric current is expected to flow. The counter electrode completes the circuit and allows charge to flow.

As used herein, the term "electrolyte" is a substance that forms a medium that can conduct electricity when dissolved in a polar solvent as a result of a dissociation into positively and negatively charged ions.

As used herein, the term "Tafel slope" refers to the relationship between the overpotential and the logarithmic current density. The Tafel slope may be used to determine electrochemical kinetics of a reaction.

As used herein, the term "overpotential" refers to the difference in potential between a thermodynamically determined reduction potential of a half-reaction and the potential at which the redox event is experimentally observed. The term is directly associated with a cell's voltage efficacy. In an electrolytic cell, overpotential implies that the cell needs more energy than thermodynamically expected to drive a reaction. The quantity of overpotential is specific to each cell design and varies across cells and operational conditions, even for the same reaction. Overpotential is experimentally measured by determining the potential at which a given current density is reached.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

As used herein, the term "water splitting" refers to the chemical reaction in which water is broken down into oxygen and hydrogen, as described in the following reaction:

$$2H_2O \rightarrow 2H_2 + O_2$$

The present disclosure is intended to include all hydration states of a given compound or formula, unless otherwise noted or when heating a material.

Unless otherwise noted, the present disclosure is intended to include all isotopes of a given compound or formula.

Aspects of the present disclosure are directed to a nanocomposite membrane, including a molybdenum iron composition, for the purification of liquids, especially water and hydrogen generation. Molybdenum iron nanosheets were prepared and were used for preparing nanocomposite membranes having varying proportions of molybdenum iron (MoFe) nanosheets and polyvinylidene fluoride (PVDF), namely neat PVDF, PVDF/MoFe (0.1%), PVDF/MoFe (0.2%) and PVDF/MoFe (0.3%) and were given membrane codes of M-0, M-0.1, M-0.2, and M-0.3, respectively.

The prepared membranes were investigated for their performance in water filtration through a laboratory-scale crossflow filtration assembly, and the hydrogen evolution reaction was studied through a three-electrode system. Membrane studies depicted rejection efficiency of water contaminants against M-0.2 membrane (with 0.2% MoFe content). A rejection of 94%-99% for dyes (methylene blue, malachite green, and eriochrome black T) with flux rates between 260 $L/m^2$ h-288 $L/m^2$ h was achieved for the M-0.2 membrane. The M-0.2 membrane showed a 63.4%, 81.3%, and 98.7% removal for total dissolved solids (TDS), total organic carbon (TOC), and turbidity, respectively, and toxic metals exhibited 100% removal with a maximum flux rate of around 260 $L/m^2$ h. In addition, a multi-cycle filtration run for the M-0.2 membrane revealed stability in rejection ability and flux rates for all water pollutants. Hydrogen evolution studies (HER) studies exhibited stability of MoFe-based catalysts during electrochemical activity and showed enhanced hydrogen generation.

Disclosed herein is a molybdenum iron composition. The composition is in the form of nanosheets. The nanosheets may be in the form of overlapping layers. The molybdenum iron composition includes 55-60 wt. % $MoFe_2$, preferably 56-59 wt. % $MoFe_2$, preferably 57-58 wt. % $MoFe_2$, and more preferably about 57 wt. % $MoFe_2$ based on the total weight of the composition. The molybdenum iron composition includes 33-37 wt. % $Mo_{05.08}Fe_{7.92}$, preferably 34-36 wt. % $Mo_{5.08}Fe_{7.92}$, preferably 35-36 wt. % $Mo_{5.08}Fe_{7.92}$, and more preferably about 35 wt. % $Mo_{5.08}$ $Fe_{7.92}$ based on the total weight of the composition. The molybdenum iron composition includes 5-10 wt. % $MoO_3$, preferably 6-9 wt. % $MoO_3$, preferably 7-8 wt. % $MoO_3$, and more preferably about 7 wt. % $MoO_3$ based on the total weight of the composition. In some embodiments, the molybdenum iron composition includes 57 wt. % $MoFe_2$, 35 wt. % $Mo_{5.08}$ $Fe_{7.92}$, and 7 wt. % $MoO_3$ based on the total weight of the composition.

The molybdenum iron composition is dispersed on and/or in a polymeric matrix to form a nanocomposite membrane. In a preferred embodiment, the polymeric matrix is polyvinylidene fluoride (PVDF) polymeric matrix. In some embodiments, the molybdenum iron composition is dispersed on and/or in a polyvinylidene fluoride polymeric matrix to form a nanocomposite membrane. In some embodiments, the molybdenum iron composition may interact with the PVDF polymeric matrix via London dispersion forces, ion-dipole interactions, polar-ionic forces, and/or any interactions known in the art. The molybdenum iron composition may be dispersed on and/or in a polyvinylidene fluoride polymeric matrix in an amount of 0.01-0.5% by weight based on a total weight of the nanocomposite membrane. In some embodiments, the molybdenum iron composition is dispersed on and/or in a polyvinylidene fluoride polymeric matrix in an amount of 0.02-0.4% by weight based on a total weight of the nanocomposite membrane. In some embodiments, the molybdenum iron composition is dispersed on and/or in a polyvinylidene fluoride polymeric matrix in an amount of 0.03-0.3%, preferably 0.04-0.2%, preferably 0.05-0.19%, preferably 0.06-0.09%, or preferably 0.08-0.07% by weight based on the total weight of the nanocomposite membrane.

In some embodiments, the polymeric matrix may be any thermoplastic fluoropolymer known in the art. In some embodiments, the polymeric matrix may be any thermoplastic polymer known in the art. In some embodiments, the thermoplastic polymer may be used in combination with or in place of the PVDF in the polymeric matrix. In some embodiments, one or more organic additives may be used as well in the polymeric matrix. Suitable examples of organic additives include cellulose acetate phthalate (CAP), polyvinyl alcohol (PVA), graphene oxide, polyethylene glycol (PEG), graphene oxide, chitosan, or combinations thereof.

The nanosheets are in the form of a plurality of overlaying layers with exposed ridges between layers. The overlaying layers have particles uniformly dispersed on their surfaces wherein the particles are molybdenum iron (MoFe) particles. In some embodiments, the particles may be molybdenum oxide ($MoO_3$) nanoparticles. The particles may be comprised of layers of nanosheets. In some embodiments, the particles may be randomly dispersed on the overlaying layers. The particles may have size varying between 0.1 to 3 μm, preferably 0.2 to 2 μm, preferably 0.3 to 1.5 μm, preferably 0.4 to 1.2 μm, preferably 0.5 to 1 μm, preferably 0.6 to 0.9 μm, or preferably 0.7 to 0.8 μm. The particles may include sizes of about 0.2 μm, 0.3 μm, 0.4 μm, 0.5 μm, 0.6 μm, 0.7 μm, 0.8 μm, 0.9 μm, 1 μm, 2 μm, 3 μm, any size in between, the like, and combinations thereof.

Membrane porosity is one of the determining factors for flux rates. The incorporation of MoFe particles in the nanocomposite membranes influences the porosity and the flux rates for effluents. In one embodiment, the nanocomposite membrane has a membrane porosity of 70 to 85% based on a ratio of a volume of pores to a total volume of the membrane. In some embodiments, the nanocomposite membrane has a membrane porosity of 75 to 85%, preferably 76 to 85%, preferably 77 to 85%, preferably 78 to 85%, preferably 79 to 85%, preferably 80 to 85%, preferably 81 to 85%, preferably 82 to 85%, and more preferably 83 to 85% based on a ratio of a volume of pores to a total volume of the membrane. In some embodiments, the nanocomposite membrane has a membrane porosity of about 84% based on a ratio of a volume of pores to a total volume of the membrane.

The nanocomposite membranes have pore size diameter of 0.1 to 2 μm. The pore size diameter may vary depending upon the size of the pollutant particles to be removed. In some embodiments, the nanocomposite membranes have pore size diameter of 0.2 to 1 μm, preferably 0.3 to 0.9 μm, preferably 0.4 to 0.8 μm, preferably 0.5 to 0.7 μm, preferably 0.6 μm depending upon the size of the pollutant particles to be removed. In some embodiments, the pores may be overlapping. In some embodiments, the pores may be oblong in shape, with the longest dimension having a length of 0.1 to 5 μm, preferably 0.2 to 4 μm, preferably 0.3 to 3 μm, preferably 0.4 to 2 μm, or preferably 0.5 to 1 μm. In some embodiments, after the nanocomposite membranes have been used in a filtration process, the pores may have a reduced pore size diameter compared to the pore size diameter before the filtration process. In an embodiment, the nanocomposite membranes may have a pore size diameter of 0.1 to 2 μm before a filtration process and the nanocomposite membranes may have a pore size diameter of 0.05 to 1 μm after a filtration process. In some embodiments, the nanocomposite membranes may have a pore size diameter of 0.05 to 1 μm, preferably 0.1 to 0.8 μm, preferably 0.2 to 0.6 μm, or preferably 0.3 to 0.5 μm after a filtration process.

In some embodiments, the nanocomposite membrane has a thickness of 0.050 to 0.500 mm, preferably 0.060 to 0.450 mm, preferably 0.070 to 0.400 mm, preferably 0.080 to 0.350 mm, preferably 0.090 to 0.300 mm, preferably 0.100 to 0.250 mm, preferably 0.110 to 0.200 mm, preferably 0.120 to 0.160 mm, more preferably 0.130 to 0.150 mm, and yet more preferably about 0.140 mm.

The nanocomposite membrane is mostly hydrophilic in nature having a water contact angle varying between 75 to 90°, preferably 76 to 89°, preferably 77 to 88°, preferably 78 to 87°, preferably 79 to 86°, preferably 80 to 85°, preferably 81 to 84°, or preferably 82 to 83°.

In one embodiment, a method 50 (FIG. 1A) of filtration is disclosed. According to the present disclosure, the method 50 corresponds to the filtration of a contaminated feed mixture. A schematic flow diagram of method 50 for filtration of contaminated feed mixture is shown in FIG. 1A. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes contacting a nanocomposite membrane with a contaminated feed mixture. The contaminated feed mixture comprises at least water and one or more pollutants. The contaminated feed mixture includes pollutants. The pollutants may include one or more toxic metals and/or radioactive substances, synthetic organic and/or inorganic chemicals, sediment dyes, and other substances of a similar nature. Toxic metals may include salts of cadmium, lead, chromium, mercury, arsenic, barium, iron, silver, aluminum, nickel, copper, and the like. The contaminated feed mixture may further include silicates, acids, salts of potassium, zinc, magnesium, calcium, sodium, and the like. Dyes contained in textile effluents such as methylene blue, malachite green, eriochrome black T, the like, and/or a combination thereof may be present in the contaminated feed mixture.

The nanocomposite membrane has a flux rate of 140 to 300 L $m^{-2}$ $h^{-1}$ preferably 150 to 290 L $m^{-2}$ $h^{-1}$, preferably 180 to 280 L $m^{-2}$ $h^{-1}$, preferably 200 to 280 L $m^{-2}$ $h^{-1}$, preferably 220 to 280 L $m^{-2}$ $h^{-1}$, preferably 250 to 280 L $m^{-2}$ $h^{-1}$, and more preferably 260 to 280 L $m^{-2}$ $h^{-1}$. The nanocomposite membrane is contacted with the contaminated feed mixture for 30 minutes to an hour for efficient removal of pollutants from the feed mixture. The removal efficiency of the nanocomposite membrane may be measured in terms of total dissolved solids (TDS), total organic carbon (TOC), and turbidity remaining in the feed mixture after filtration. For example, the nanocomposite membrane may have a removal efficiency of total organic carbon 50 to 85%, preferably 52 to 83%, preferably 55 to 80%, preferably 57 to 77%, preferably 60 to 75%, preferably 62 to 73%, or preferably 65 to 70% by weight based on the initial weight of the pollutants. In a preferred embodiment, the nanocomposite membrane may have a removal efficiency of total dissolved solids of 40 to 70%, preferably 42 to 67%, preferably 45 to 65%, preferably 47 to 62%, preferably 50 to 60%, or preferably 52 to 57% by weight based on the initial weight of the pollutants. In some embodiments, the nanocomposite membrane may have a removal efficiency of turbidity of 95 to 100%, preferably 96 to 99%, or preferably 97 to 98% by weight based on the initial weight of the pollutants.

The removal efficiency of the nanocomposite membrane may vary depending on the type of pollutants in the feed mixture. For example, when the pollutants in the feed mixture are dyes from textile effluents or salts of heavy metals such as chromium, cadmium or lead, the nanocomposite membrane may have a removal efficiency of 80 to 100%, preferably 82 to 98%, preferably 85 to 95%, or preferably 87 to 92% by weight based on an initial weight of the pollutants.

The nanocomposite membranes have a flux recovery ratio of 85-99%, preferably 88-99%, preferably 90-99%, and more preferably 95-99%. The higher flux recovery ratio of the membranes indicates their anti-fouling property and enhanced usability.

At step 54, the method 50 includes collecting a permeate passing through the membrane to obtain a purified composition having a reduced amount of pollutants. The feed passes through the nanocomposite membrane, and the resulting permeate is collected in a container. The solute particles from the pollutants may attach to the molybdenum iron nanosheets in the nanocomposite membrane, resulting in a clear filtered solution. The solute particles from the pollutants may attach to the molybdenum iron nanosheets through size exclusion principles, electrostatic interactions, and the like. The molybdenum iron nanocomposite membranes are highly efficient in removing pollutants as they show a pollutant rejection efficiency of 80% and above, preferably 85% and above, preferably 90% and above, preferably 95% and above, and preferably 98% and above.

Figure 1B:
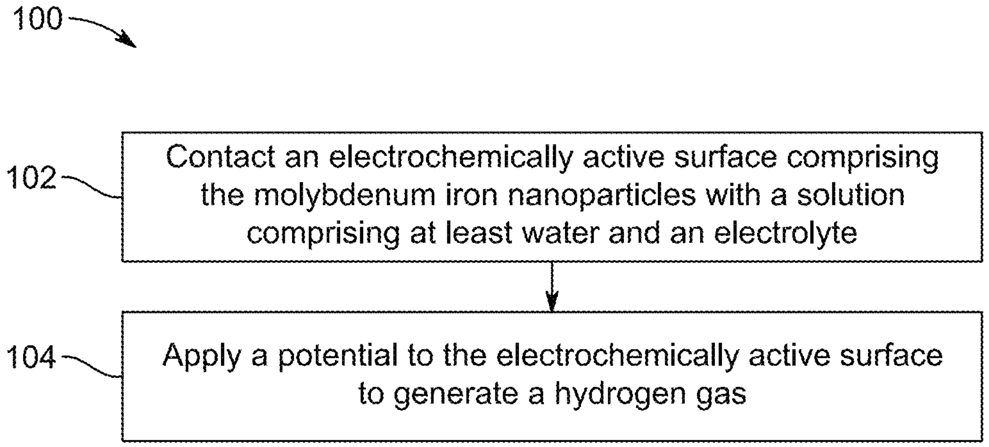
FIG. 1B is a flowchart depicting a method of hydrogen evolution, according to certain embodiments.

In one embodiment, a method 100 of hydrogen evolution is disclosed. According to the present disclosure, a method 100 for the generation of hydrogen by electrochemically splitting water is illustrated in FIG. 1B. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes contacting an electrochemically active surface comprising molybdenum iron (MoFe) composition with a solution comprising at least water and an electrolyte. As used herein, an electrochemically active surface refers to an area of an electrode that is accessible to an electrolyte that is used for charge transfer and/or storage. In the present disclosure, an electrochemically active surface is created by the deposition of a nanocomposite, including molybdenum iron composition, on an electrode. The electrode may be made of a material selected from graphite, noble metals such as gold, silver, platinum, copper, carbon, and the like. In a preferred embodiment, the electrode is made of carbon, preferably conductive carbon, i.e., conductive carbon paper. The electrochemically active surface is contacted with a solution comprising water and an electrolyte. The water can be tap water, distilled water, bidistilled water, deionized water, deionized distilled water, reverse osmosis water, or seawater. In some embodiments, the water is seawater, which is bidistilled to eliminate trace metals. In some embodiments, the water is distilled water.

The solution comprises at least one electrolyte. The solution may include salts of sodium, potassium, chloride, magnesium, calcium, phosphate, and bicarbonates. In some embodiments, the solution includes at least one of sodium bicarbonate ($NaHCO_3$) or potassium bicarbonate ($KHCO_3$). In some embodiments, the electrolyte may be selected from sodium chloride (NaCl), sodium sulfate ($Na_2SO_4$), potassium chloride (KCl), sodium nitrate ($NaNO_3$), lithium nitrate ($LiNO_3$), potassium nitrate ($KNO_3$), and any electrolyte known in the art.

The electrochemically active surface forms the working electrode where the hydrogen evolution reaction takes place. The potential changes of the working electrode can be measured in respect of the potential of a reference electrode. A reference electrode is an electrode that has a stable and well-known electrode potential. A reference electrode may enable a potentiostat to deliver a stable voltage to the working electrode or the counter electrode. The reference electrode may be a reversible hydrogen electrode (RHE), a standard hydrogen electrode (SHE), a normal hydrogen electrode (NHE), a saturated calomel electrode (SCE), a Cu(0)/Cu(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, a platinum electrode, or any reference electrode known in the art. In a preferred embodiment, the reference electrode is platinum.

A counter electrode can be used along with the working electrode and reference electrode. A counter electrode allows the current to pass through it and balances the current observed at the working electrode. The material of the counter electrode may be selected from platinum, gold, carbon, or any material known in the art. In some embodiments, the material of the counter electrode is platinum. The working electrode, reference electrode, and counter electrode are in connection with a potentiostat.

At step 104, the method 100 includes applying a potential of 0 to 2.0 V to the electrochemically active surface area, resulting in the evolution of hydrogen gas. The molybdenum iron catalyst has an overpotential of 80-100 millivolts (mV) per decade (dec), preferably 82-98 mV/dec, preferably 85 to 95 mV/dec, or preferably 87 to 92 mV/dec. The molybdenum iron nanosheets of the present disclosure show enhanced hydrogen evolution through a hydrogen evolution reaction (HER). The double-layer capacitance for molybdenum iron nanosheets, as determined through CV curves at various scan rates within a specific test voltage (non-faradic) range, is 8-12 mF $cm^{-2}$, preferably 9-11 mF $cm^{-2}$, or preferably about 10 mF $cm^{-2}$. The molybdenum iron nanosheets have Tafel plot slope of 110 to 130 mV $dec^{-1}$, preferably 112 to 125 mV $dec^{-1}$, preferably 115 to 120 mV $dec^{-1}$, or more preferably about 118 mV $dec^{-1}$. A higher value of double-layer capacitance and Tafel plot slope for molybdenum iron nanocomposites of the present disclosure is indicative of the catalytic activity of the molybdenum iron nanosheets.

EXAMPLES

The following examples describe and demonstrate exemplary embodiments of molybdenum iron nanosheets and nanocomposite membranes as described herein. The examples are provided solely for the purpose of illustration and are not to be construed as limitations of the present disclosure, as many variations thereof are possible without departing from the spirit and scope of the present disclosure.

Example 1: Materials

Ammonium molybdate tetrahydrate ($(NH_4)_6Mo_7O_{24}\cdot 4H_2O$), amino triazole ($C_2H_4N_4$) (AMT), and absolute ethanol were from Sigma Aldrich. 1-methyl-2-pyrrolidone (NMP) with 99.5% analytical purity (solvent) and polymer (polyvinylidene fluoride (HSV 900 PVDF)) were purchased from MTI corporation. The dyes methylene blue (MB), malachite green (MG), and Eriochrome Black T (EBT) were obtained from Merck. During the experiments, deionized water (DI) was used. For synthetic water (SW) preparation, different salts including barium chloride ($BaCl_2\cdot 2H_2O$), aluminum sulfate ($(Al_2SO_4)_3\cdot 16H_2O$), nickel nitrate hexahydrate ($NiNO_3\cdot 6H_2O$), copper sulfate ($CuSO_4$), chromium nitrate nonahydrate ($Cr(NO_3)_3\cdot 9H_2O$), cadmium nitrate ($Cd(NO_3)_2\cdot 2\frac{1}{2}H_2O$), potassium fluoride (KF), zinc chloride ($ZnCl_2$), boric acid ($H_3BO_3$), magnesium sulfate ($MgSO_4$), calcium chloride ($CaCl_2$)), potassium permanganate ($KMnO_4$), sodium chloride (NaCl) and kaolinite were used.

Example 2: Preparation of Laboratory-Induced Water Samples

To investigate the removal of total dissolved solids (TDS), total organic carbon (TOC), turbidity, and three toxic metals (Cd, Pb, and Cr), a laboratory-induced water sample was prepared. First of all, a raw surface water sample (RSWS) was collected from River Ravi Siphon, Lahore, Pakistan, and its water quality was analyzed (results are provided in Table 1) through bacteriological, chemical, and physical parameters (provided by World Health Organization (WHO)), using the procedures mentioned in Standard Methods for the Examination of Water and Wastewater ($22^{nd}$ Edition). After that, the water quality of RSWS was imitated by adding salts present in RSWS into deionized (DI) water to produce synthetic lab-induced water samples and to keep consistent treated water samples during all experiments. A collective term referring to synthetic water pollutants, referred to as "SW pollutants," was assigned to TDS, TOC, turbidity, Cd, Pb, and Cr.

TABLE 1

Detailed quality evaluation of raw surface water samples (RSWS)

| Sr. No. | Parameters | Method No. | Values obtained | WHO Guidelines |
|---|---|---|---|---|
| 1 | Taste | N/A | Non-Objectionable | Non-Objectionable |
| 2 | Color | N/A | 9 TCU | <15 TCU |
| 3 | Odor | N/A | Non-Objectionable | Non-Objectionable |
| 4 | TDS | 2450 C | 1360 mg $L^{-1}$ | <1000 mg $L^{-1}$ |

TABLE 1-continued

Detailed quality evaluation of raw surface water samples (RSWS)

| Sr. No. | Parameters | Method No. | Values obtained | WHO Guidelines |
|---|---|---|---|---|
| 5 | pH | 4500-$H^+$ B | 6.98 | 6.5-8.5 |
| 6 | Total Hardness | 2340 C | 160 mg $L^{-1}$ | — |
| 7 | Turbidity | 2130 B | 354 NTU | <5 NTU |
| 8 | Antimony | 3500-Sb B | 0.01 mg $L^{-1}$ | 0.02 mg $L^{-1}$ |
| 9 | Aluminum | 3500-Al B | 0.347 mg $L^{-1}$ | 0.2 mg $L^{-1}$ |
| 10 | Arsenic | 3500-As A | 0.002 mg $L^{-1}$ | 0.01 mg $L^{-1}$ |
| 11 | Boron | 3500-B B | 0.09 mg $L^{-1}$ | 0.3 mg $L^{-1}$ |
| 12 | Barium | 3500-Ba B | 1 mg $L^{-1}$ | 0.7 mg $L^{-1}$ |
| 13 | Cadmium | 3500-Cd B | 1.231 mg $L^{-1}$ | 0.003 mg $L^{-1}$ |
| 14 | Chlorides | 4500-$Cl^-$ C | 219 mg $L^{-1}$ | 250 mg $L^{-1}$ |
| 15 | Cadmium | 3500-Cd B | 1.231 mg $L^{-1}$ | 0.003 mg $L^{-1}$ |
| 16 | Copper | 3500-Cu B | 78.21 mg $L^{-1}$ | 2 mg $L^{-1}$ |
| 17 | Selenium | 3500-Se B | Below detectable level (BDL) | 0.01 mg $L^{-1}$ |
| 18 | Lead | 3500-Pb B | 0.982 mg $L^{-1}$ | 0.01 mg $L^{-1}$ |
| 19 | Cyanide | N/A | BDL | 0.07 mg $L^{-1}$ |
| 20 | Fluoride | N/A | 0.52 mg $L^{-1}$ | 1.5 mg $L^{-1}$ |
| 21 | Chromium | 3500-Cr B | 0.489 mg $L^{-1}$ | 0.05 mg $L^{-1}$ |
| 22 | Lead | 3500-Pb B | 0.982 mg $L^{-1}$ | 0.01 mg $L^{-1}$ |
| 23 | Mercury | 3500-Hg A | BDL | 0.001 mg $L^{-1}$ |
| 24 | Manganese | 3500-Mn B | 0.071 mg $L^{-1}$ | 0.5 mg $L^{-1}$ |
| 25 | Nitrate | 4500-$NO_3^-$ A | 143 mg $L^{-1}$ | 50 mg $L^{-1}$ |
| 26 | Nickel | 3500-Ni B | 2.813 mg $L^{-1}$ | 0.02 mg $L^{-1}$ |
| 24 | Nitrite | 4500-$NO_2^-$ A | 99.1 mg $L^{-1}$ | 3 mg $L^{-1}$ |
| 26 | Zinc | 3500-Zn B | 0.021 mg $L^{-1}$ | 3 mg $L^{-1}$ |
| 28 | Fecal Coliform | 9221 C | 980 MPN/100 mL | 0 MPN/100 mL |
| 27 | *E. Coli* | | 276 MPN/100 mL | 0 MPN/100 mL |
| 32 | Calcium | 3500-Ca B | 68 mg $L^{-1}$ | 75 mg $L^{-1}$ |
| 29 | EC | 2510 A | 202 µS $cm^{-1}$ | 400 µS $cm^{-1}$ |
| 33 | Magnesium | 3500-Mg B | 71 mg $L^{-1}$ | 50 mg $L^{-1}$ |
| 30 | Sulphates | 4500-$SO_4^{-2}$ E | 120 mg $L^{-1}$ | 250 mg $L^{-1}$ |
| 34 | TOC | | 79 mg $L^{-1}$ | Typical value (SMWW): 25 mg $L^{-1}$ |

To study the removal of dyes (MB, MG, and EBT) from water. 100 ppm solutions of all three dyes were prepared by dissolving 100 mg of each respective dye in 1 L of DI water, whereas to study the removal of the dye mixture (MB, MG, EBT (MBMGEBT)), all three dyes MB, MG, and EBT were mixed in the concentration ratio of 1:1:1 to prepare 100 ppm solution.

Example 3: Synthesis of Molybdenum Iron (MoFe) Nanosheets

A solution of iron nitrite $Fe(NO_2)_2$ was prepared by adding ethanol. Under constant agitation speed, the prepared solution was then slowly added to the ammonium molybdate tetrahydrate ($(NH_4)_6Mo_7O_{24}\cdot 4H_2O$) solution at ambient temperature. Further, the amino triazole (AMT) solution was prepared, and the previously obtained mixture was added to the AMT solution. The weight fraction of the AMT solution to the previously obtained mixture as 1:1 was synthesized. After uniform mixing for 60 minutes, the mixture was dried completely in a standard oven at 80° C. The dried sample was further ground, followed by in situ thermal treatment in a quartz tube under nitrogen flow (30 $cm^3$/min) with a temperature ramping at 10° C. $min^{-1}$. The temperature was raised in two steps. First, the samples were heated from normal room temperature to 250° C. for 2 hours, and then further heated to 800° C. for 6 hours. Finally, the system was cooled under an inert atmosphere, and the grey-colored powdered sample was obtained.

Example 4: Fabrication of PVDF/MoFe Nanosheets

Figure 2:
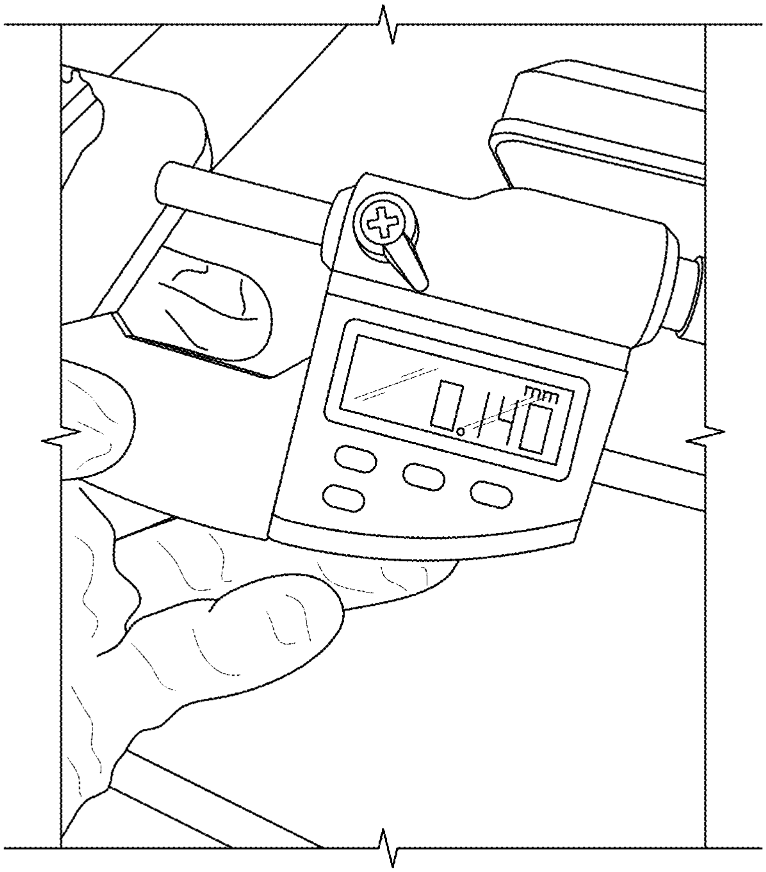
FIG. 2 depicts a micrometer gauge for measuring the thickness of a fabricated membrane, according to certain embodiments.

The immersion precipitation technique was used to produce neat PVDF and nanocomposite membranes. During neat PVDF membrane preparation, 82 wt. % NMP and 18 wt. % PVDF was gradually dissolved at 60° C. by constant stirring, and the mixture was further agitated for 24 hours to get a uniform solution. For the preparation of nanocomposite membranes, 0.1%, 0.2%, and 0.3% of MoFe sample powder (based on the total weight of the solution) were added into the NMP solvent and uniformly dispersed for 15 minutes using an ultrasound probe device. After the homogenous dispersion of MoFe in NMP, PVDF was gradually added to the suspension and the solution was continuously stirred at 60° C. for 1 day to homogenize the solutions. Further, all solutions were kept in an oven at 50° C. for 6 hours to degas them, and after degassing, the doped mixtures were cast on a clean uniform glass plate, having a 140 µm thickness (FIG. 2). The casted membrane films were instantly dipped into a deionized (DI) water-containing water bath at 30° C. Finally, to remove the remaining entrapped NMP solvent, the films were immersed in fresh DI water for 24 hours. The composition of all membranes is presented in Table 2.

TABLE 2

Compositions of Neat PVDF and nanocomposite membranes

| Sr. No. | Membrane name | Membrane code | PVDF (Wt. %) | NMP (Wt. %) | MoFe nanosheets (Wt. %) |
|---|---|---|---|---|---|
| 1 | Neat PVDF | M-0 | 18 | 82 | 0 |
| 2 | PVDF/MoFe (0.1%) | M-0.1 | 18 | 81.9 | 0.1 |

TABLE 2-continued

| Compositions of Neat PVDF and nanocomposite membranes | | | | | |
|---|---|---|---|---|---|
| Sr. No. | Membrane name | Membrane code | PVDF (Wt. %) | NMP (Wt. %) | MoFe nanosheets (Wt. %) |
| 3 | PVDF/MoFe (0.2%) | M-0.2 | 18 | 81.8 | 0.2 |
| 4 | PVDF/MoFe (0.3%) | M-0.3 | 18 | 81.7 | 0.3 |

Example 5: Investigation of Membrane Filtration Performance

Figure 3:
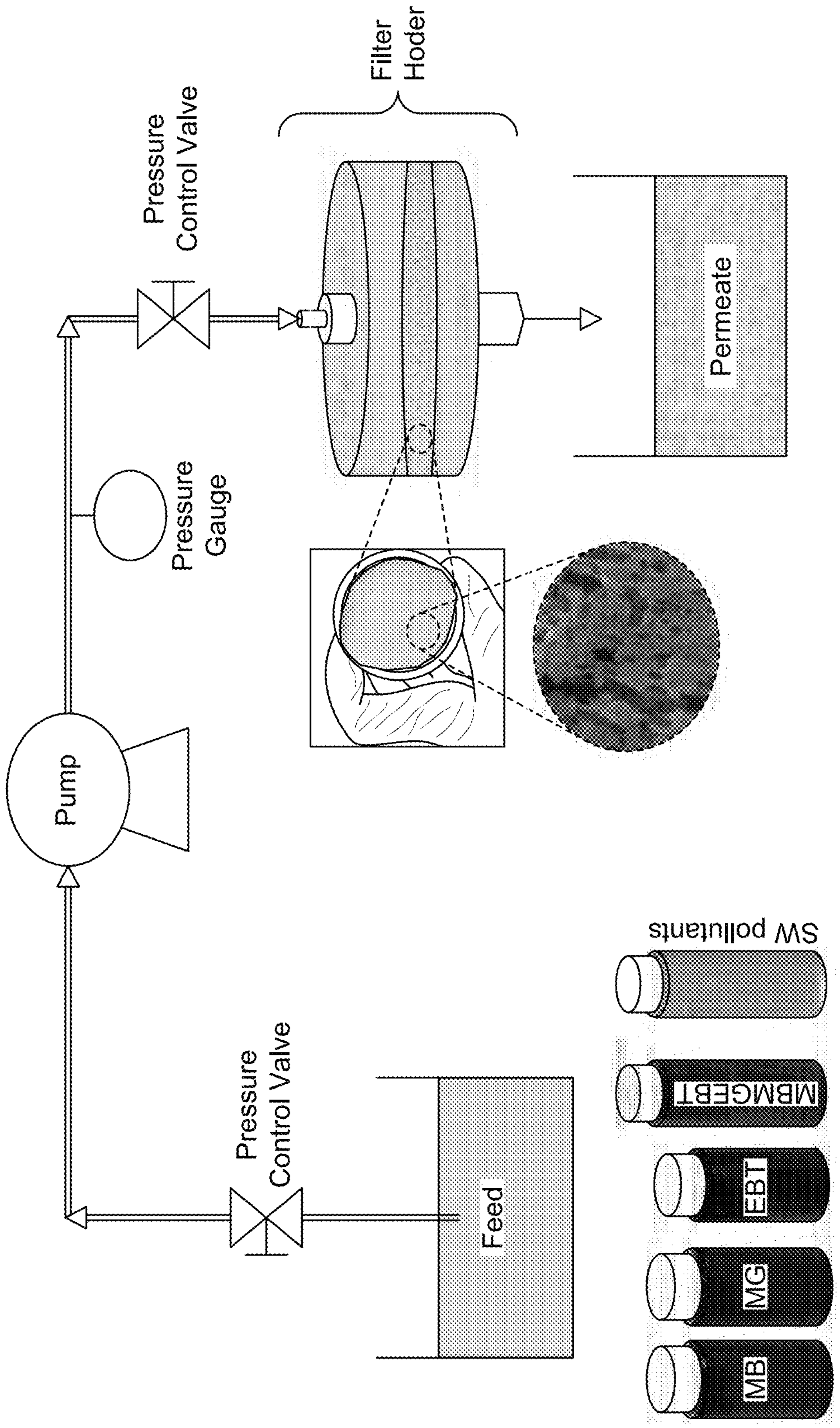
FIG. 3 shows a schematic illustration of a cross-flow membrane filtration set up for filtration of the contaminated feed mixture, according to certain embodiments.

The filtration performance of neat PVDF (M-0) and modified nanocomposite membranes was investigated through a laboratory-scale crossflow filtration assembly (FIG. 3). The feed solution (containing dyes or SW pollutants) in the 1 L tank was pumped to the filter holder (effective area: 20.25 $cm^2$), through the vacuum pump. Each synthesized membrane was placed in the filter holder, and all necessary filtration investigations were performed. FIG. 3 depicts the placement of one of the nanocomposite membranes along with its SEM analysis, which indicates the highly porous structure of the membrane matrix. The pure water flux (PWF) for all fabricated membranes was determined by compacting them first for around 30 minutes, under the constant pressure of 0.04 bar. The PWF was calculated according to the equation (Eq. (1)), under the operating pressure of 0.01 bar:

$$J_w = \frac{V}{S \times t} \quad \text{(Eq. 1)}$$

where $J_w$ refers to the PWF (L/$m^2$ h), S is the effective membrane surface area ($m^2$), t denotes the permeation period (hour) and V is the volume of permeate (L). The membrane rejection efficiency of all understudied pollutants, including dyes and SW pollutants, was measured through the following equation (Eq. (2)):

$$R(\%) = \left(1 - \frac{c_p}{c_f}\right) \times 100 \quad \text{(Eq. 2)}$$

where $C_f$ corresponds to the concentration of pollutants in the feed solution, and $C_p$ is the concentration of respective pollutants in the permeate solutions.

To evaluate the fouling behavior of membranes, the flux recovery ratio (FRR) was measured. After each filtration run, membranes were thoroughly washed with DI water for about 30 minutes and then immersed in DI water for at least 1 hour. Further, PWF was again evaluated after 1 hour, and then FRR was calculated by the following equation (Eq. (3)):

$$FRR = \frac{J_{w2}}{J_{w1}} \quad \text{(Eq. 3)}$$

where $J_{W1}$ is the pure PWF of the clean membrane and $J_{w2}$ refers to the PWF of the fouled membrane (after cleaning).

For the detailed investigations of the effect of the MoFe nanosheets on the fouling properties, the total fouling ratio ($R_t$), irreversible fouling ratio ($R_{ir}$), and reversible fouling ratio ($R_r$), were calculated by the equations below (Eq. (4)-Eq. (6)):

$$R_t(\%) = \left(1 - \frac{J_p}{J_{w1}}\right) \times 100 \quad \text{(Eq. 4)}$$

$$R_{ir}(\%) = \left(\frac{J_{w1} - J_{w2}}{J_{w1}}\right) \times 100 \quad \text{(Eq. 5)}$$

$$R_r(\%) = \left(\frac{J_{w2} - J_p}{J_{w1}}\right) \times 100 \quad \text{(Eq. 6)}$$

where $J_p$ refers to permeation flux (L/$m^2$ h), $J_{W1}$ is the PWF (L/$m^2$ h), and $J_{W2}$ (L/$m^2$ h) is the recovered PWF after washing.

To check the filtration stability of the membrane, multiple-cycle filtration runs with three (3) cycles (using synthetic water) were performed for the membrane, which exhibited excellent results in terms of maximum pollutant rejection and flux rates. After every cycle, the membrane was thoroughly cleaned with DI water for 30 minutes and then investigated for the next cycle.

Example 6: Characterization of MoFe Nanosheets

Fourier-transform infrared (FTIR) analysis of the Fe—Mo core-shell nanospheres was performed to investigate the existence of various functional groups in the sample through Perkin Elmer FTIR spectrophotometer (manufactured by Perkin Elmer, Waltham, Massachusetts, United States) Spectrum Two™, and the wavelength range selected was 4000-400 $cm^{-1}$ at a specific resolution (4 $cm^{-1}$). To check the crystallinity of the sample, powder X-ray diffraction (XRD) measurements were conducted by using Rigaku miniFlex (manufactured by Rigaku, Japan). The morphology of the surface of nanospheres was analyzed through scanning electron microscopy (SEM) (TESCAN Vega3). Elemental evaluation and chemical composition of the synthesized samples were performed using SEM equipped with energy dispersive X-rays (EDX) spectroscopy. The detailed features and structure of the Fe—Mo core-shell nanospheres were analyzed by transmission electron microscopy (TEM) (electron diffraction, FEI, Morgagni 268 at 80 kV).

Example 7: Membrane (PVDF/MoFe) Characterization

The internal chemical structure of the PVDF and nanocomposite membranes was investigated by Fourier Transform Infrared (FTIR) spectroscopy within the range 4000-400 $cm^{-1}$ at a resolution of 4 $cm^{-1}$. The hydrophilic behavior of membranes was investigated by water contact angle (WCA) value using a contact angle meter (Biolin Scientific Attention Theta Flex). Energy dispersive X-ray (EDX) spectroscopy was performed to examine the elemental composition of the membrane samples. The morphology of the membranes was studied by scanning electron microscopy (SEM). Thermal gravimetric (TG) analysis was applied to check the thermal stability and weight loss of membranes using PerkinElmer Pyris 1 TG Analyzer.

Example 8: Electrochemical Hydrogen Evolution Reaction (HER)

Figure 4A:
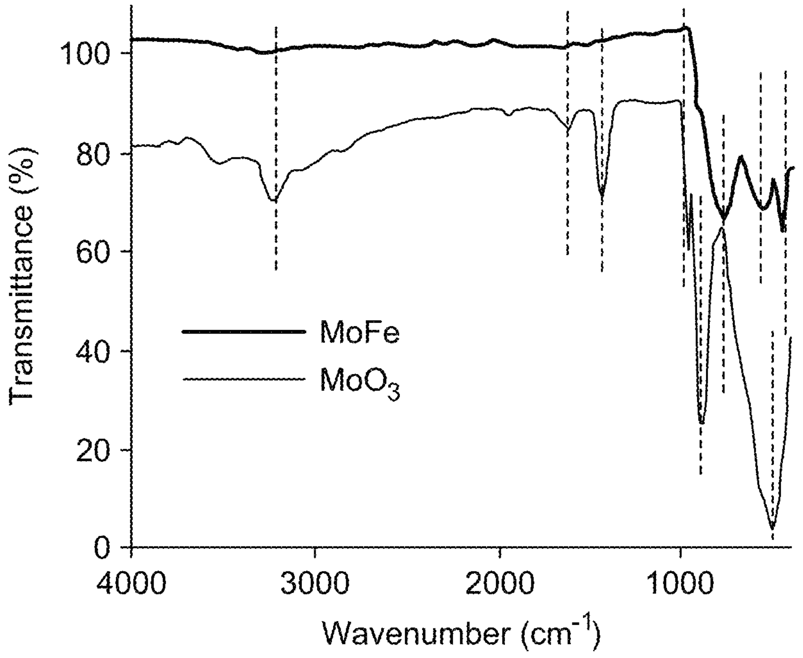
FIG. 4A shows Fourier-transform infrared (FTIR) analysis of MoFe and $MoO_3$ nanostructures, according to certain embodiments.
Figure 4B:
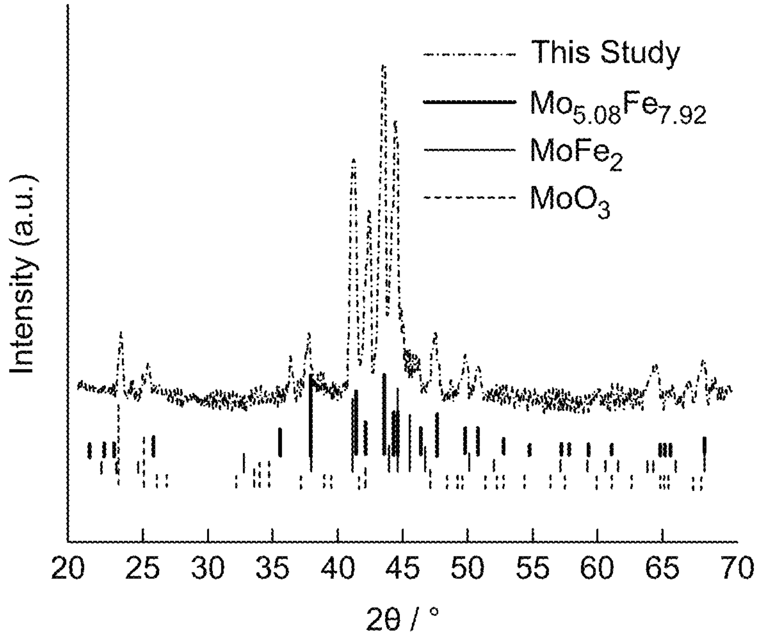
FIG. 4B shows the crystalline characteristics of the MoFe nanosheets as determined through X-ray diffraction (XRD) analysis, according to certain embodiments.
Figure 4C:
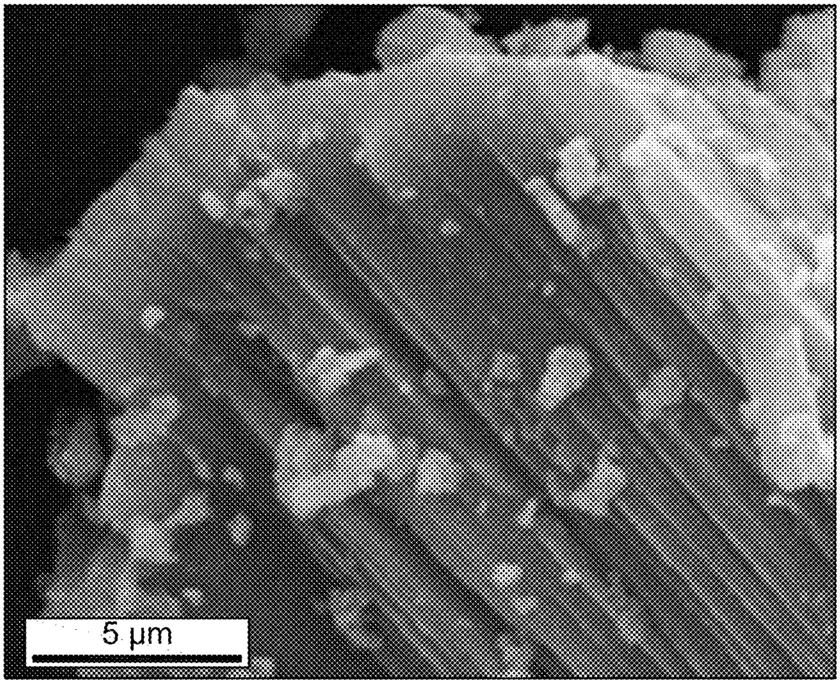
FIG. 4C shows a scanning electron microscope (SEM) image depicting morphological details of the MoFe nanosheets, according to certain embodiments.
Figure 4D:
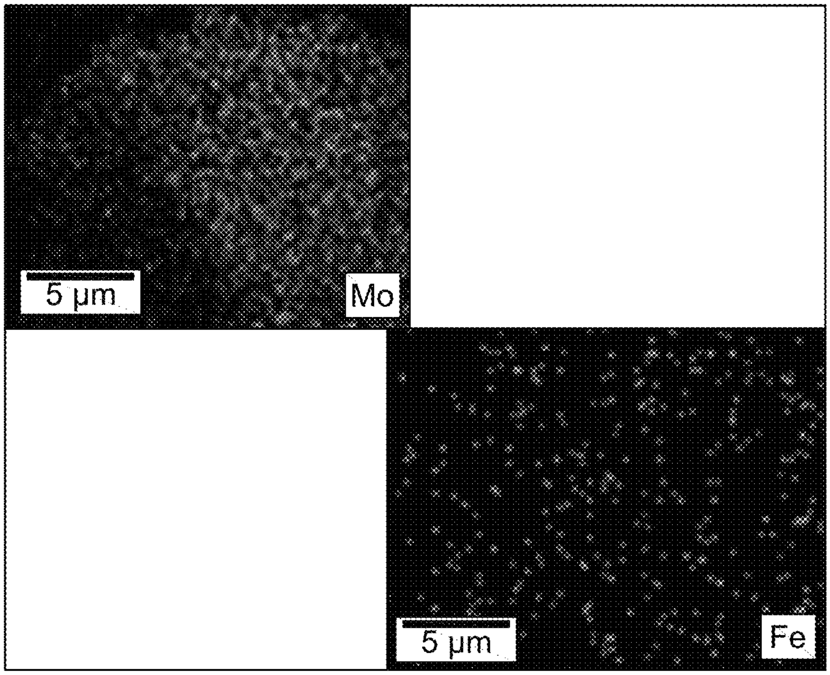
FIG. 4D shows Energy dispersive X-ray (EDX)-based elemental mapping of the MoFe nanosheets, according to certain embodiments.
Figure 4E:
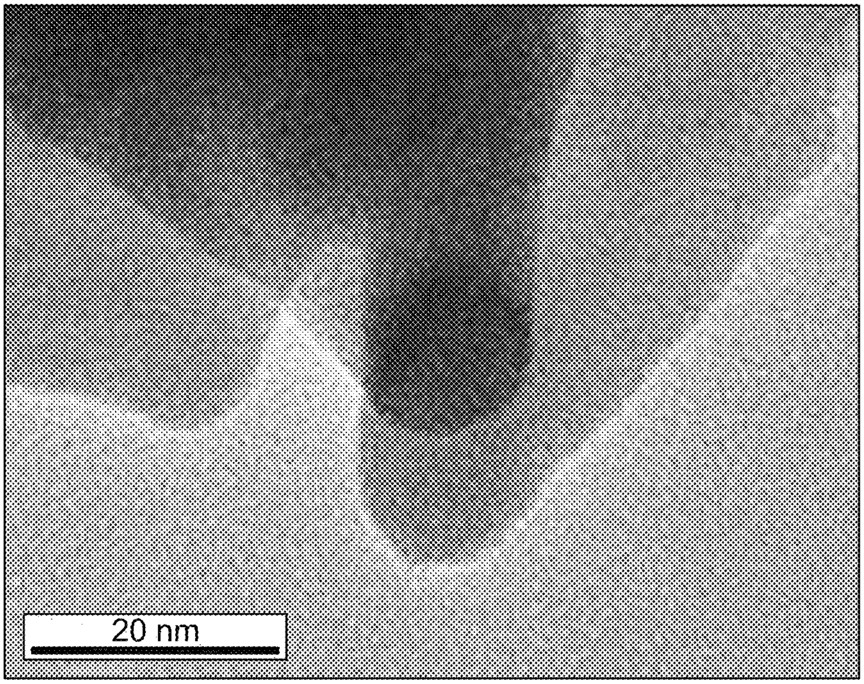
FIGS. 4E-4F show transmission electron microscope (TEM) image analysis, at different magnifications, of the MoFe nanosheets, according to certain embodiments.
Figure 4F:
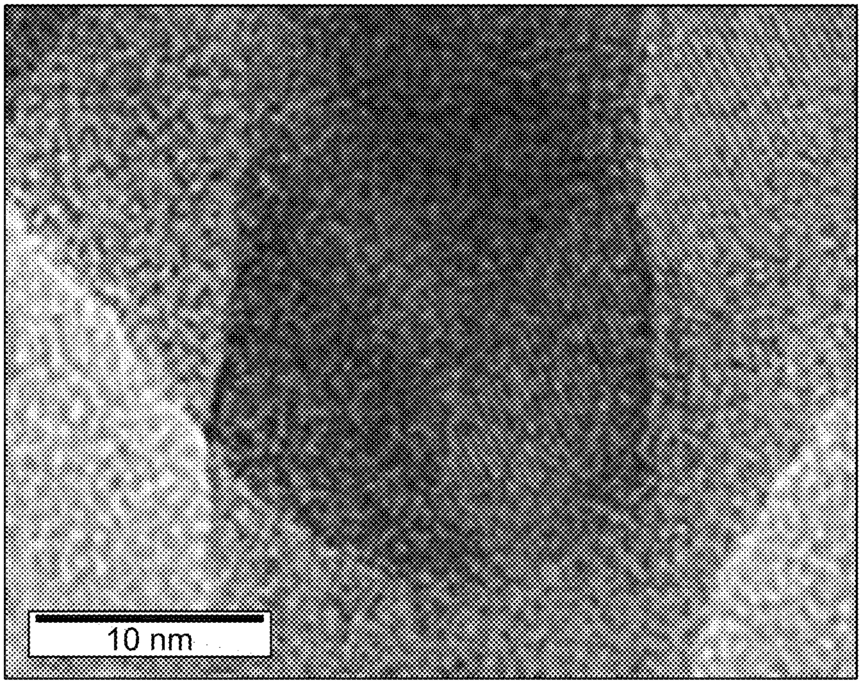

10 mg of MoFe sample was mixed with 10 mg of conductive carbon (CC), 2 mg of PVDF, and 400 µL of NMP in a 1.5 mL vial. The mixture was then ultrasonicated for 30 minutes. 10 L of the suspended solution was evenly deposited on a carbon electrode. The electrode was further dried in an oven at 60° C. for 1 hour. After 1 hour, the electrode was placed at room temperature to let it cool down. The electrochemical measurements were carried out by a three-electrode configuration comprising a reference electrode (Pt), a working electrode (electrocatalysts on carbon electrode), and a counter electrode (Pt). Linear sweep voltammetry (LSV) was determined by CS Multichannel Potentiostat at a scanning rate of 10 mV $s^{-1}$. Electrochemical impedance spectroscopy (EIS) was analyzed at an overpotential of 100 mV in a frequency range between −0.2 V and 0 V. The stability of the catalyst was measured by cyclic voltammetry (CV) within a range of scanning rate from 10 mV $s^{-1}$ to 200 mV $s^{-1}$. All the potentials in polarization curves and Tafel plots were checked by iR correction using $R_s$ in EIS. The FTIR spectra of synthesized MoFe nanosheets and $MoO_3$ nanoparticles have been presented in FIG. 4A. For $MoO_3$ nanoparticles, the strong vibrations observed at 873.5 $cm^{-1}$ and 495.6 $cm^{-1}$ correspond to oxygen associated with three linkages of metallic atoms, Mo—O and Mo—O—Mo stretching mode [A. Klinbumrung, T. Thongtem, S. Thongtem, Characterization of Orthorhombic α-$MoO_3$ Microplates Produced by a Microwave Plasma Process, *Journal of Nanomaterials.* 2012 (2012) e930763, incorporated herein by reference in its entirety]. Moreover, weak vibrations at 3245.3 $cm^{-1}$ and 1620.8 $cm^{-1}$ indicate the presence of O—H bonds of absorbed water whereas, the band at 1427.37 $cm^{-1}$ can be attributed to the presence of Mo—OH groups [N. Dighore, S. Jadhav, P. Anandgaonker, S. Gaikwad, A. Rajbhoj, Molybdenum Oxide Nanoparticles as Antimicrobial Agents, *J Clust Sci.* 28 (2017) 109-118, incorporated herein by reference in its entirety]. The formation of MoFe nanosheets resulted in new peaks with the diminishing of old peaks (observed for $MoO_3$ nanoparticles). For MoFe nanosheets, the bands observed at 767.4 $cm^{-1}$, 556.9 $cm^{-1}$, and 462.8 $cm^{-1}$ are ascribed to Mo and Fe vibrations in the sample. The crystalline characteristics of the MoFe nanosheets were determined through XRD analysis (FIG. 4B). The abundant phase of the sample showed by XRD was $MoFe_2$ (57.5%), which has the hexagonal structure well matched with XRD (JPDS 04-003-4286). In addition, another structure belonging to $Mo_{5.08}Fe_{7.92}$ (35.2%) was identified by XRD (JPDS 04-003-7152). Minor abundancy of the $MoO_3$ phase (6.8%) was also identified with less material quantity in the XRD spectrum. The morphological details of synthesized nanosheets were studied through SEM analysis (FIG. 4C) which exhibits the formation of thin manifold layers overlaying above each other, having nearly even surfaces with clear edges. EDX elemental mapping of the MoFe nanosheets has been provided in FIG. 4D, which depicts the homogeneous distribution of the elements molybdenum and iron throughout the sample. The formation of MoFe nanosheets was further verified through TEM analysis (FIG. 4E-4F) at two magnifications (20 nm and 10 nm) and the results depict multiple layers of thin aggregated nanosheets entangled with each other.

Figure 5A:
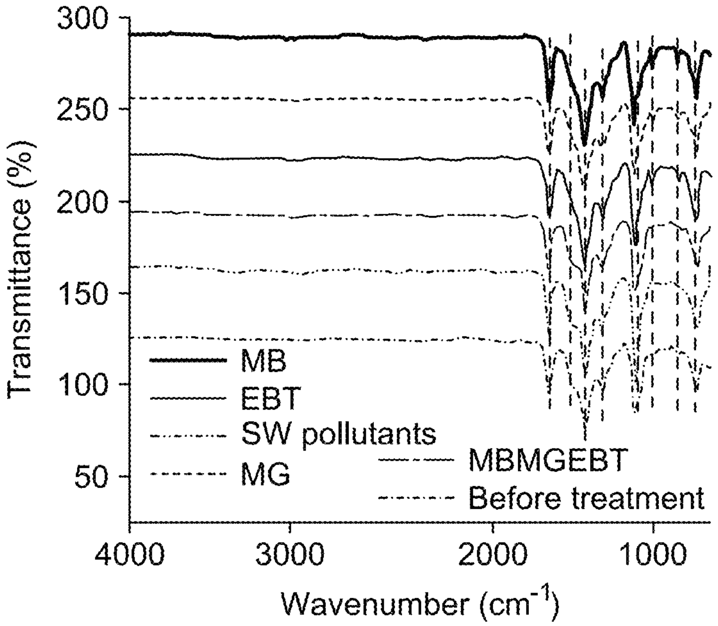
FIG. 5A shows FTIR analysis of M-0.2 nanocomposite membrane before and after treatment of dyes and synthetic water (SW) pollutants, according to certain embodiments.

FIG. 5A indicates FTIR analysis of M-0.2 nanocomposite membrane before and after treatment against understudied pollutants including dyes (MB, MG, EBT, and MBMGEBT) and SW pollutants (TDS, TOC, turbidity, Cd, Pb, and Cr). The M-0.2 nanocomposite membrane before treatment exhibits different characteristic peaks at 1406.9 $cm^{-1}$, 1274 $cm^{-1}$, 1180.05 $cm^{-1}$, 1064.65 $cm^{-1}$, 833.6 $cm^{-1}$, 751.7 $cm^{-1}$, 608.71 $cm^{-1}$, and 487.05 $cm^{-1}$, corresponding to —$CH_2$—$CF_2$-vibrations [A. Yadav, P. Sharma, A. B. Panda, V. K. Shahi, Photocatalytic $TiO_2$ incorporated PVDF-co-HFP UV-cleaning mixed matrix membranes for effective removal of dyes from synthetic wastewater system via membrane distillation, *Journal of Environmental Chemical Engineering.* 9 (2021) 105904, incorporated herein by reference in its entirety]. For dyes, the peaks observed at 1279.05 $cm^{-1}$, 1177 $cm^{-1}$, 1064 $cm^{-1}$, 879.9 $cm^{-1}$, 601 $cm^{-1}$, and 469 $cm^{-1}$ are associated with C—H in the benzene ring [A. Deb, A. Debnath, B. Saha, Sono-assisted enhanced adsorption of eriochrome Black-T dye onto a novel polymeric nanocomposite: kinetic, isotherm, and response surface methodology optimization, *Journal of Dispersion Science and Technology.* 42 (2021) 1579-1592, incorporated herein by reference in its entirety]. The peaks observed at 746 $cm^{-1}$, 676.7 $cm^{-1}$, 606.1 $cm^{-1}$, and 471 $cm^{-1}$ for the SW pollutants confirm the presence of metallic vibrations (related to Cd, Pb, and Cr) [S. Balamurugan, A. R. Balu, K. Usharani, M. Suganya, S. Anitha, D. Prabha, S. Ilangovan, Synthesis of CdO nanopowders by a simple soft chemical method and evaluation of their antimircobial activities, *Pacific Science Review A: Natural Science and Engineering.* 18 (2016) 228-232, incorporated herein by reference in its entirety].

Figure 5B:
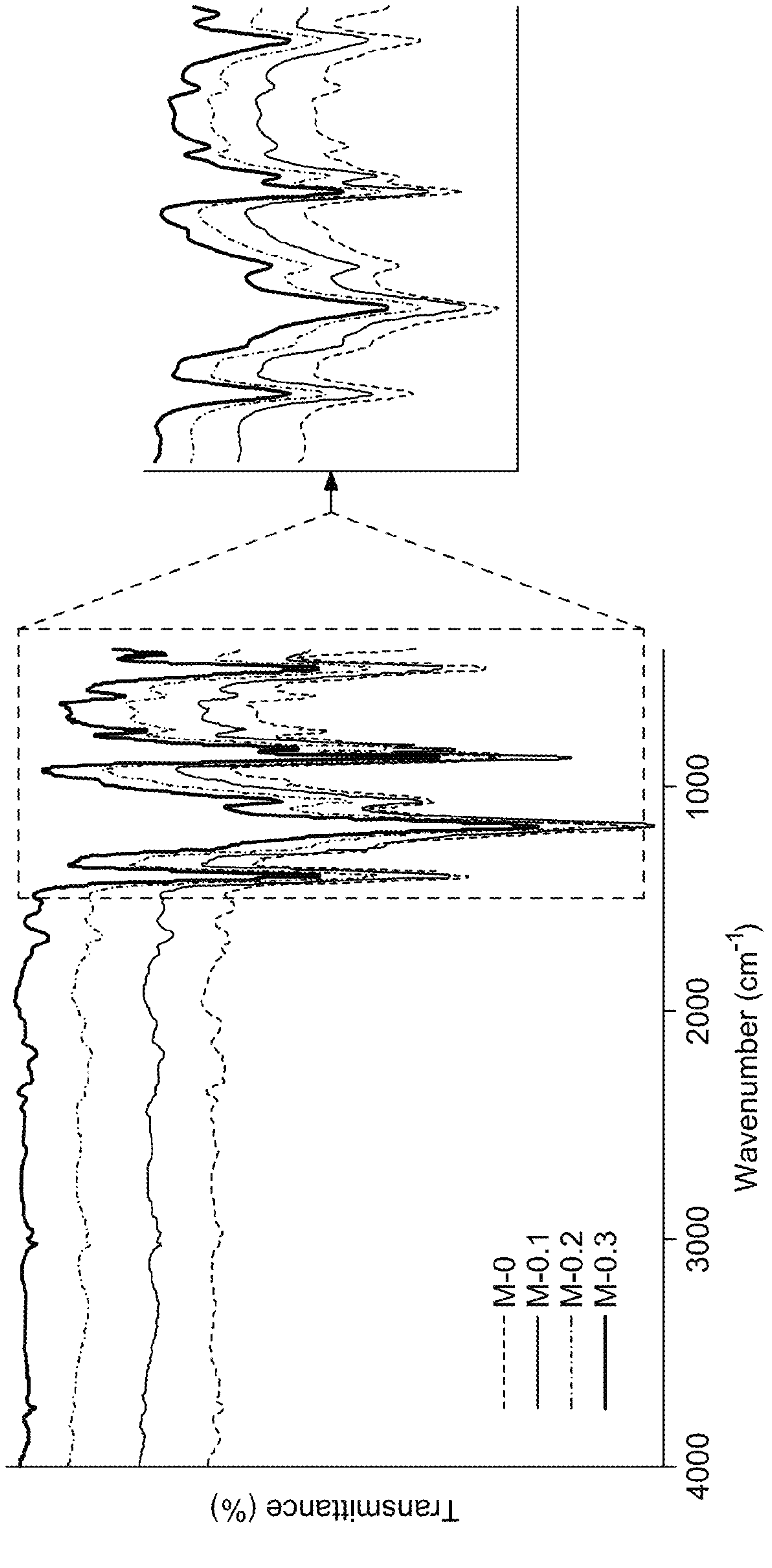
FIG. 5B shows FTIR analysis of neat PVDF (M-0) and nanocomposite membranes (M-0.1, M-0.2, and M-0.3), according to certain embodiments.

FIG. 5B exhibits the FTIR analysis of synthesized neat PVDF (M-0) and nanocomposite membranes (M-0.1, M-0.2, and M-0.3). No large variation was observed in the spectra of the membranes. The most prominent characteristic peaks observed include 784 $cm^{-1}$, 835 $cm^{-1}$, 871 $cm^{-1}$, 1073 $cm^{-1}$, 1185 $cm^{-1}$, 1277 $cm^{-1}$, and 1401 $cm^{-1}$, attributing to the presence of C—H and C—F vibrations in the tested membranes [H. Rafiei, M. Abbasian, R. Yegani, Polyvinyl fluoride as a neat and the synthesized novel membranes based on PVDF/polyvinyl pyrrolidone polymer grafted with $TiO_2$ nanoparticles through RAFT method for water purification, *Iran Polym J.* 30 (2021) 769-780, incorporated herein by reference]. The peaks at 493 $cm^{-1}$ and 608 $cm^{-1}$ in the nanocomposite membranes depict the presence of Mo—Fe vibrations in the sample [M. S. Sri Abirami Saraswathi, D. Rana, P. Vijayakumar, S. Alwarappan, A. Nagendran, Tailored PVDF nanocomposite membranes using exfoliated $MoS_2$ nanosheets for improved permeation and antifouling performance, *New J. Chem.* 41 (2017) 14315-14324, incorporated herein by reference in its entirety].

Figure 5C:
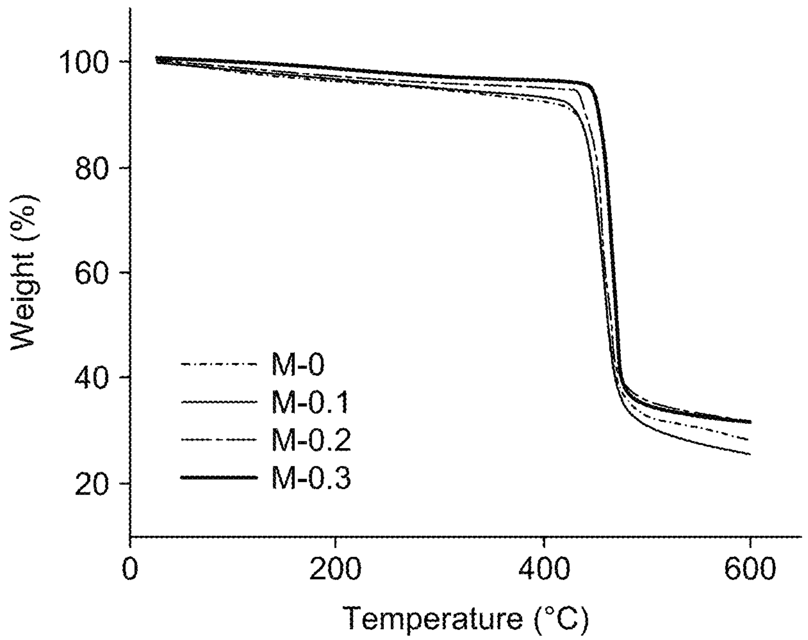
FIG. 5C shows thermogravimetric analysis (TGA) for tested membranes (M-0, M-0.1, M-0.2, M-0.3), according to certain embodiments.
Figure 5D:
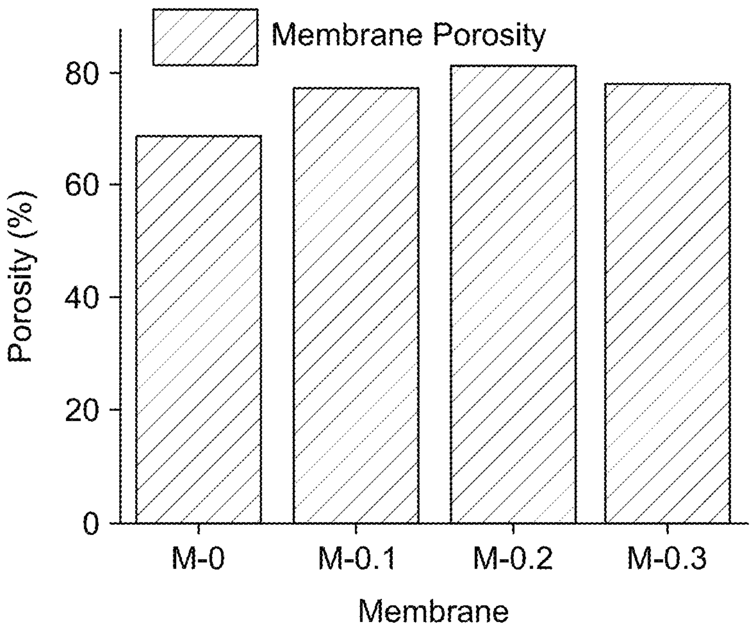
FIG. 5D shows membrane porosity in terms of percentage for tested membranes (M-0, M-0.1, M-0.2, M-0.3), according to certain embodiments.
Figure 5E:
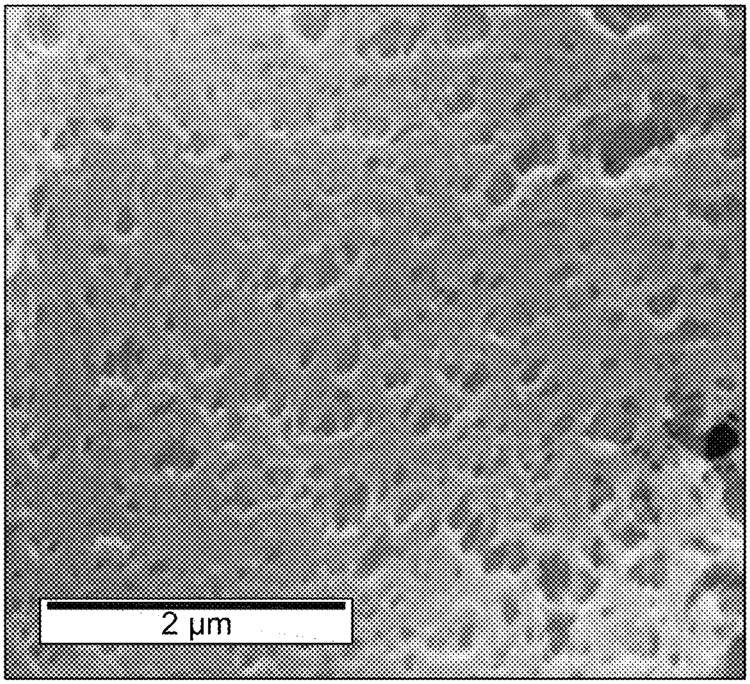
FIG. 5E shows SEM image of pure polyvinylidene fluoride (PVDF) membrane (M-0), according to certain embodiments.
Figure 5F:
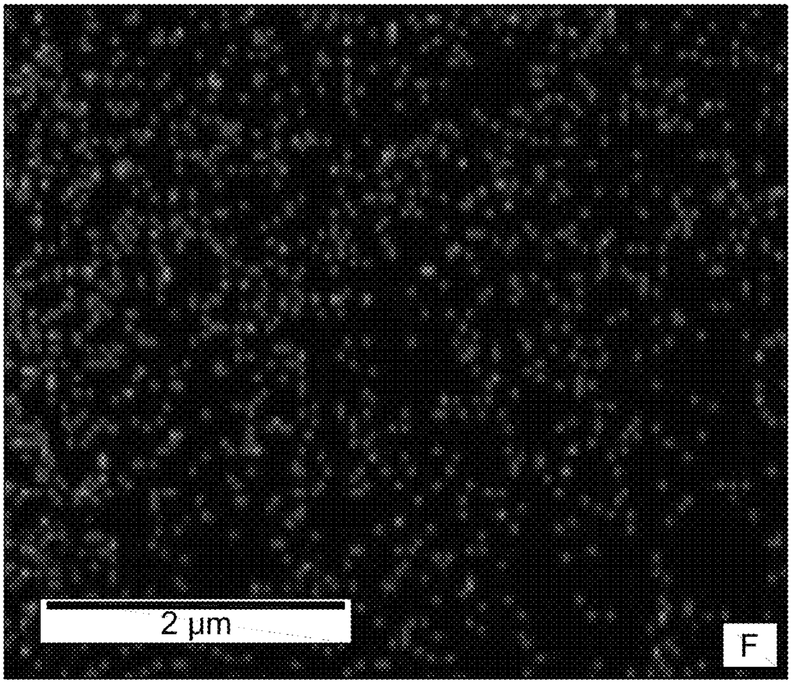
FIG. 5F shows EDX elemental mapping of pure PVDF membrane (M-0) depicting fluorine, according to certain embodiments.

TGA thermograms for the tested membranes (M-0, M-0.1, M-0.2, and M-0.3) have been presented in FIG. 5C. It was observed that with an increase in MoFe content in the PVDF matrix, the thermal degradation temperature also increased. M-0 membrane depicted a maximum thermal stability at 430° C. (with about 50% weight loss), which was improved to 470° C. for the M-0.3 nanocomposite membrane (with only about 15% weight loss). The percentage porosity of each membrane has been provided in FIG. 5D, which demonstrates that an increase in the MoFe content in the membrane led to increased porosity. Increasing the MoFe content from 0% to 0.2% by weight led to increased porosity from 58.9% to 83.4%. The hydrophilic behavior of MoFe nanosheets improved the exchange rate between solvent and water during the phase inversion process. This situation is favorable for membrane permeance as a membrane with high porosity generally exhibiting high flux rates [E. Mahmoudi, L. Y. Ng, W. L. Ang, Y. T. Chung, R. Rohani, A. W. Mohammad, Enhancing morphology and separation performance of polyamide 6, 6 membranes by minimal incorporation of silver decorated graphene oxide nanoparticles, *Scientific Reports,* 9 (2019) 1-16, incorporated herein by reference in its entirety]. However, a further increase in MoFe content (M-0.3) resulted in the agglomeration of nanostructures inside the membrane matrix, which reduced membrane porosity [S. Acarer, İ Pir, M. Tüfekci, T. Erkoç, V. Öztekin, C. Dikicioğlu, G. T. Demirkol, S. G. Durak, M. Ş. Özçoban, T. Y. T. Çoban, Characterisation and Mechanical Modelling of Polyacrylonitrile-Based Nanocomposite Membranes Reinforced with Silica Nanoparticles, *Nanomaterials,* 12 (2022) 3721, incorporated herein by reference in its entirety]. The SEM analysis and elemental mapping of the M-0 membrane before treatment have been presented in FIG. 5E & FIG. 5F. The SEM image (FIG. 5E) displays a nearly smooth surface of the membrane with microscopic pores, which is considered a typical structure of PVDF membranes. Furthermore, EDX elemental mapping (FIG. 5F) confirmed the presence of fluoride element throughout the sample [M. Tao, F. Liu, L. Xue, Hydrophilic poly (vinylidene fluoride) (PVDF) membrane by in situ polymerisation of 2-hydroxyethyl methacrylate (HEMA) and microphase separation, *J. Mater. Chem.* 22 (2012) 9131-9137; and H. Bai, X. Wang, Y. Zhou, L. Zhang, Preparation and characterization of poly(vinylidene fluoride) composite membranes blended with nano-crystalline cellulose, *Progress in Natural Science: Materials International.* 22 (2012) 250-257, both of which are incorporated herein by reference in their entireties]. SEM analysis of the M-0.2 membrane before treatment (FIG. 5G) shows that the tuning of the PVDF membrane with MoFe nanosheets resulted in excessive pores inside the polymeric matrix and the morphology of the nanocomposite membrane looked like fibrous lacy structures with numerous interconnected pores, demonstrating the positive impact on the improvement of flux rates in nanocomposite membranes. The reason behind the development of excessive pores in M-0.2 nanocomposite membrane is the hindrance phenomenon during phase inversion which caused slow and gradual exchange between non-solvent (water) and solvent. The EDX elemental mapping of the elements present in M-0.2, has been presented in FIGS. 5H-5J, demonstrating the presence of fluoride, molybdenum, and iron, inside the sample.

Figure 5G:
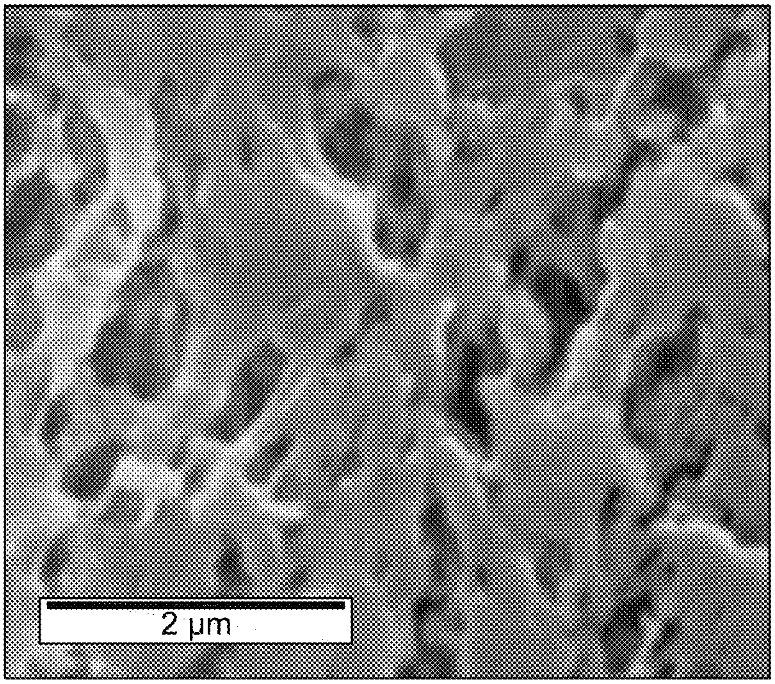
FIG. 5G shows SEM image of the M-0.2 nanocomposite membrane, before treatment of dyes and SW pollutants, according to certain embodiments.
Figure 5H:
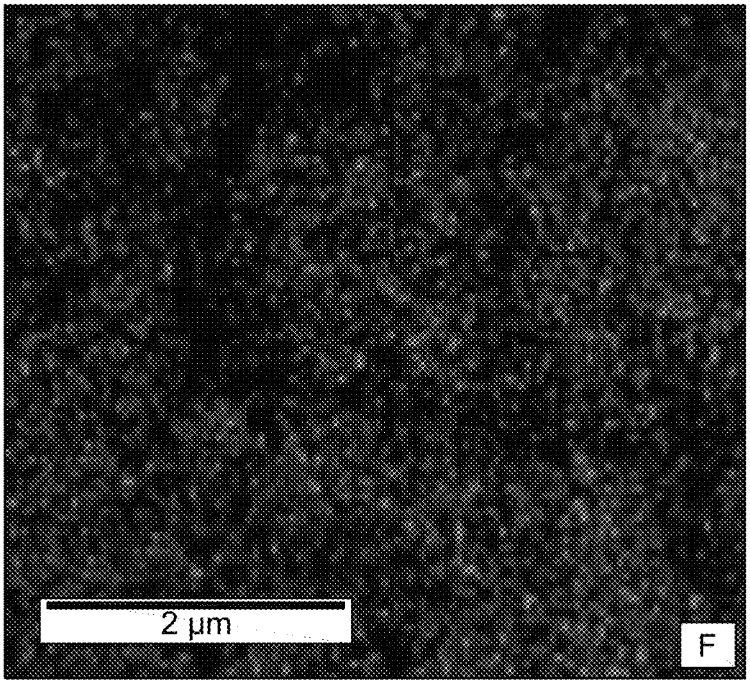
FIGS. 5H-5J show EDX elemental mapping of the M-0.2 nanocomposite membrane depicting fluorine, molybdenum, and iron, respectively, before treatment of dyes and SW pollutants, according to certain embodiments.
Figure 5I:
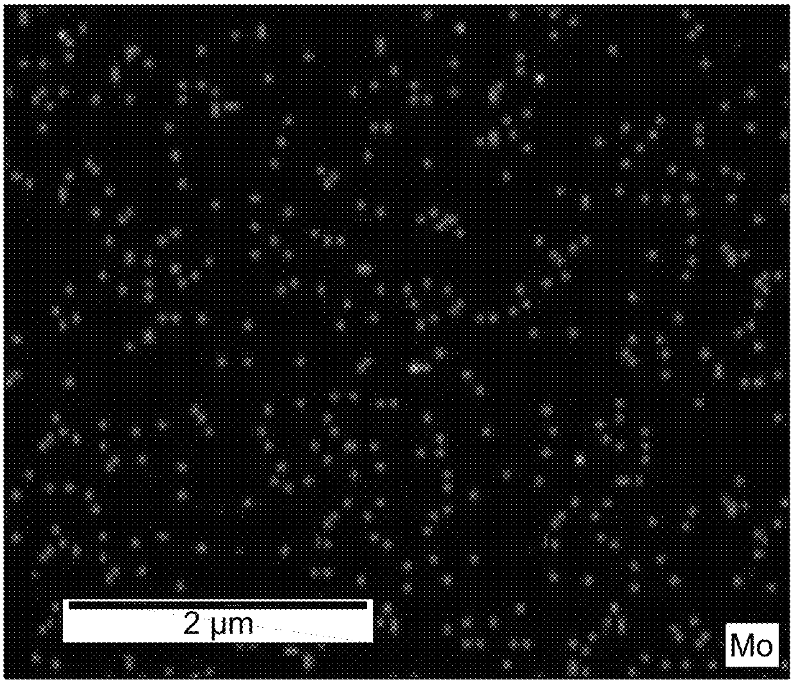
Figure 5J:
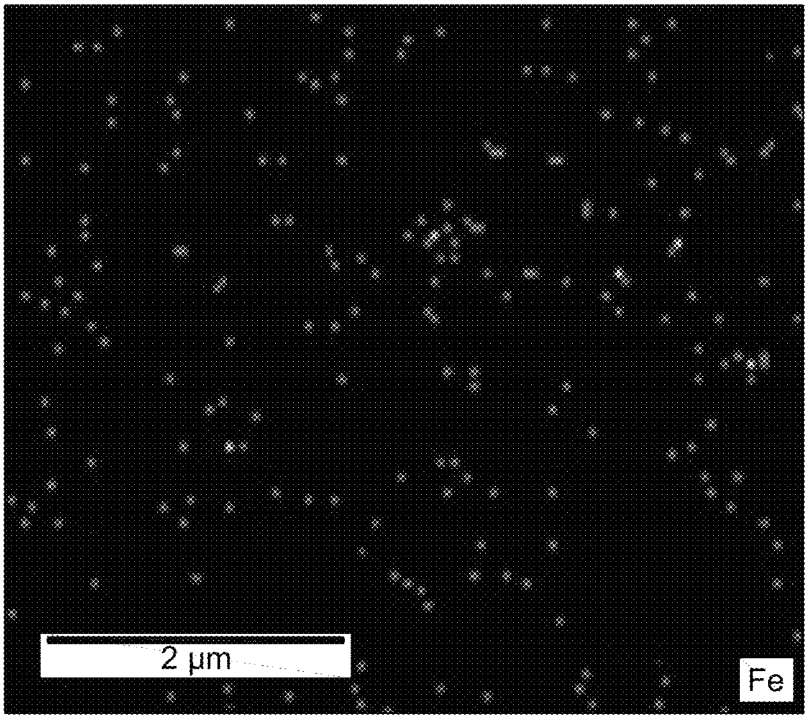
Figure 6A:
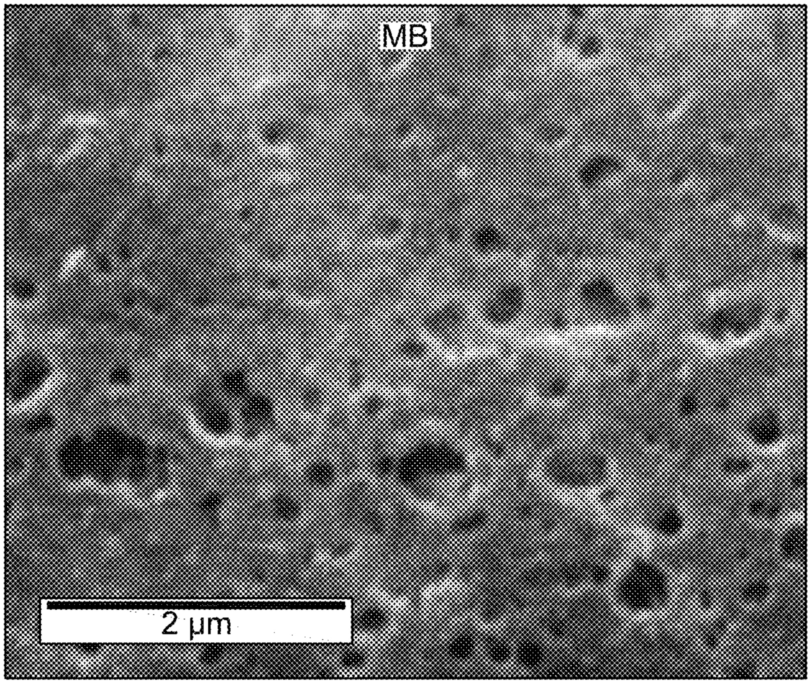
FIG. 6A shows SEM image of the M-0.2 nanocomposite membrane after membrane filtration for the dye methylene blue (MB), according to certain embodiments.
Figure 6B:
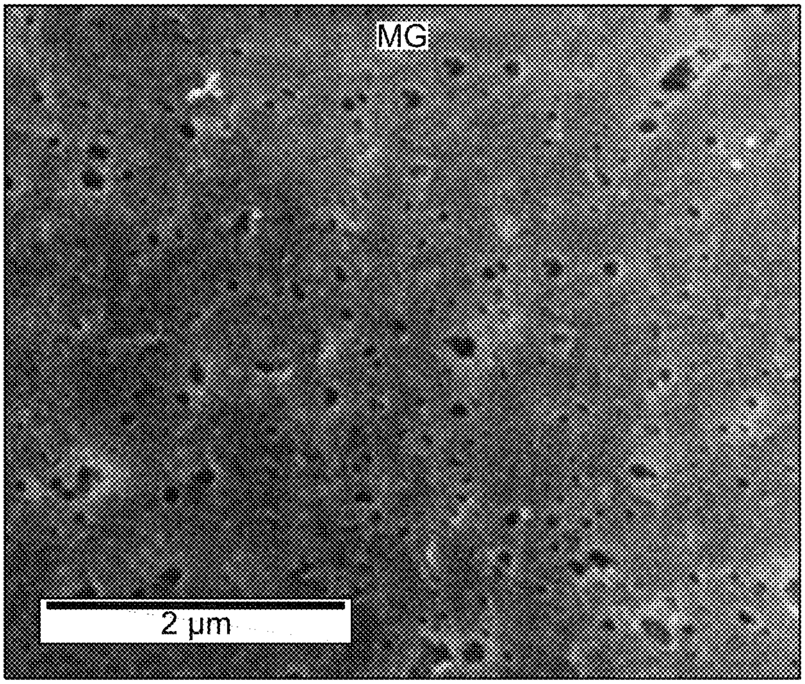
FIG. 6B shows SEM image of the M-0.2 nanocomposite membrane after membrane filtration for the dye malachite green (MG), according to certain embodiments.
Figure 6C:
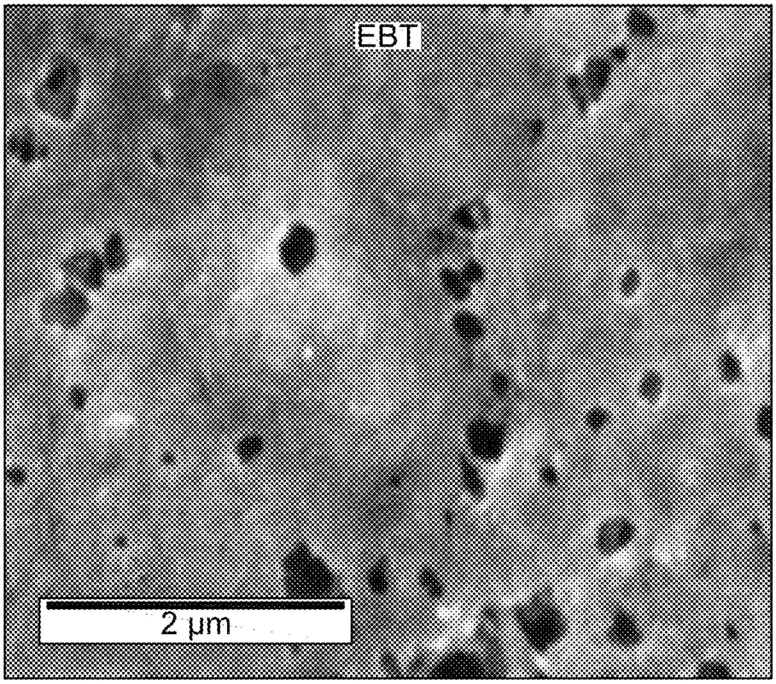
FIG. 6C shows SEM image of the M-0.2 nanocomposite membrane after membrane filtration for dye Eriochrome black T (EBT), according to certain embodiments.
Figure 6D:
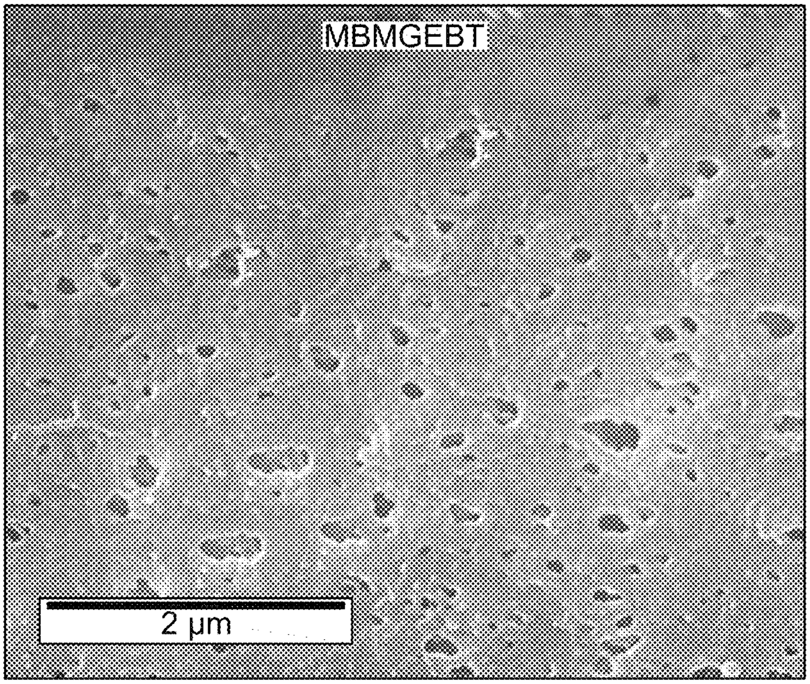
FIG. 6D shows SEM image of the M-0.2 nanocomposite membrane after membrane filtration for a mixture of the dyes (MB, MG, EBT (MBMGEBT)), according to certain embodiments.
Figure 6E:
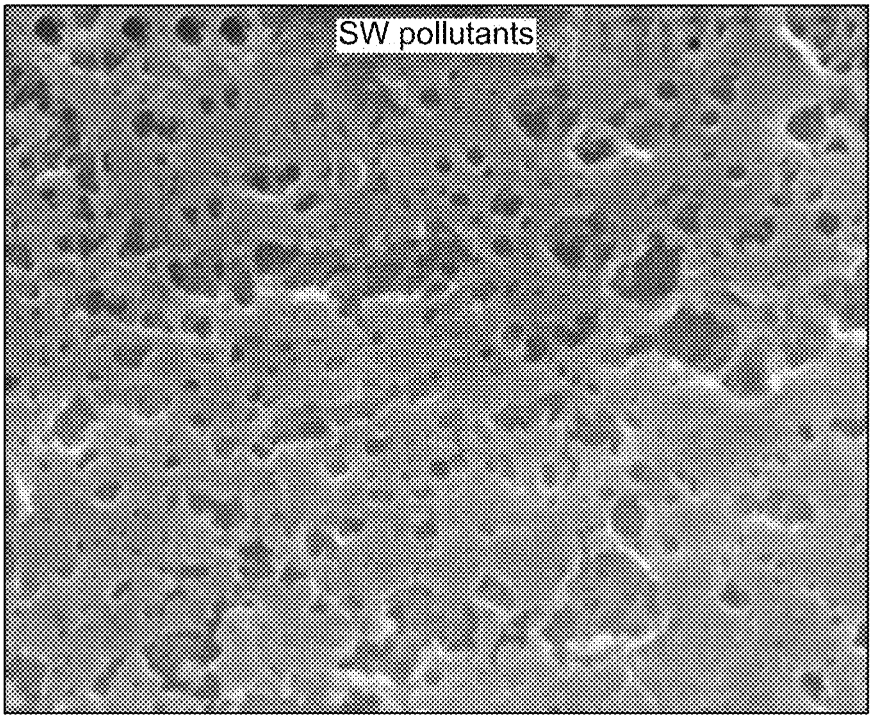
FIG. 6E shows SEM image of the M-0.2 nanocomposite membrane after membrane filtration for synthetic water (SW) pollutants, according to certain embodiments.
Figure 7A:
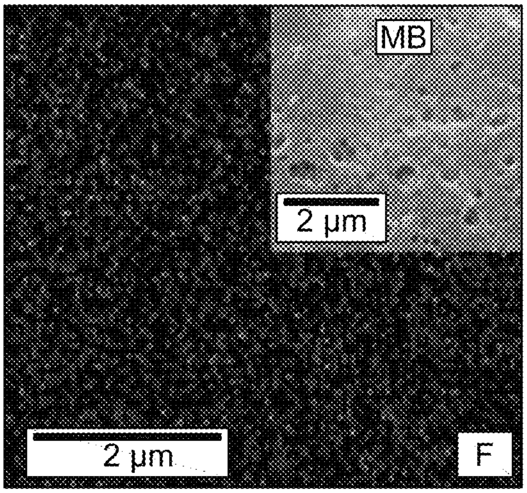
FIGS. 7A-7D depict elemental mapping of fluorine, sulfur, chlorine, and nitrogen, respectively, of the M-0.2 nanocomposite membrane after membrane filtration for the MB dye obtained by energy dispersive X-ray (EDX) spectroscopy, according to certain embodiments.
Figure 7B:
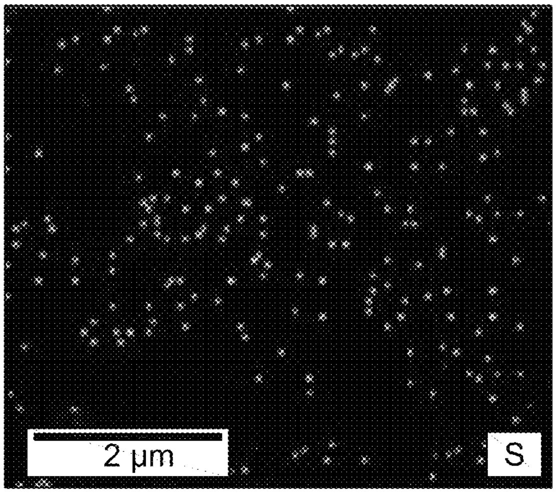
Figure 7C:
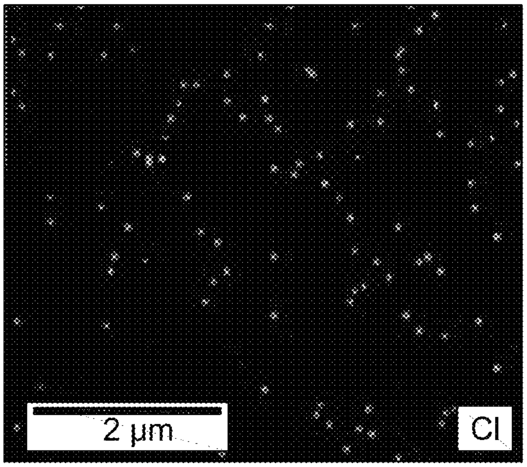
Figure 7D:
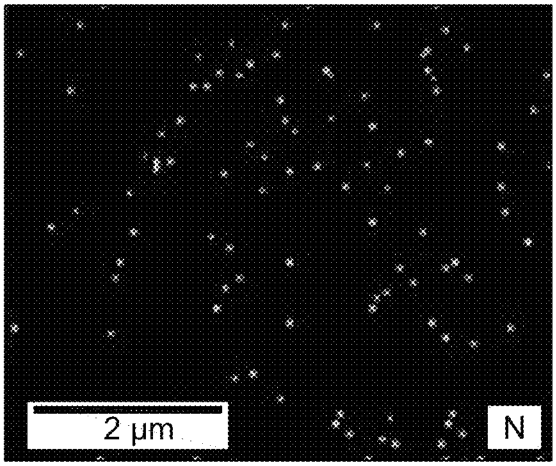
Figure 7E:
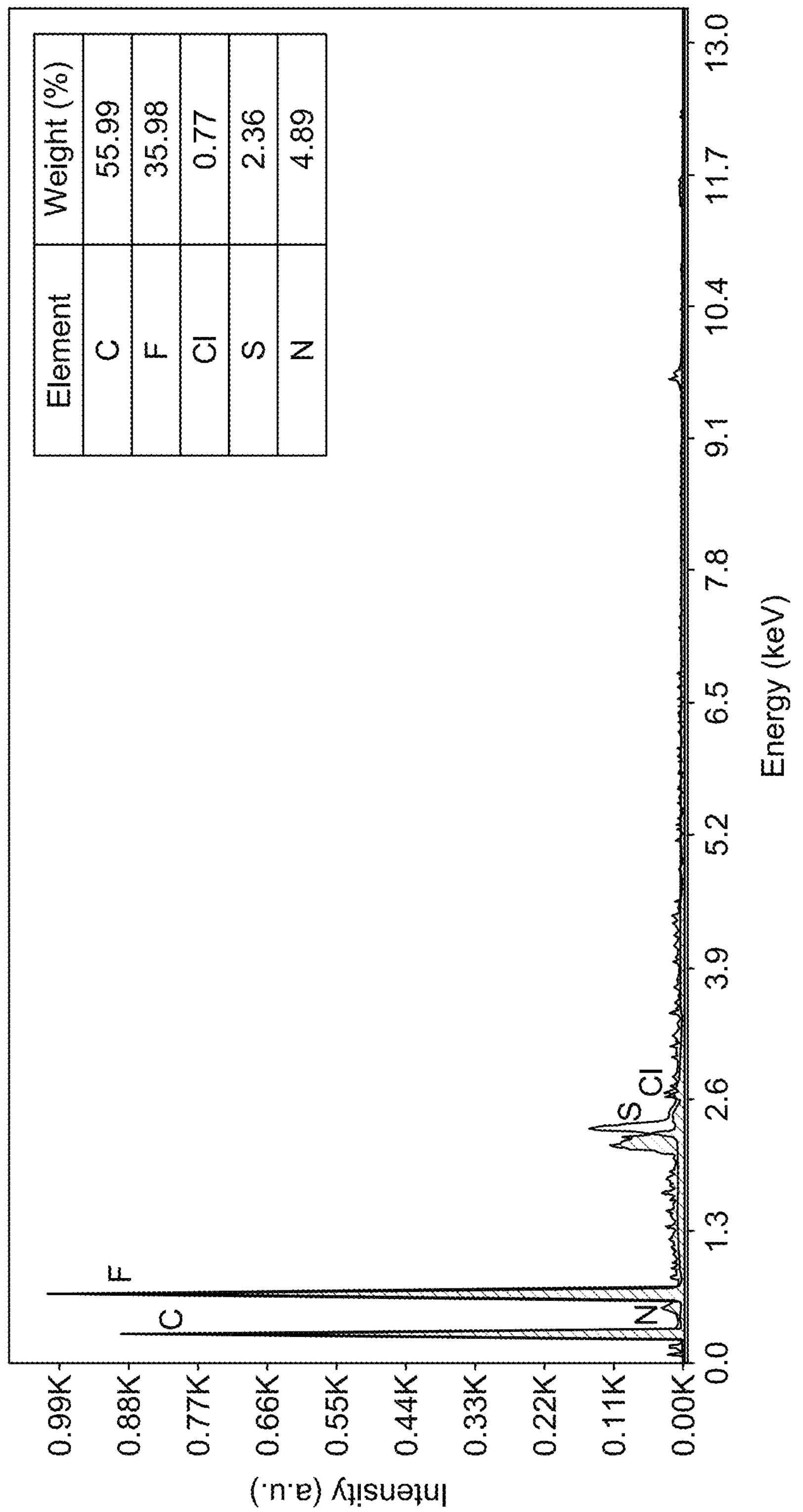
FIG. 7E shows an elemental analysis spectrum of the M-0.2 nanocomposite membrane after membrane filtration for the MB dye, according to certain embodiments.
Figure 8A:
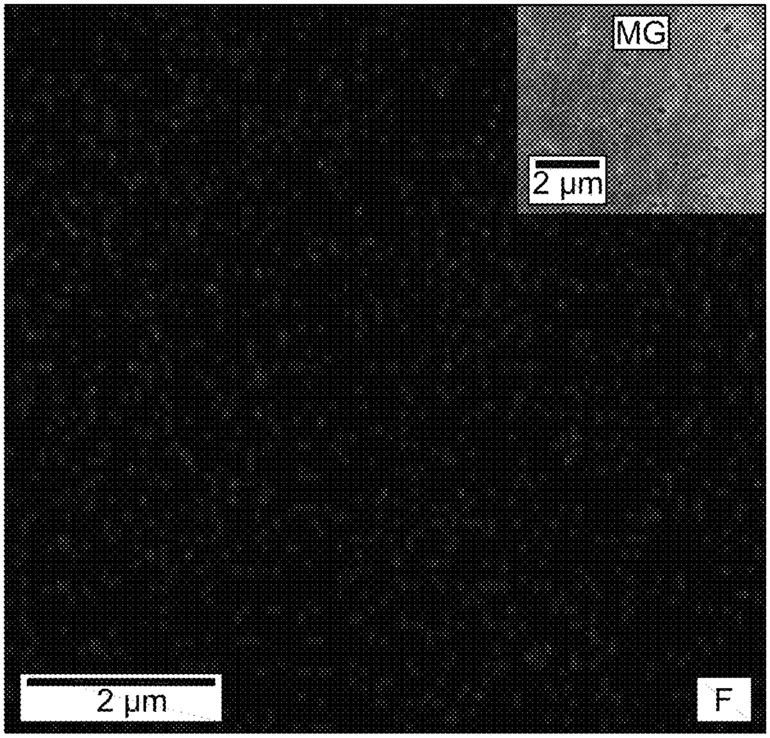
FIGS. 8A-8C depict elemental mapping of fluorine, chlorine, and nitrogen, respectively, of the M-0.2 nanocomposite membrane after membrane filtration for the MG dye obtained by EDX spectroscopy, according to certain embodiments.
Figure 8B:
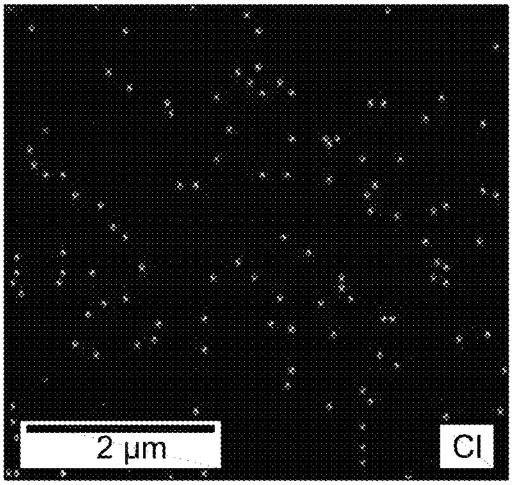
Figure 8C:
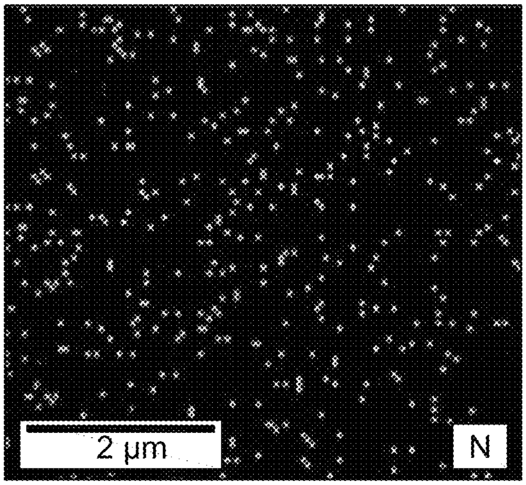
Figure 8D:
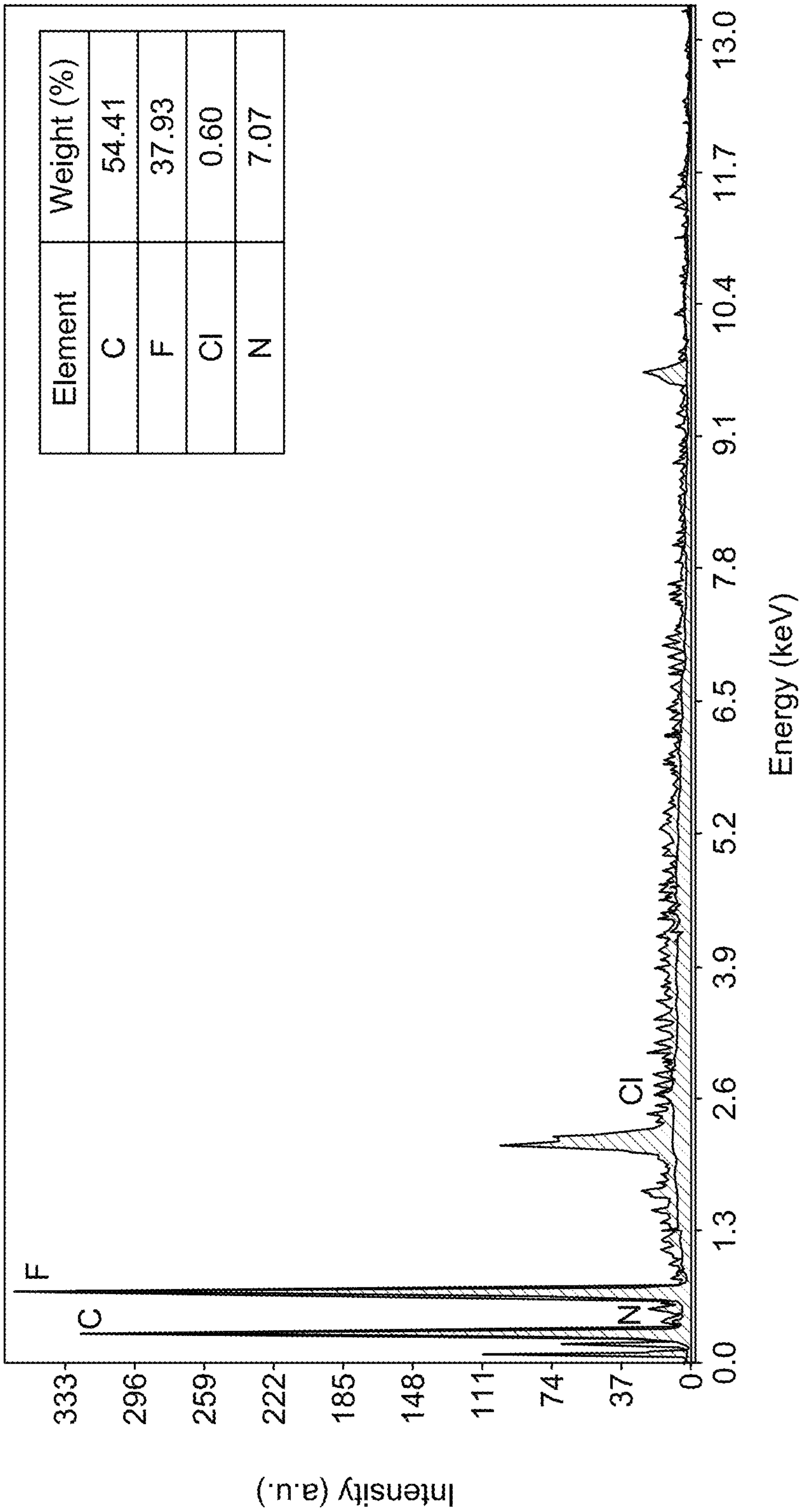
FIG. 8D shows an elemental analysis spectrum of the M-0.2 nanocomposite membrane after membrane filtration for the MG dye, according to certain embodiments.
Figure 9A:
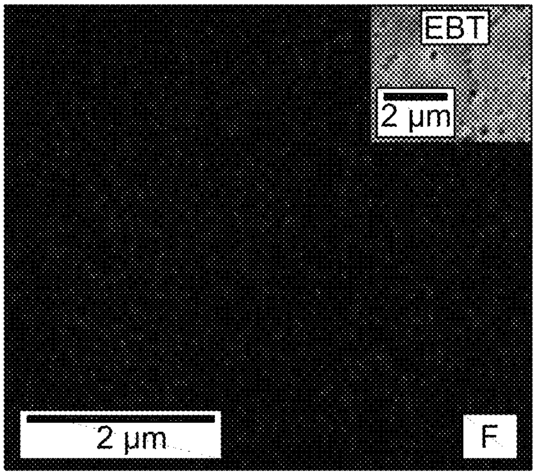
FIGS. 9A-9D depict elemental mapping of fluorine, sulfur, sodium, and nitrogen, respectively, of the M-0.2 nanocomposite membrane after membrane filtration for the EBT dye obtained by EDX spectroscopy, according to certain embodiments.
Figure 9B:
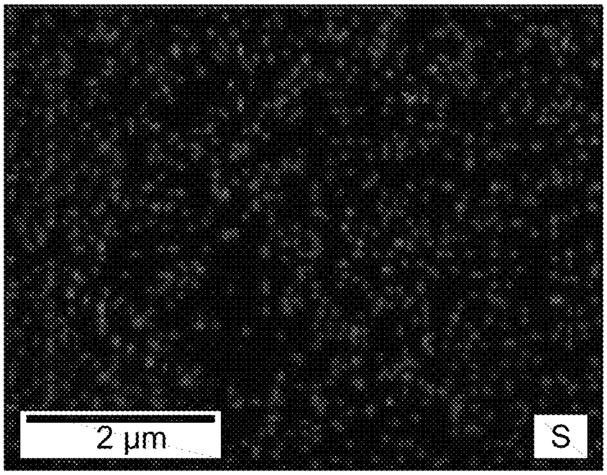
Figure 9C:
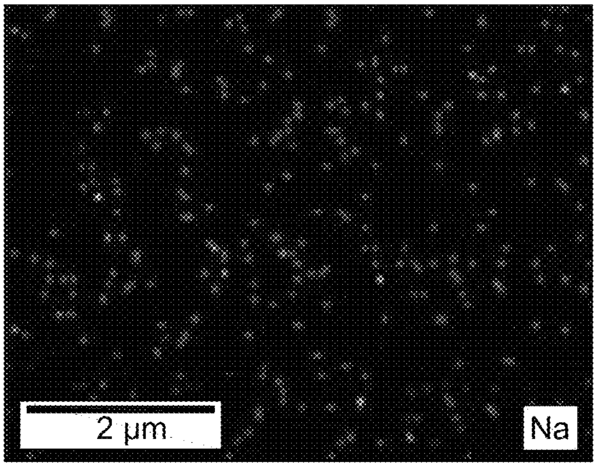
Figure 9D:
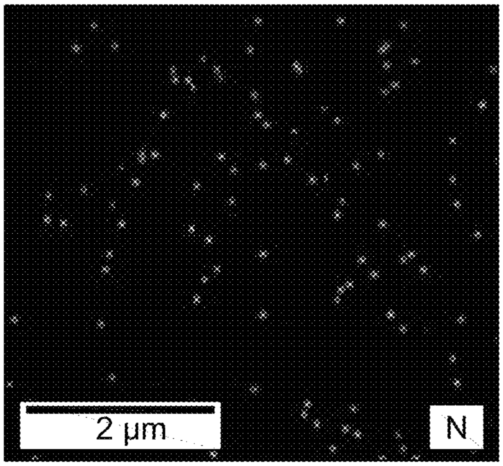
Figure 9E:
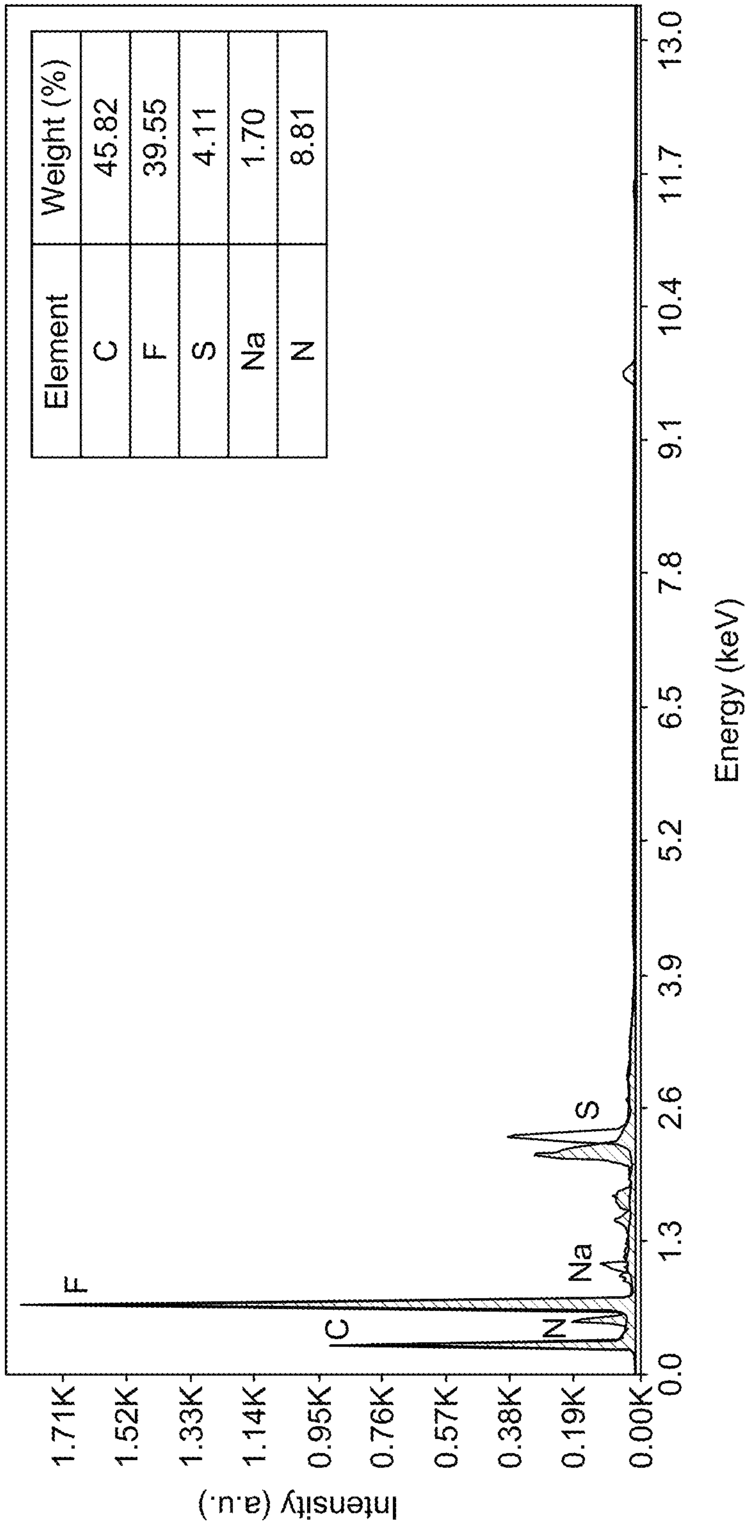
FIG. 9E shows an elemental analysis spectrum of the M-0.2 nanocomposite membrane after membrane filtration for the EBT dye, according to certain embodiments.
Figure 10A:
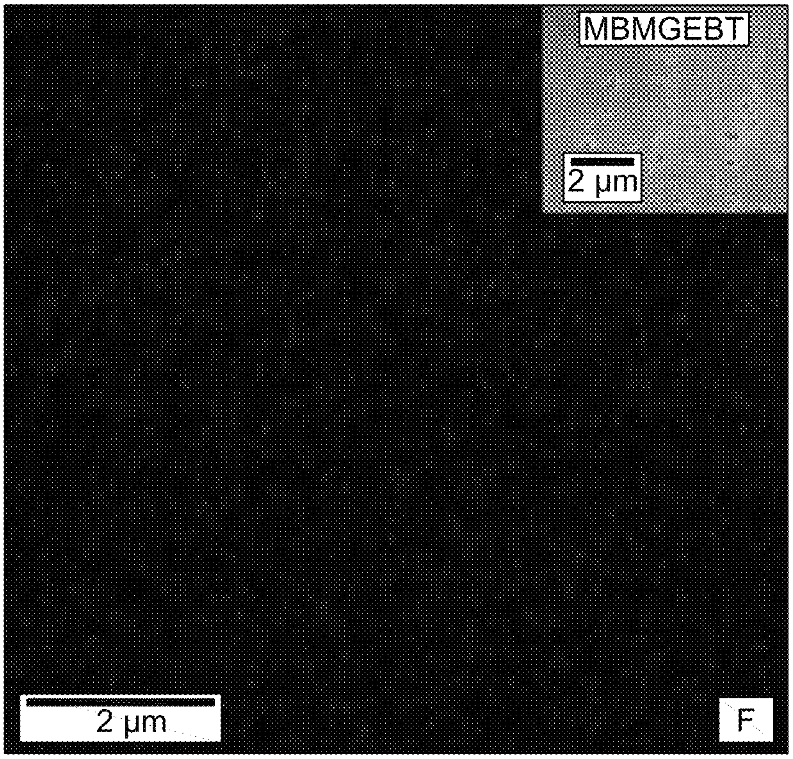
FIGS. 10A-10E depict elemental mapping of fluorine, sulfur, sodium, nitrogen, and chlorine, respectively, of the M-0.2 nanocomposite membrane after membrane filtration for the MBMGEBT dye obtained by EDX spectroscopy, according to certain embodiments.
Figure 10B:
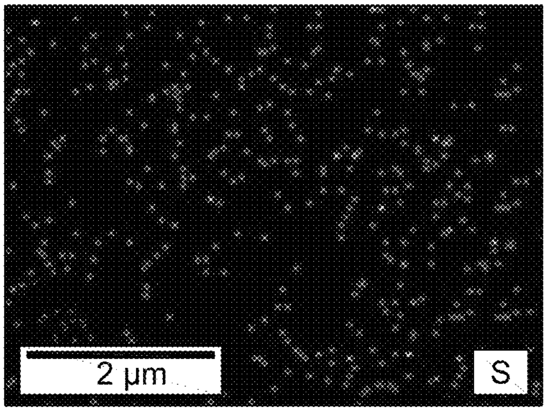
Figure 10C:
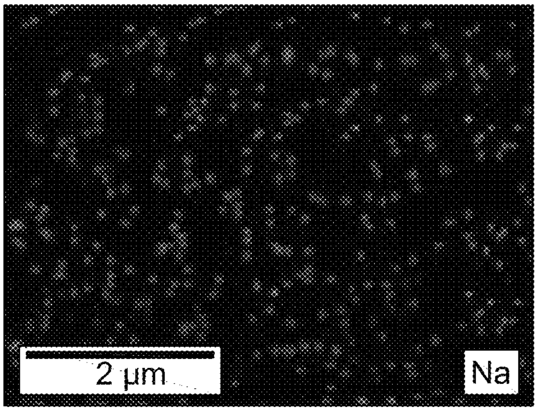
Figure 10D:
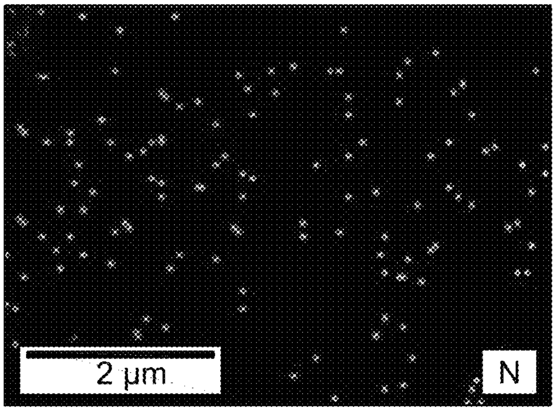
Figure 10E:
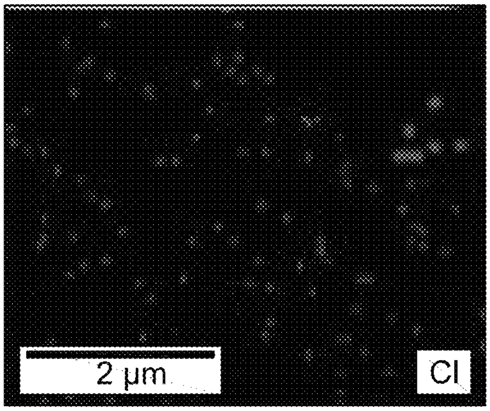
Figure 10F:
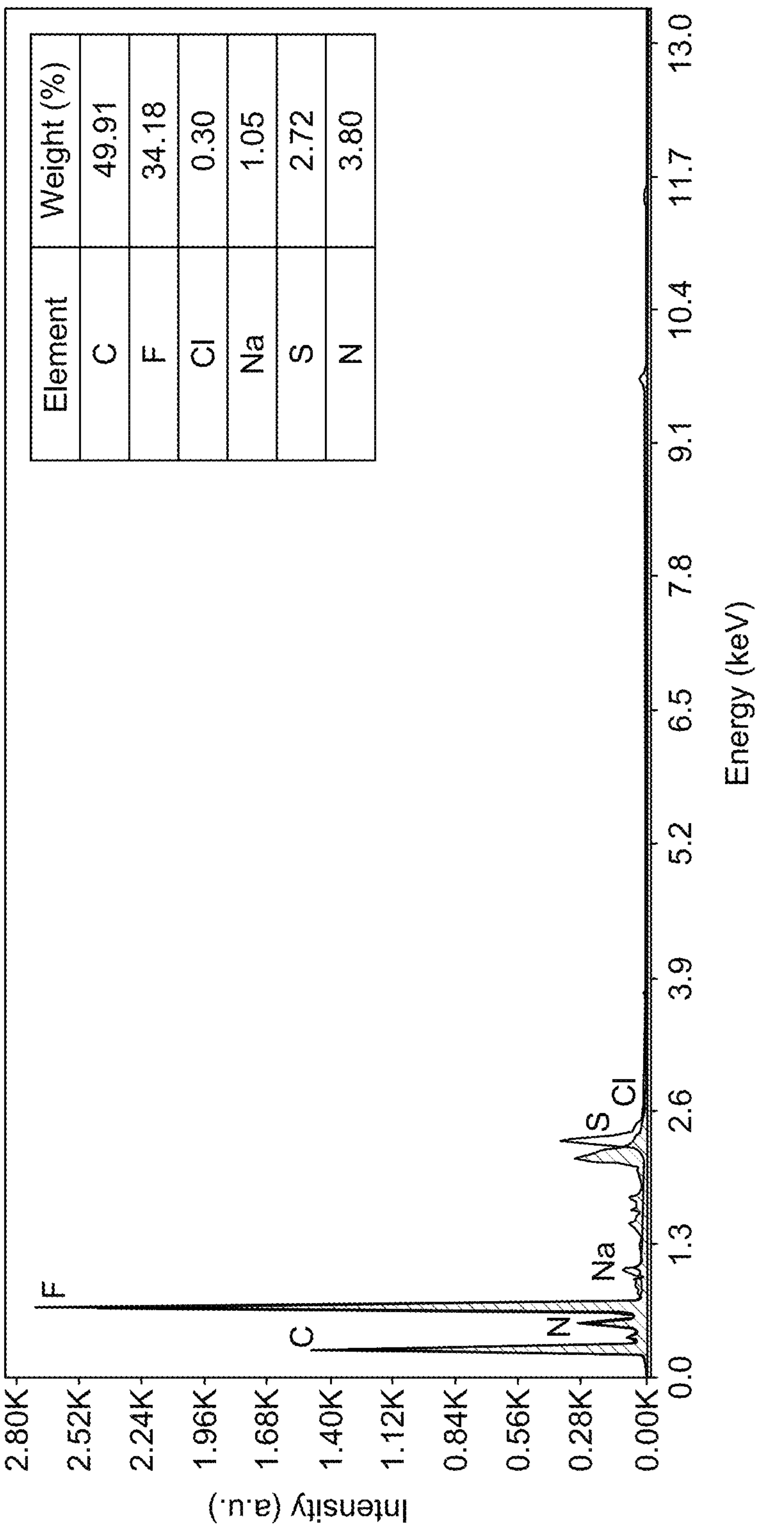
FIG. 10F shows an elemental analysis spectrum of the M-0.2 nanocomposite membrane after membrane filtration for the MBMGEBT dye, according to certain embodiments.
Figure 11A:
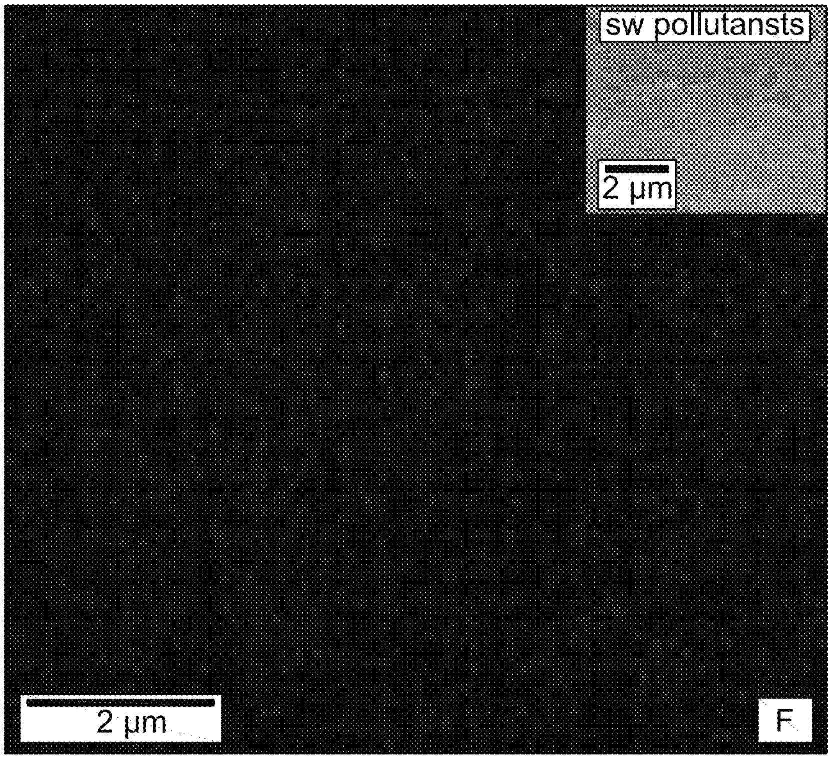
FIG. 11A-11D depict elemental mapping of fluorine, lead, cadmium, and chromium, respectively, of the M-0.2 nanocomposite membrane after membrane filtration for seawater (SW) pollutants obtained by EDX spectroscopy, according to certain embodiments.
Figure 11B:
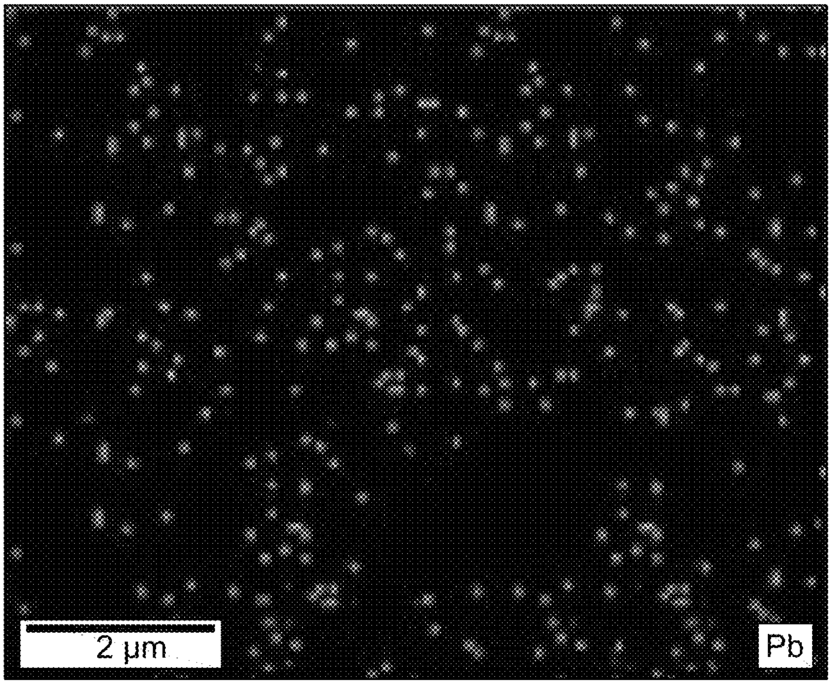
Figure 11C:
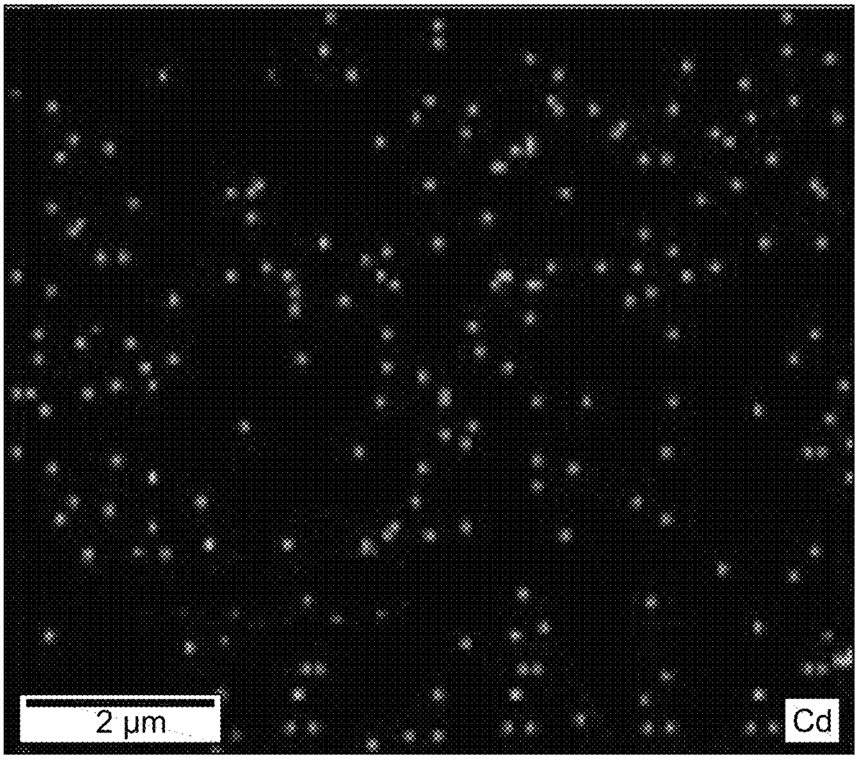
Figure 11D:
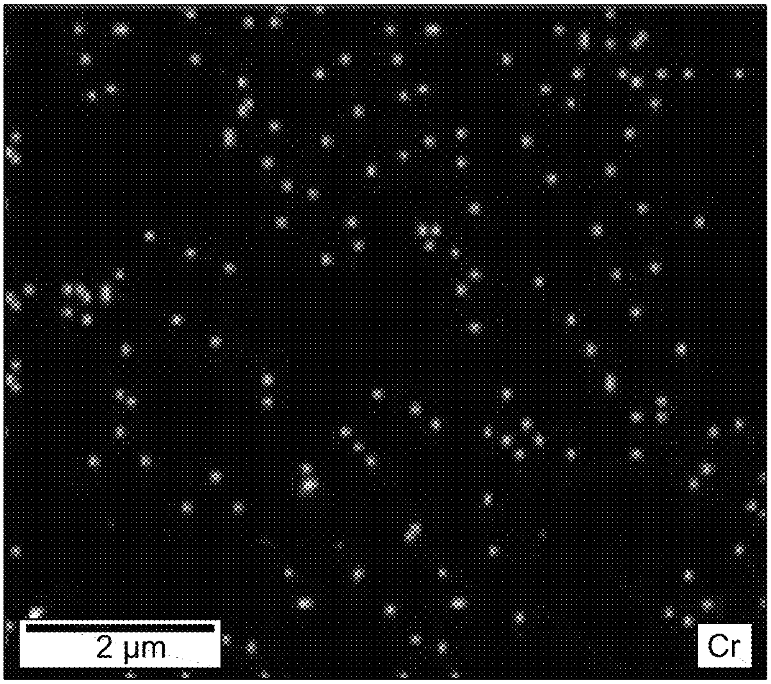
Figure 11E:
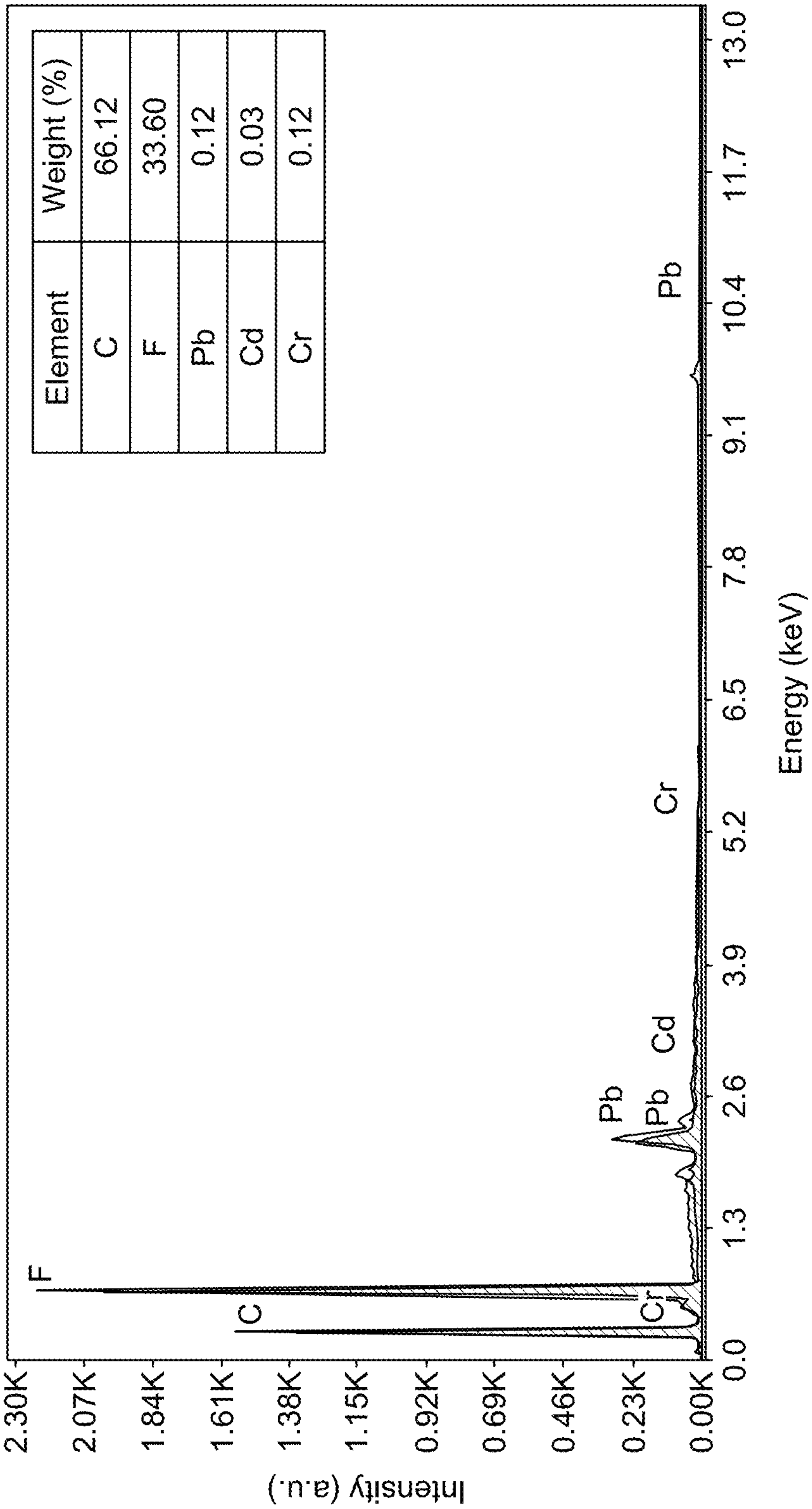
FIG. 11E shows an elemental analysis spectrum of the M-0.2 nanocomposite membrane after membrane filtration for the SW pollutants, according to certain embodiments.

To study the morphological details of the M-0.2 nanocomposite membrane after treatment against dyes and SW pollutants, SEM analysis was conducted. A reduction in pores can be noticed in the presented SEM images (FIG. 6A-6E), in comparison to M-0.2 nanocomposite membrane before treatment (as seen in FIG. 5G). Among SEM images of the M-0.2 nanocomposite membrane after filtration of dyes (FIGS. 6A-6D), the minimum number of pores were observed in FIG. 6B, which exhibits the removal of MG dye molecules through filtration as the maximum dye molecules got retained on the membrane's surface, thus covering and shrinking the membrane's pores. Similarly, for SW pollutants, a reduction in pores can be observed owing to the coverage of pollutant molecules over the membrane surface.

FIG. 7 to FIG. 10 presents the EDX analysis of the dyes on the M-0.2 nanocomposite membrane after the membrane filtration process. The EDX spectrum and elemental mapping of dyes (MB, MG, EBT, and MBMGEBT) confirm the presence of elements such as, F, Mo, Fe, S, Cl, and N for MB, F, Mo, Fe, Cl, and N for MG, F, Mo, Fe, S, Na, and N for EBT, and F, Mo, Fe, S, Na, Cl, and N for MBMGEBT in the sample. Furthermore, the elemental analysis mapping indicates the homogeneous distribution of the respective elements into the membrane matrices. FIG. 11 shows the EDX spectrum of SW pollutants confirming the presence of the toxic metals cadmium (Cd), lead (Pb), and chromium (Cr) in the membrane matrix, and the elemental analysis mapping depicts the homogeneous distribution of these elements in the sample.

Comparison of rejection efficiency and flux rates of various membranes are presented in Table 3.

TABLE 3

Comparison of the rejection efficiency and flux rate of understudied water pollutants with the results reported in previous studies

| Membrane materials | Rejection efficiency (%) | Flux rate (L $m^{-2}$ $h^{-1}$) | References |
|---|---|---|---|
| Methylene blue | | | |
| PVDF/GO | 96.6 | 170.2 | 1 |
| PS/$SiO_2$ | 84.73 | 136 | 2 |
| PES/Ag/GO | 90 | 120 | 3 |
| This work | 97.74 | 264 | |
| Malachite green | | | |
| PES/Fe/MOF | 98.5 | 165.7 | 4 |
| ZIF-8/Chitosan/PVA | 90.3 | 78.94 | 5 |
| Keratin/PA | 96 | 70 | 6 |
| This work | 99.26 | 277 | |
| Eriochrome black T | | | |
| PA/g-$C_3N_4$ | 99.5 | 55.7 | 7 |
| HP-β-CD/Pebax | 96 | 8.7 | 8 |
| PA/TEPA/TPC | 99 | 88.57 | 9 |
| This work | 96.1 | 259 | |
| Turbidity | | | |
| GO-ZnO/PES | 92 | 11.51 | 10 |
| Sm/Z6 | 94.11 | 95 | 11 |
| PVC-$TiO_2$ NPs | 98.1 | 82.5 | 12 |
| This work | 98.7 | 260 | |
| TDS | | | |
| NF270 | 60 | 58.5 | 13 |
| NF-MCDI | 64 | 120 | 14 |

TABLE 3-continued

Comparison of the rejection efficiency and flux rate of understudied water pollutants with the results reported in previous studies

| Membrane materials | Rejection efficiency (%) | Flux rate (L $m^{-2}$ $h^{-1}$) | References |
|---|---|---|---|
| PES-UF | 53 | 75 | 15 |
| This work | 63.4 | 260 | |
| | TOC | | |
| EF-REM | 55 | 95 | 16 |
| PMR-$ZnIn_2S_4$ | 57 | 84 | 17 |
| ZnO-NF | 70 | 120 | 18 |
| This work | 81.3 | 260 | |
| | Pb | | |
| GO-IPDI | 70 | 100 | 19 |
| Ferrihydrite NPs/PES | 90 | 128.59 | 20 |
| CA/$TiO_2$ | 91 | 16 | 21 |
| This work | 100 | 260 | |
| | Cd | | |
| MSNs-PSU | 90 | 13 | 22 |
| PANI nanofibers | 97.38 | 87.2 | 23 |
| $Fe_3O_4$@$SiO_2$-$NH_2$-PES | 93 | 65 | 24 |
| This work | 100 | 260 | |
| | Cr | | |
| Sm/Z6 | 89 | 95 | 11 |
| nZVI@TiO2-TFC | 97.4 | 39.7 | 25 |
| Fe-Ag/f-MWCNT/PES | 94 | 36.9 | 26 |
| This work | 100 | 260 | |

'1' refers to Ahmad. H., Zahid. M., Rehan. Z. A., Rashid, A., Akram. S., Aljohani. M. M. H., Mustafa. S. K., Khalid. T., Abdelsalam, N. R., Gharecb, R. Y., Al-Harbi. M. S. Preparation of Polyvinylidene Fluoride Nano-Filtration Membranes Modified with Functionalized Graphene Oxide for Textile Dye Removal. *Membranes,* 2022, 12, 224; '2' refers to Ali, M. E. A., Shahat, A., Ayoub, T. A., Kamel, R. M. Fabrication of High Flux Polysulfone/Mesoporous Silica Nanocomposite Ultrafiltration Membranes for Industrial Wastewater Treatment. *Biointerface Res. Appl. Chem,* 2020, 12, 7556-7572; '3' refers to Chukwuati, C. N. and Moutloali, R. M. Antibacterial Studies of Ag@HPEI@GO Nanocomposites and Their Effects on Fouling and Dye Rejection in PES UF Membranes. *Heliyon,* 2022, 8, 11; '4' refers to Johari, N. A. Yusof, N., Lau, W. J., Abdullah, N., Salleh, W. N. W., Jaafar, J., Aziz, F. Ismail, A. F. Polyethersulfone Ultrafiltration Membrane Incorporated with Ferric-Based Metal-Organic Framework for Textile Wastewater Treatment. *Sep. Purif. Technol,* 2021, 270, 118819; '5' refers to Khajavian, M., Salehi, E., Vatanpour V. Nanofiltration of Dye Solution Using Chitosan/Poly (Vinyl Alcohol)/ZIF-8 Thin Film Composite Adsorptive Membranes with PVDF Membrane beneath as Support. *Carbohydr. Polym.,* 2020, 247, 116693; '6' refers to David, P. S., Karunanithi A., Fathima, N. N. Improved Filtration for Dye Removal Using Keratin-Polyamide Blend Nanofibrous Membranes. *Environ. Sci. Pollut. Res.,* 2020, 27, 45629-45638; '7' refers to Baig, U., Waheed, A., Aljundi, I. H., AbuMousa, R. A. Facile Fabrication of Graphitic Carbon Nitride Nanosheets and Its Integrated Polyamide Hyper-Cross-Linked TFC Nanofiltration Membrane with Intrinsic Molecular Porosity for Salts and Organic Pollutant Rejection from Water. *J. Mater. Res. Technol.,* 2021, 15, 6319-6328; '8' refers to Jia, M., Liang, Y., Liu, Z., Liu, Y., Zhang, X., Guo, H. Hydroxypropyl-β-Cyclodextrin-Incorporated Pebax Comosite Membrane for Improved Permselectivity in Organic Solvent Nanofiltration. *RSC Adv.,* 2022, 12, 16893-16902; '9' refers to Baig, U., Jillani, S. M. S., Waheed, A., Ansari, M. A. Exploring a Combination of Unconventional Monomers for Fabricating a Hyper-Cross-Linked Polyamide Membrane with Anti-Fouling Properties for Production of Clean Water. *Process Saf. Environ. Prot.,* 2022, 165, 496-504; '10' refers to Kusworo, T. D., Kumoro, A. C., Aryanti, N., Utomo, D. P. Removal of Organic Pollutants from Rubber Wastewater Using Hydrophilic Nanocomposite RGO-ZnO/PES Hybrid Membranes. *J. Environ. Chem. Eng.,* 2021, 9, 106421; '11' refers to Aloulou, W., Aloulou, H., Khemakhem, M., Duplay, J., Daramola, M. O., Amar, R. B. Synthesis and Characterization of Clay-Based Ultrafiltration Membranes Supported on Natural Zeolite for Removal of Heavy Metals from Wastewater. *Environ. Technol. Innov.,* 2020, 18, 100794; '12' refers to Al-Ani, F. H., Alsalhy, Q. F., Raheem, R. S., Rashid, K. T., Figoli, A. Experimental Investigation of the Effect of Implanting TiO2-NPs on PVC for Long-Term UF Membrane Performance to Treat Refinery Wastewater. *Membranes,* 2020, 10, 77; '13' refers to Lau, W. J., Ismail, A. F., Firdaus, S., 2013. Car Wash Industry in Malaysia: Treatment of Car Wash Effluent Using Ultrafiltration and Nanofiltration Membranes. *Sep. Purif. Technol.,* 2013, 104, 26-31; '14' refers to Jeong, K., Yoon, N., Park, S., Son, M., Lee, J., Park, J., Cho, K. H. Optimization of a Nanofiltration and Membrane Capacitive Deionization (NF-MCDI) Hybrid System: Experimental and Modeling Studies. *Desalination,* 2020, 493, 114658; '15' refers to Nazia, S., Sahu, N., Jegatheesan, V., Bhargava, S. K., Sridhar, S. Integration of Ultrafiltration Membrane Process with Chemical Coagulation for Proficient Treatment of Old Industrial Landfill Leachate. *Chem. Eng. J.,* 2021, 412, 128598; '16' refers to Trellu, C., Rivallin, M., Cerneaux, S., Coetsier, C., Causserand, C., Oturan, M. A., Cretin, M. Integration of Sub-Stoichiometric Titanium Oxide Reactive Electrochemical Membrane as Anode in the Electro-Fenton Process. *Chem. Eng. J.,* 2020, 400, 125936; '17' refers to Gao, B., Chen, W., Liu, J., An, J., Wang, L., Zhu, Y., Sillanpää, M. Continuous Removal of Tetracycline in a Photocatalytic Membrane Reactor (PMR) with $ZnIn_2S_4$ as Adsorption and Photocatalytic Coating Layer on PVDF Membrane. *J. Photochem. Photobiol. A.,* 2018, 364, 732-739; '18' refers to Yadav, A., Sharma, P., Panda, A. B., Shahi, V. K. Photocatalytic TiO2 incorporated PVDF-co-HFP UV-cleaning mixed matrix membranes for effective removal of dyes from synthetic wastewater system via membrane distillation. *Journal of Environmental Chemical Engineering,* 2021, 9, 105904; '19' refers to Castro-Muñoz, R., González-Melgoza, L. L., García-Depraect, O. Ongoing Progress on Novel Nanocomposite Membranes for the Separation of Heavy Metals from Contaminated Water. *Chemosphere,* 2021, 270, 129421; '20' refers to He, J., Xiong, D., Zhou, P., Xiao, X., Ni, F., Deng, S., Shen, F., Tian, D., Long, L., Luo, L. A Novel Homogenous In-Situ Generated Ferrihydrite Nanoparticles/Polyethersulfone Composite Membrane for Removal of Lead from Water: Development, Characterization, Performance and Mechanism. *Chem. Eng. J.,* 2020, 393, 124696; '21' refers to Nouri, M. and Marjani, A. Surface Modification of a Cellulose Acetate Membrane Using a Nanocomposite Suspension Based on Magnetic Particles. *Cellulose,* 2019, 26, 7995-8006; '22' refers to Alotaibi, A. A., Shukla, A. K., Mrad, M. H., Alswieleh, A. M., Alotaibi, K. M. Fabrication of Polysulfone-Surface Functionalized Mesoporous Silica Nanocomposite Membranes for Removal of Heavy Metal Ions from Wastewater. *Membranes,* 2021, 11, 935; '23' refers to Senusi, F., Shahadat, M., Ismail, S., Hamid, S. A. Recent Advancement in Membrane Technology for Water Purification, in: Oves, M., Khan, M. Z., Iqbal., M. I. I. (Eds.), Modern Age Environmental Problems and Their Remediation, Springer International Publishing, *Springer,* 2018, pp. 147-67; '24' refers to Kamari, S. and Shahbazi, A. Biocompatible $Fe_3O_4@SiO_2—NH_2$ Nanocomposite as a Green Nanofiller Embedded in PES-Nanofiltration Membrane Matrix for Salts, Heavy Metal Ion and Dye Removal: Long-Term Operation and Reusability Tests. *Chemosphere,* 2020, 243, 125282; '25' refers to Kazemi, M., Jahanshahi, M., Peyravi, M., 2018. Hexavalent Chromium Removal by Multilayer Membrane Assisted by Photocatalytic Couple Nanoparticle from Both Permeate and Retentate. *J. Hazard. Mater.,* 2018, 344, 12-22; and '26' refers to Masheane, M. L., Nthunya, L. N., Malinga, S. P., Nxumalo, E. N., Mamba, B. B., Mhlanna, S. D. Synthesis of Fe—Ag/f-MWCNT/PES Nanostructured-Hybrid Membranes for Removal of Cr (VI) from Water. *Sep. Purif. Technol.,* 2017, 184, 79-87, all of which are incorporated herein by reference in their entireties.

Figure 12:
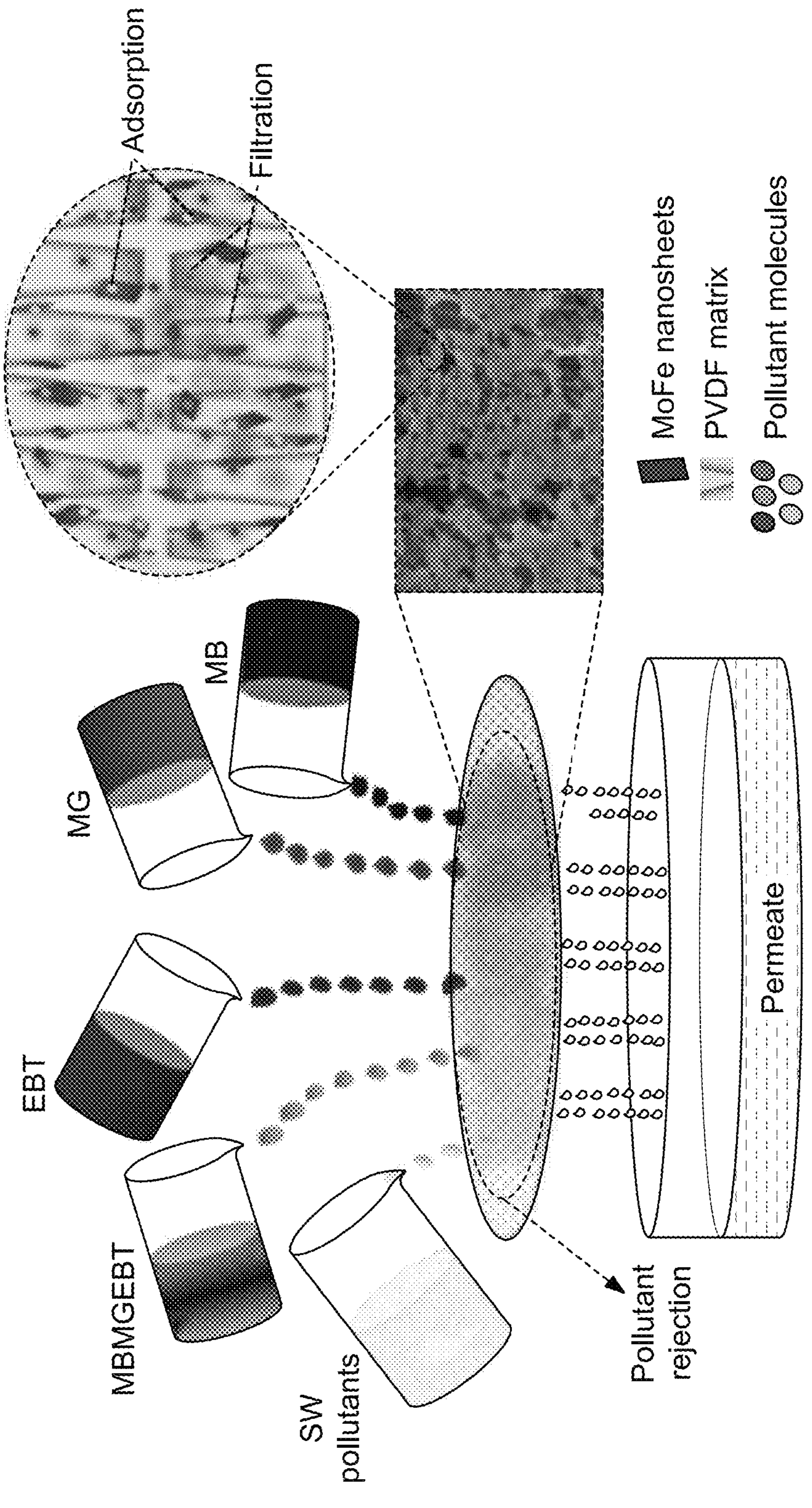
FIG. 12 shows a photographic illustration of a filtration mechanism during membrane filtration of dyes and SW pollutants, according to certain embodiments.

FIG. 12 exhibits the description of the proposed membrane filtration mechanism considering the relevant studies [Y. J. Lim, S. M. Lee, R. Wang, J. Lee, Emerging Materials to Prepare Mixed Matrix Membranes for Pollutant Removal in Water, *Membranes.* 11 (2021) 508; and L. Qalyoubi, A. Al-Othman, S. Al-Asheh, Recent progress and challenges on adsorptive membranes for the removal of pollutants from wastewater. *Part I: Fundamentals and classification of membranes, Case Studies in Chemical and Environmental Engineering.* 3 (2021) 100086, both of which are incorporated herein by reference in their entireties]. When the size of solute (pollutant molecules) is bigger than the pore size of the membrane, the size exclusion (filtration) mechanism happens; however, if the solute particles are smaller than or comparable to membrane pores, the adsorption phenomenon becomes dominant [M. G. Shin, W. Choi, S.-J. Park, S. Jeon, S. Hong, J.-H. Lee, Critical review and comprehensive analysis of trace organic compound (TOrC) removal with polyamide RO/NF membranes: Mechanisms and materials, *Chemical Engineering Journal.* 427 (2022) 130957, incorporated here by reference in its entirety]. The loading of MoFe nanosheets facilitated proper dispersion and adhesion throughout the PVDF polymer structure which increased membrane porosity and increased an affinity for pollutants by increasing adsorption capacity [A. M. Nasir, P. S. Goh, M. S. Abdullah, B. C. Ng, A. F. Ismail, Adsorptive nanocomposite membranes for heavy metal remediation: Recent progresses and challenges, *Chemosphere.* 232 (2019) 96-112, incorporated herein by reference in its entirety]. Thus, the synergistic effect of MoFe nanosheets and membrane developed two mechanisms (filtration and adsorption). When the water containing multiple pollutants (dyes and SW pollutants) approached the membrane surface, sieving of pollutant molecules took place as the particles of contaminants larger than the pores of the membrane retained on the membrane surface. Other solute particles attach to MoFe nanosheets, leading to complexation, which resulted in purified permeate. Arsenic has been removed through an iron oxide-based nanocomposite membrane, which depicted the contaminant separation due to adsorption as well as the sieving mechanism [X. Zhang, X. Fang, J. Li, S. Pan, X. Sun, J. Shen, W. Han, L. Wang, S. Zhao, Developing new adsorptive membrane by modification of support layer with iron oxide microspheres for arsenic removal, *Journal of Colloid and Interface Science.* 514 (2018) 760-768, incorporated herein by reference in its entirety]. Similarly, ZnO, $Al_2O_3$, and $MnO_2$-based adsorptive nanocomposite membranes have exhibited potential for pollutant removal, especially heavy metals [J. Yin, B. Deng, Polymer-matrix nanocomposite membranes for water treatment, *Journal of Membrane Science.* 479 (2015) 256-275, incorporated herein by reference in its entirety]. The induced nanofillers can exceptionally enhance the membrane properties (especially adsorption capability) and in this study, the dual functional MoFe/PVDF-based nanocomposite membrane significantly improved the membrane permeance as well as the rejection of multiple contaminants.

Figure 13A:
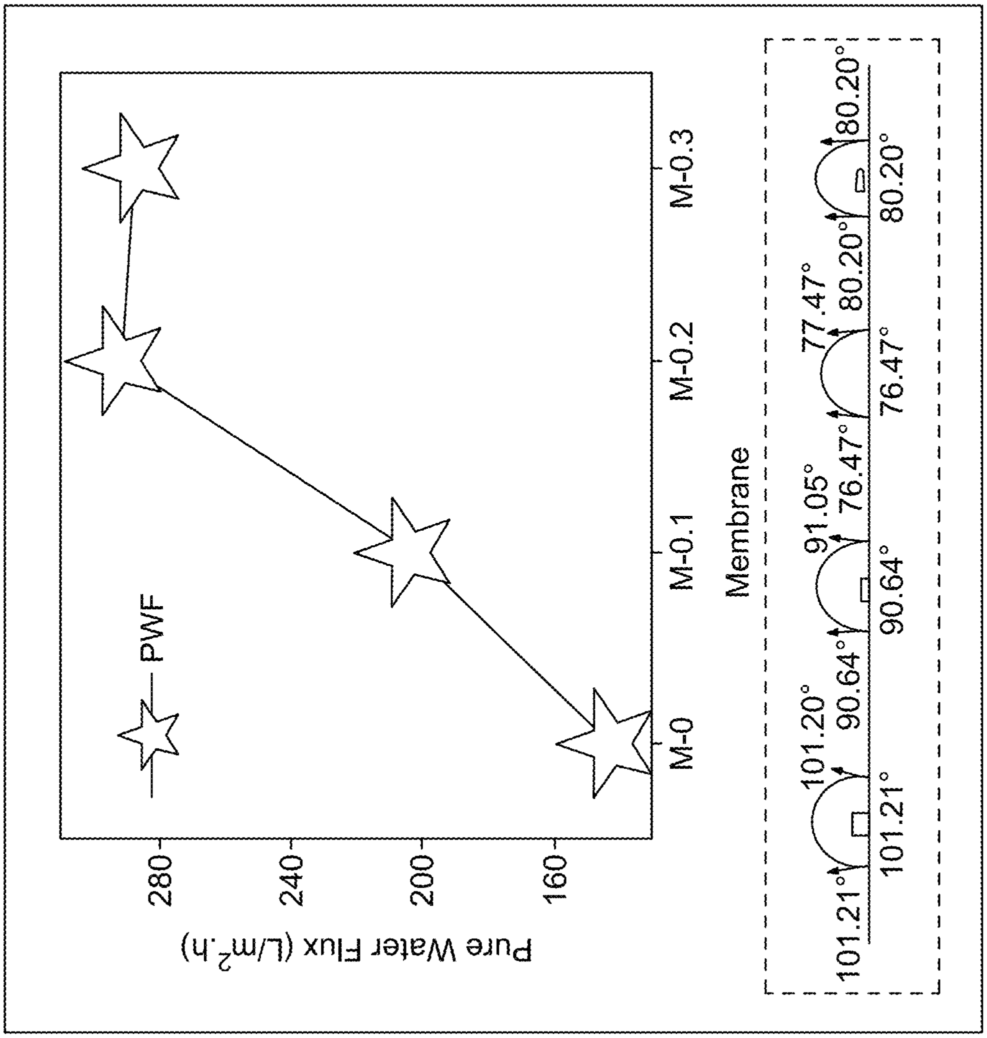
FIG. 13A shows pure water flux (PWF) and water contact angle studies for fabricated membranes (M-0, M-0.1, M-0.2, M-0.3), according to certain embodiments.
Figure 13B:
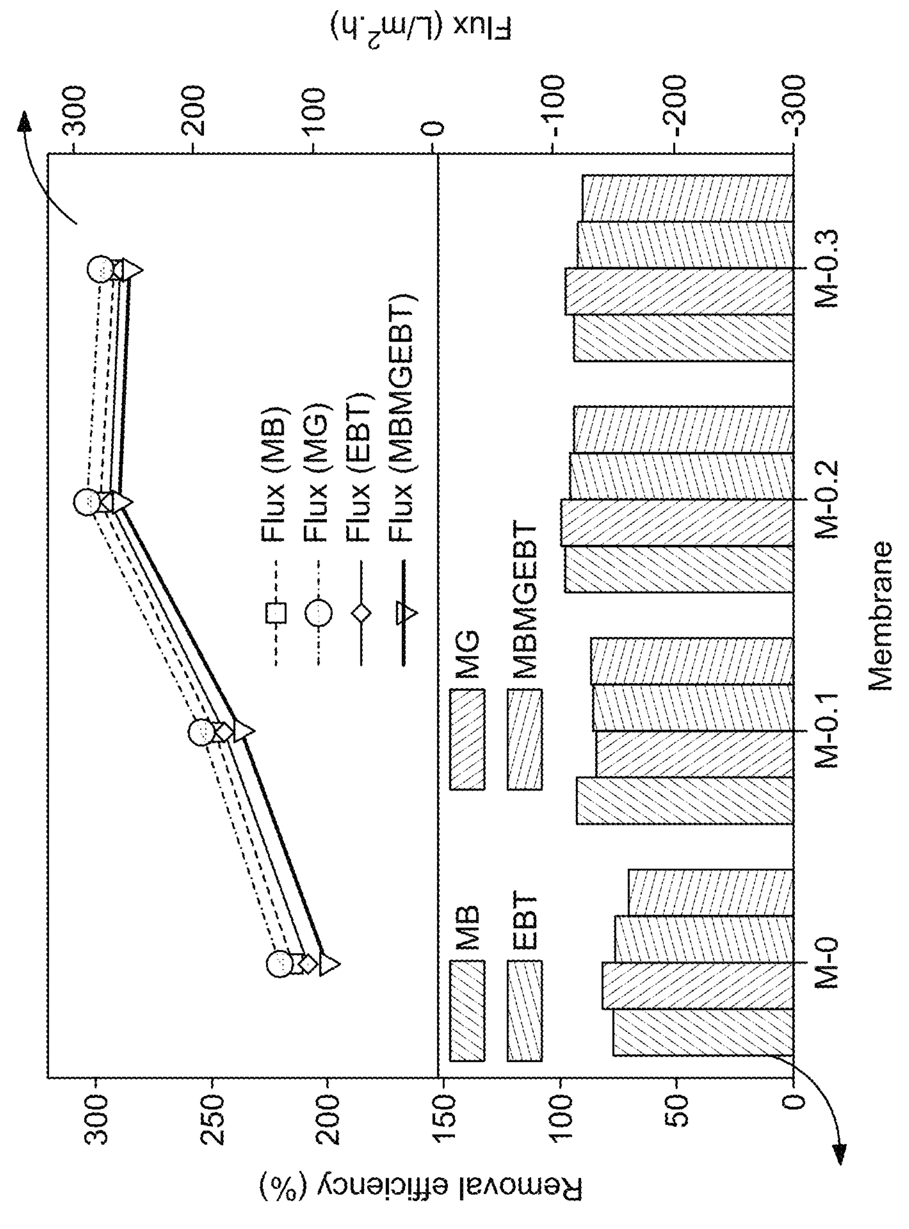
FIG. 13B shows dye sample flux rate and dye rejection efficiency against MG, MB, EBT, and MBMGEBT, for pure PVDF (M-0) and nanocomposite membranes (M-0.1, M-0.2, and M-0.3), according to certain embodiments.
Figure 13C:
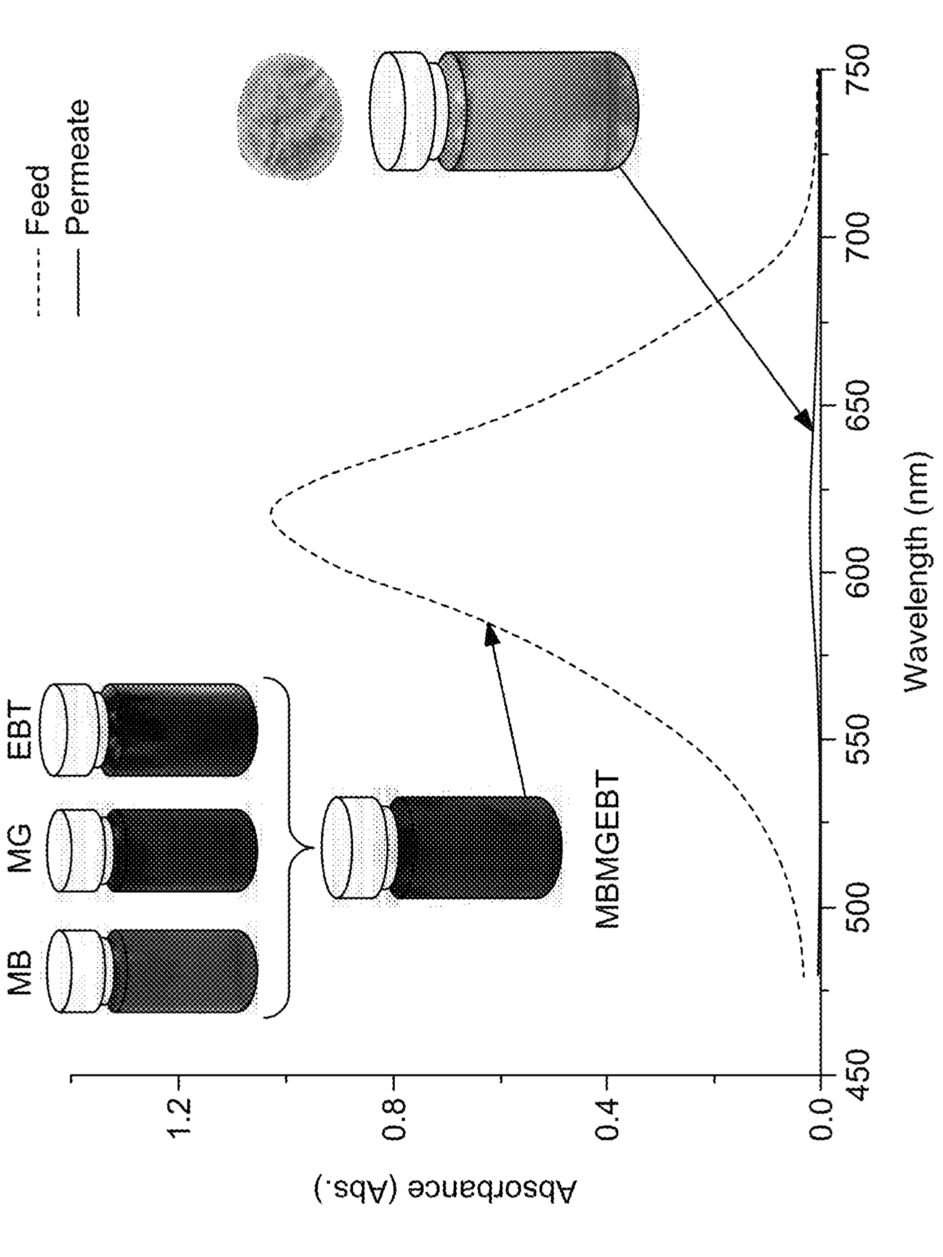
FIG. 13C shows ultraviolet-visible (UV-Vis) absorption spectrum for the MBMGEBT removal through membrane filtration studies using the M-0.2 nanocomposite membrane, according to certain embodiments.
Figure 13D:
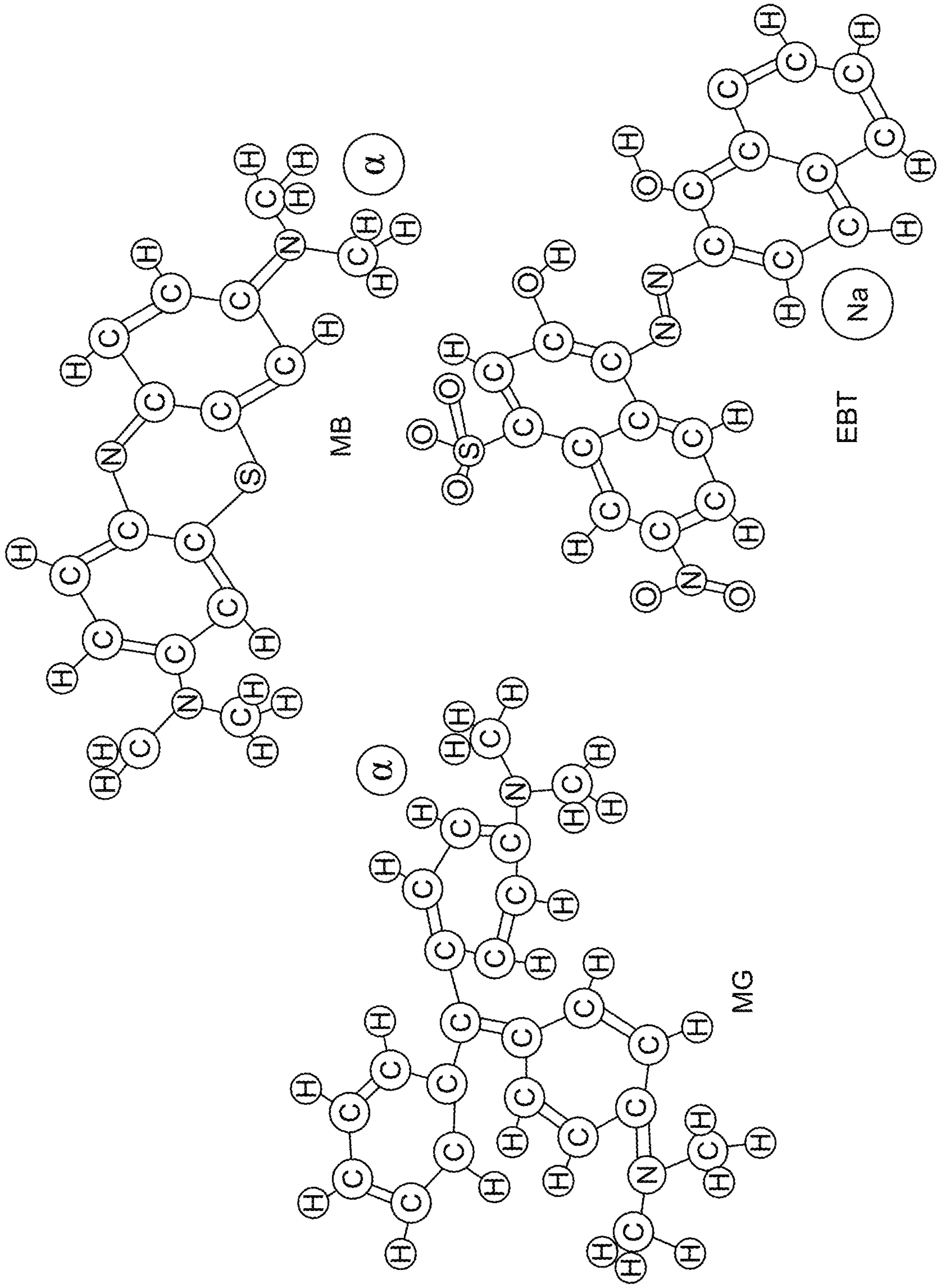
FIG. 13D shows the chemical structures of two cationic dyes (MB, MG) and an anionic dye (EBT) used to analyze their removal using MoFe/PVDF-based nanocomposite membranes, according to certain embodiments.

The results of pure water flux (PWF) and water contact angle to analyze hydrophilic and/or hydrophobic behavior for the fabricated membranes are presented in FIG. 13A. The membranes embedded with MoFe nanosheets revealed improved permeance compared to neat PVDF membrane owing to increased structural vacancies and hydrophilic behavior. The highest PWF was observed for M-0.2 nanocomposite membrane (292 $L/m^2$ h) which is around 1.2 times more than M-0 membrane (131 $L/m^2$ h). Further addition of MoFe content (M-0.3) into membrane resulted in agglomeration of nanostructures inside the membrane matrix, which blocked the membrane pores leading to a more hydrophobic membrane, thus producing reduced PWF compared to M-0.2 (287 $L/m^2$ h). Another reason for the reduced performance of the M-0.3 membrane is the increased viscosity of casting solution, which could not slow down the solvent and non-solvent exchange process, thus causing reduced hydrophilicity in the M-0.3 membrane. These explanations have further been verified by the water contact angle for the fabricated membranes. The neat PVDF membrane exhibited highest contact angle (101.21°) demonstrating the hydrophobic nature of membrane material, which was reduced with the gradual addition of MoFe nanosheets inside the membrane matrix as the water contact angle decreased to 76.47° (for M-0.2) due to enhanced hydrophilic behavior of nanocomposite membrane. With further addition of MoFe content in the membrane, the contact angle increased to 80.20° (for M-0.3), thus reducing the hydrophilicity in membranes due to excessive aggregation of nanosheets in the membrane network which decreased the PWF. To study the potential of MoFe nanosheets for the removal of dyes (MB, MG, EBT, MBMGEBT), their rejection efficiencies and flux rates at a slight pressure (0.05 bar) with the feed (100 ppm dye solutions) at a temperature of 25° C. were evaluated (FIG. 13B). The M-0 depicted minimum removal efficiency for the dyes (77.69% for MB, 80.62% for MG, 76.47% for EBT, and 70.3% for MBMGEBT) compared to the modified nanocomposite membranes. With the integration of MoFe content of up to 0.2% inside the membrane matrix, the removal of the dyes improved and the maximum rejection of all dyes achieved through M-0.2 nanocomposite membrane was 97.74% for MB, 99.26% for MG, 96.1% for EBT, and 94.3% for MBMGEBT, demonstrating that nanosheets acted as a sieve with beneficial separation features. Furthermore, the mutual impact of the nanosheets with the PVDF membrane established two mechanisms: adsorption and filtration. Such a bifunctional membrane proved to be efficient in dye removal from water. Moreover, improved number of voids inside the membranes tuned by MoFe nanosheets enhanced the adsorption active sites on the membrane surface, making easy accessibility for dye molecules to adsorb. The better removal of cationic dyes (MB and MG) compared to the anionic one (EBT) could be due to the electrostatic interactions between cationic pollutants and anionic feature of the nanocomposite membranes [K. Aruchamy, K. Dharmalingam, C. W. Lee, D. Mondal, N. Sanna Kotrappanavar, Creating ultrahigh surface area functional carbon from biomass for high performance supercapacitor and facile removal of emerging pollutants, *Chemical Engineering Journal.* 427 (2022) 131477, incorporated herein by reference in its entirety]. As the concentration of MoFe nanosheets increased further in membrane (M-0.3), the dye rejection rate decreased due to existence of non-uniform macropores which allowed dye molecules to pass through them. The dye sample flux rates for the dyes have also been presented in FIG. 13B, illustrating that M-0.2 exhibited highest flux rates (280 L/m$^2$ h, 288 L/m$^2$ h, 272 L/m$^2$ h, and 264 L/m$^2$ h, for MB, MG, EBT, and MBMGEBT, respectively) owing to improved hydrophilicity and presence of numerous voids in the membrane matrix for the dyes compared to neat PVDF flux rates (112 L/m$^2$ h, 128 L/m$^2$ h, 104 L/m$^2$ h, and 87 L/m$^2$ h for MB, MG, EBT, and MBMGEBT, respectively) and the flux rates of the other nanocomposite membranes (M-0.1 and M-0.3). As the concentration of MoFe increased beyond 0.2%, the hydrophilicity of the membrane (M-0.3) is reduced due to excessive aggregation of nanosheets into the polymeric structure, which led to declined flux rates for the dyes (264 L/m$^2$ h, 277 L/m$^2$ h, 259 L/m$^2$ h, and 254 L/m$^2$ h for MB, MG, EBT, and MBMGEBT, respectively). The UV absorbance spectral and visual findings of the dye mixture (MBMGEBT) have been demonstrated in the FIG. 13C. When the MB (bright blue), MG (bluish green), and EBT (purplish red) solutions were mixed in the ratio of 1:1:1, the resultant solution obtained was bluish-green. After the membrane filtration experiment using the M-0.2 nanocomposite membrane, a nearly transparent permeate was obtained, depicting efficient mixed dye removal (94.3%). The absorbance peak of the feed solution was observed at around 625 nm, attributing to the bluish-green region, which almost disappeared after the membrane filtration process depicting the potential of MoFe-modified nanocomposite membrane (M-0.2) as a filtration membrane for dyes. All visual interpretations were found in accordance with the dye rejection results. FIG. 13D exhibits the chemical structures of the two cationic dyes (MB, MG) and the anionic dye (EBT) used to analyze dye removal using MoFe/PVDF-based nanocomposite membranes through membrane filtration studies.

Figure 14A:
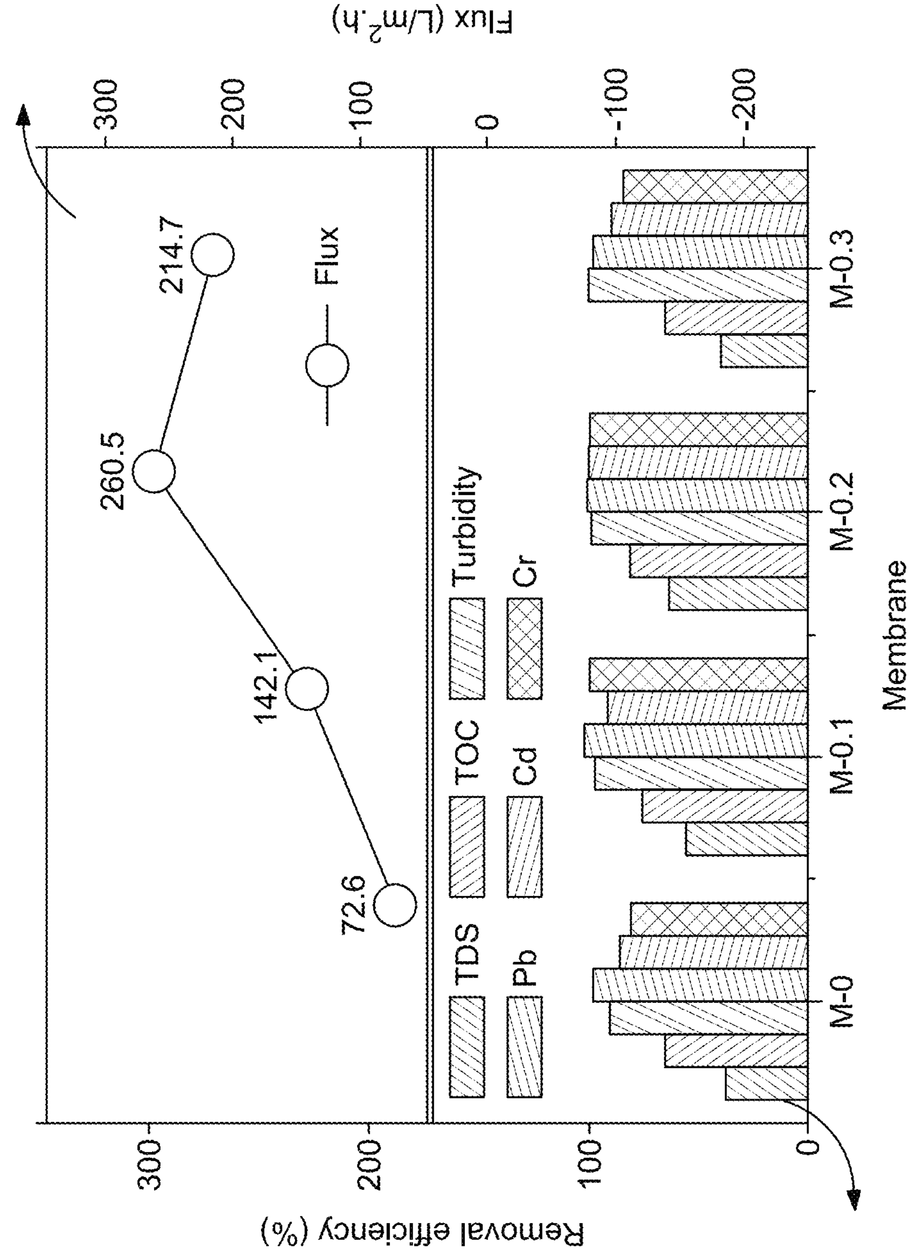
FIG. 14A shows synthetic water flux rate and rejection efficiencies for all SW pollutants against fabricated membranes (M-0, M-0.1, M-0.2, and M-0.3), according to certain embodiments.
Figure 14B:
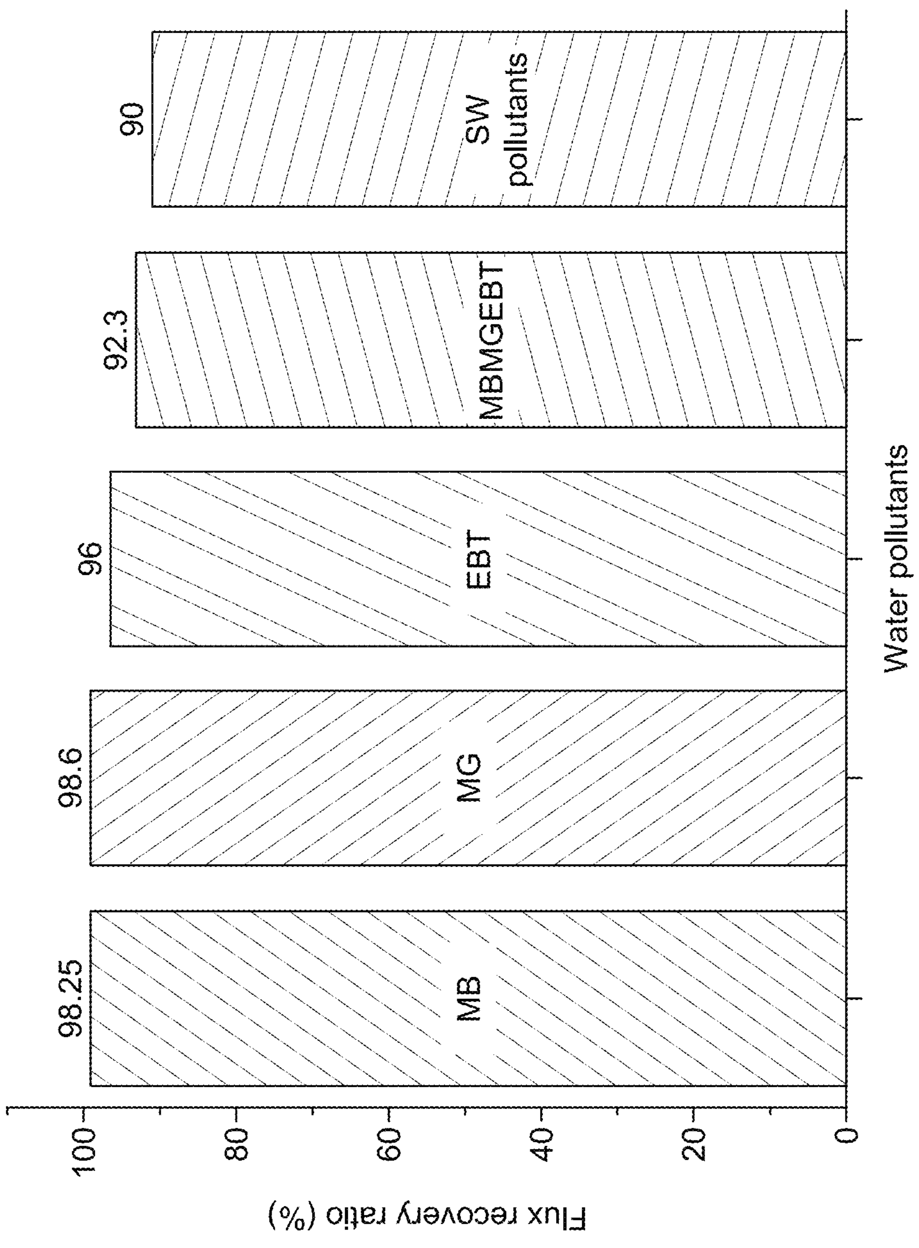
FIG. 14B shows flux recovery ratio for dyes and SW pollutants against the M-0.2 nanocomposite membrane, according to certain embodiments.
Figure 14C:
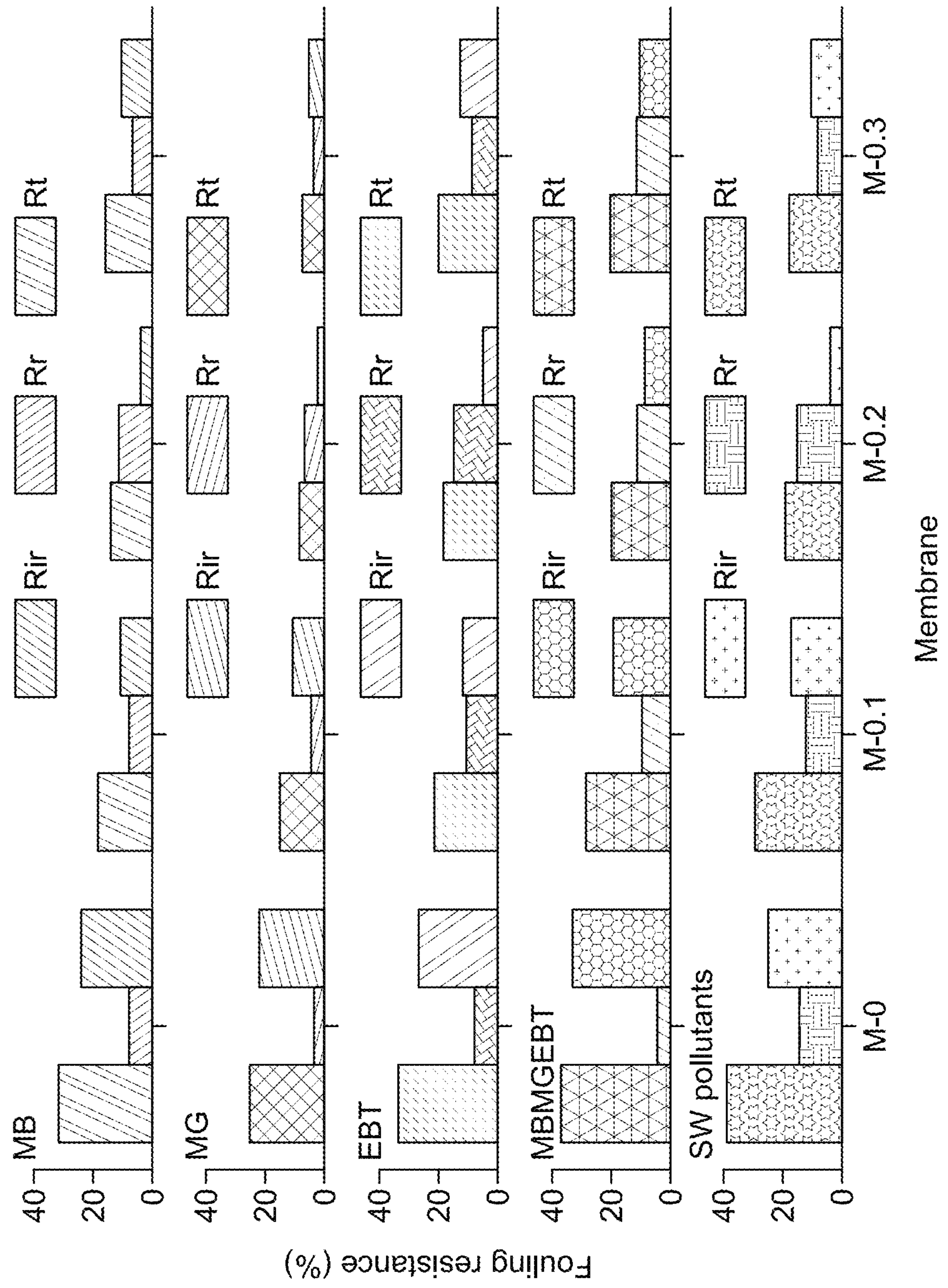
FIG. 14C shows membrane fouling resistances (%) in percentage of fabricated membranes (M-0, M-0.1, M-0.2, and M-0.3), according to certain embodiments.
Figure 14D:
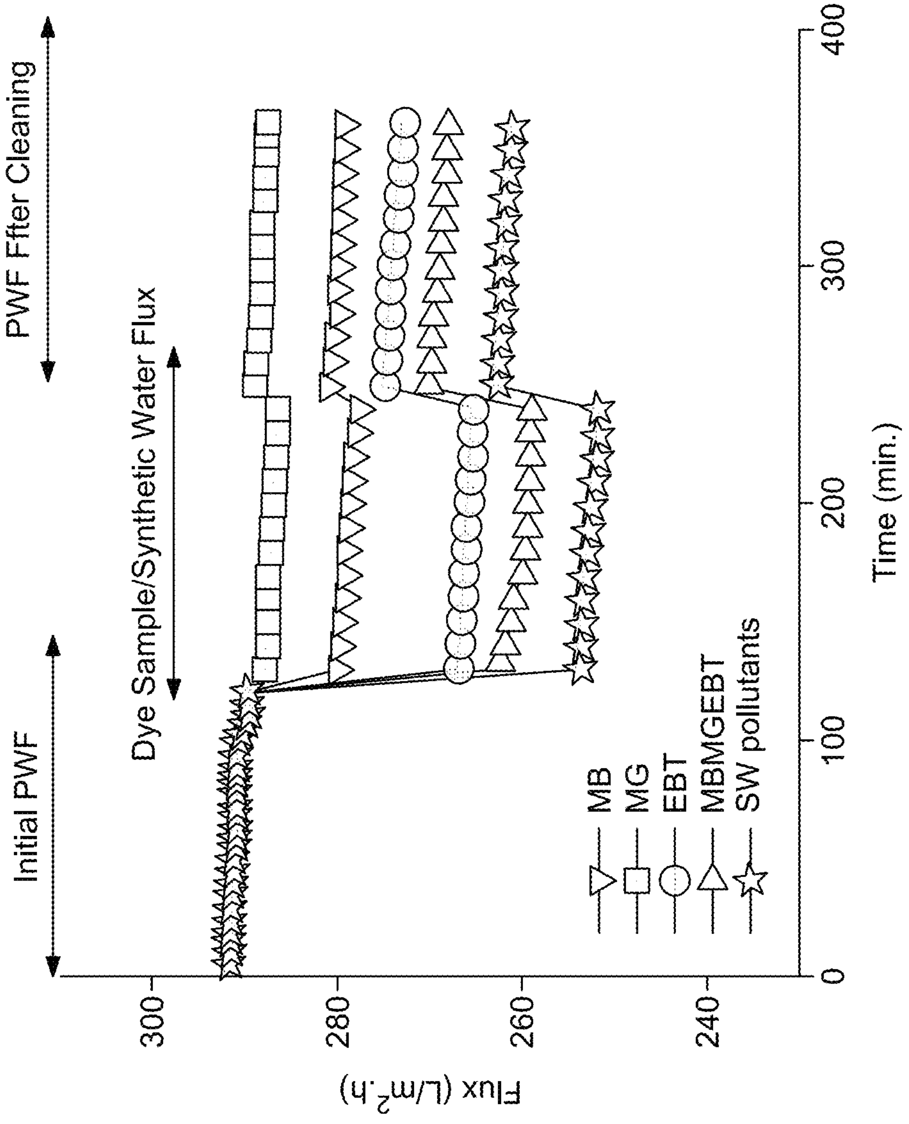
FIG. 14D shows the effect of pure water flux (PWF) and dye sample/synthetic water flux before and after the membrane filtration studies for pollutants using the M-0.2 nanocomposite membrane taken over a period of 6 hours, according to certain embodiments.

FIG. 14A presents the filtration performance of synthesized membranes against the rejection of SW pollutants along with the flux rate of synthetic water. As the synthetic water was passed through the nanocomposite membranes, besides the size exclusion mechanism, the integrated MoFe nanosheets inside the polymeric substrate enhanced the rejection of all SW pollutants by adsorbing pollutants on their active adsorption sites present within the pores of the membrane. The pollutant rejection increased with the addition of MoFe nanosheets inside the membrane matrix, owing to increased adsorption sites, and the maximum removal for the pollutants was achieved with the M-0.2 membrane, depicting 63.4%, 81.3%, and 98.7% removal for TDS, TOC, and turbidity, respectively, and 100% rejection for toxic metals (Cd, Pb, and Cr). Compared to M-0.2, the pollutant removal was quite low for the M-0 membrane (35.6%, 63.93%, 89.36%, 97.8%, 86.3%, and 79.6% removal for TDS, TOC, turbidity, Cd, Pb, and Cr, respectively). As the MoFe concentration surpassed M-0.2, the nanostructures caused the inhibition of homogeneous dispersion of nanosheets inside the M-0.3 membrane, leading to agglomeration of nanostructures, which declined the area of adsorptive sites for the rejection of pollutants. The pollutant rejection declined to 39.60%, 65.42%, 96.01%, 98.09%, 89.25%, and 83.47%, for TDS, TOC, turbidity, Cd, Pb, and Cr, respectively, using M-0.3 nanocomposite membrane. The synthetic water flux has also been exhibited in FIG. 14A, which shows that the maximum flux rate (260.5 L/m$^2$ h) was achieved using the M-0.2 membrane, which is higher than the flux rate produced by the M-0 membrane (72.6 L/m$^2$ h). The change in flux rate is due to modification of the membranes with MoFe content, which induced the hydrophilicity in the membrane. Further enhancement of MoFe content to 0.3% led to a reduced flux rate (214.7 L/m$^2$ h) due to the clogging of membrane pores with excessive MoFe nanosheets. To analyze the extent to recover the flux through M-0.2 nanocomposite membranes, the flux recovery ratio (FRR) for the pollutants was determined (FIG. 14B) by washing the M-0.2 nanocomposite membrane with DI water after filtration with the dyes and SW pollutants, which depicts the potential of M-0.2 towards the recovery of flux against the dyes and SW pollutants. The FRR (≥90%) for the pollutants indicates the strong antifouling property of the modified membrane with a long service life. To analyze the detailed fouling behavior, fouling resistant characteristics (total fouling ratio ($R_t$), irreversible fouling ratio ($R_{ir}$), and reversible fouling ratio ($R_r$)) of the membranes were determined against each pollutant and the results have been illustrated in FIG. 14C. It is evident that for the pollutants, M-0.2 exhibited lowest $R_t$ values (12.58%, 7.19%, 17.43%, 19.20%, and 19.29% for MB, MG, EBT, MBMGEBT, and SW pollutants, respectively) compared to the other fabricated membranes. The $R_t$ values determined for the M-0 membrane (35.53%, 24.4%, 32.8%, 36.60%, and 39.23% for MB, MG, EBT, MBMGEBT and SW pollutants, respectively) indicate the poor antifouling performance of pure PVDF membrane. Furthermore, M-0.2 also revealed the highest $R_r$ and lowest $R_{ir}$ values for each respective pollutant. The $R_r$ values for the M-0.2 membrane observed were 10.83%, 5.82%, 13.52%, 11.59%, and 15.43% for MB, MG, EBT, MBMGEBT, and SW pollutants, respectively, which is larger than $R_r$ values for pure PVDF membrane (3.87%, 2.79%, 7.2%, 3.57%, and 14.61% for MB, MG, EBT, MBMGEBT, and SW pollutants, respectively), depicting that the removal of pollutant concentration from the surface of M-0.2 is easier by simple hydraulic cleaning rather than the pure PVDF membrane (M-0). The parameter, $R_{ir}$ depicts that most of the attached foulants are strongly adsorbed on the membrane surface or within the membrane pores and cannot be easily removed from the membrane. The M-0.2 membrane indicated lower $R_{ir}$ values for each pollutant (1.74%, 1.36%, 3.91%, 7.6%, and 3.85%, for MB, MG, EBT, MBMGEBT, and SW pollutants, respectively) compared to the other membranes. Thus, the enhanced antifouling activity of nanocomposite membranes can be attributed to the improved hydrophilic behavior due to the nature of MoFe nanosheets, which decreased the interfacial resistance allowing the adsorbed pollutant molecules to be more easily separated by the shear force compared to those adsorbed on the pure PVDF membrane. FIG. 14D presents the long-term effect of PWF and dye sample/synthetic water flux before and after the membrane filtration for the pollutants using M-0.2 nanocomposite membrane for a period of 360 minutes. This includes 120 minutes of PWF, followed by 120 minutes of dye sample/synthetic water flux, and followed with 120 minutes of PWF after membrane washing/cleaning. FIG. 14D indicates that the dye sample flux rates were better compared to synthetic water flux, with the capability to restore flux rate after cleaning the fouled membrane with DI water. Among the dyes, MG exhibited the maximum ability to recover flux after washing the fouled membrane with DI water.

Figure 15A:
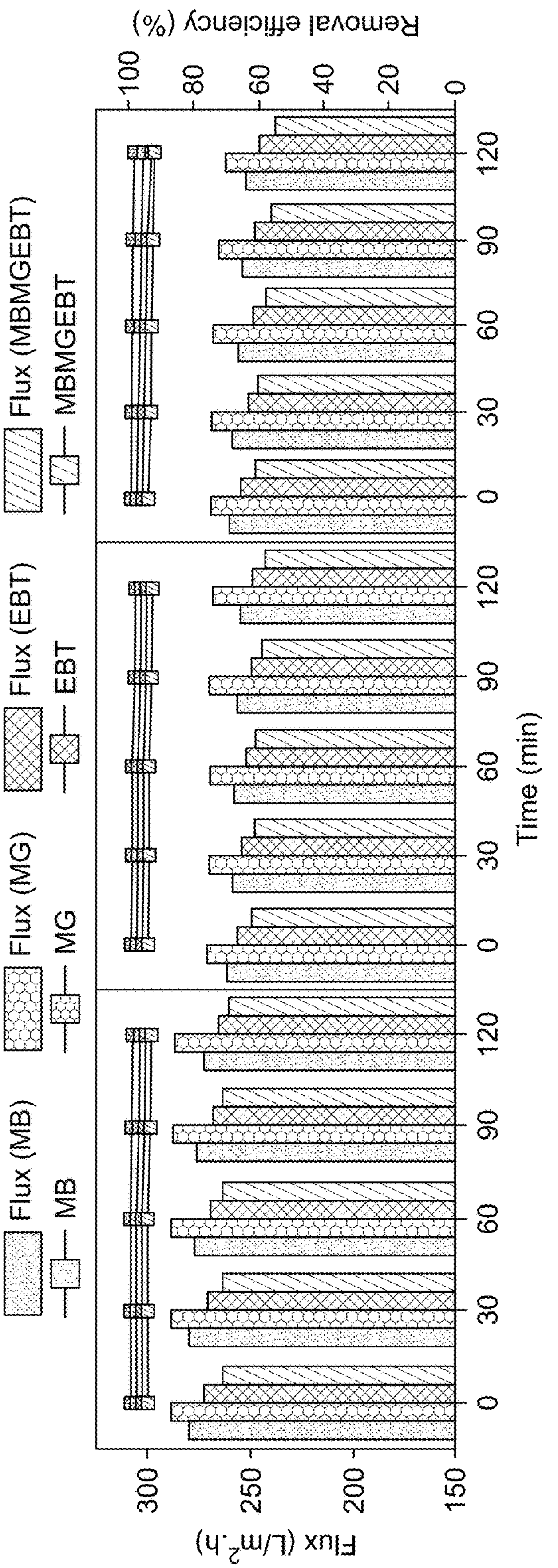
FIG. 15A shows a multi-cycle filtration performance of the M-0.2 nanocomposite membrane against pollutant rejection and permeance for the dyes (MB, MG, EBT, and MBMGEBT), according to certain embodiments.
Figure 15B:
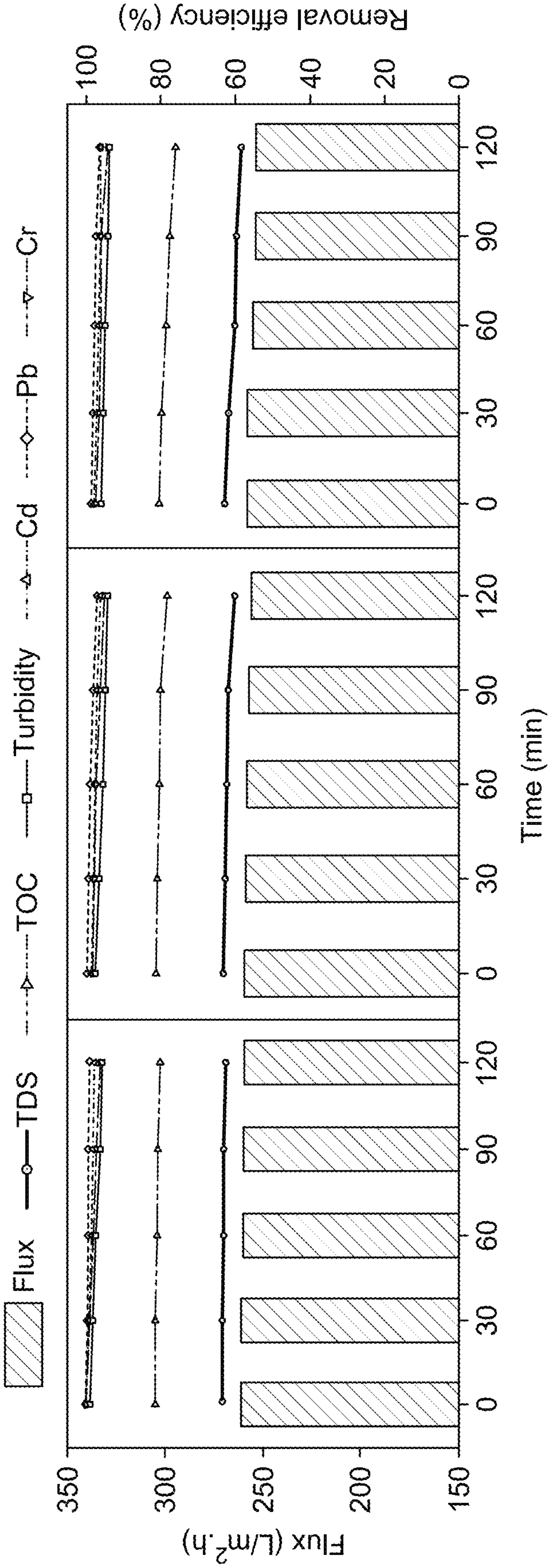
FIG. 15B shows a multi-cycle filtration performance of the M-0.2 nanocomposite membrane against pollutant rejection and permeance for the SW pollutants (TDS, TOC, turbidity, Cd, Pb, and Cr), according to certain embodiments.
Figure 15C:
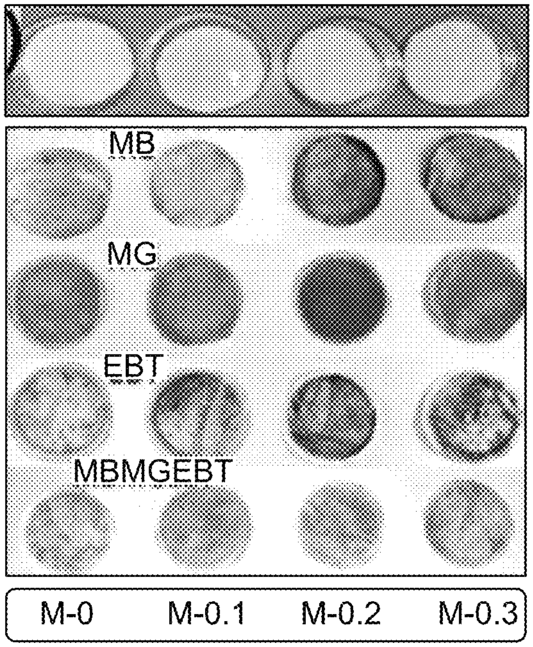
FIG. 15C shows a digital photographic representation of freshly synthesized and experimentally tested membranes for dyes, according to certain embodiments.
Figure 15D:
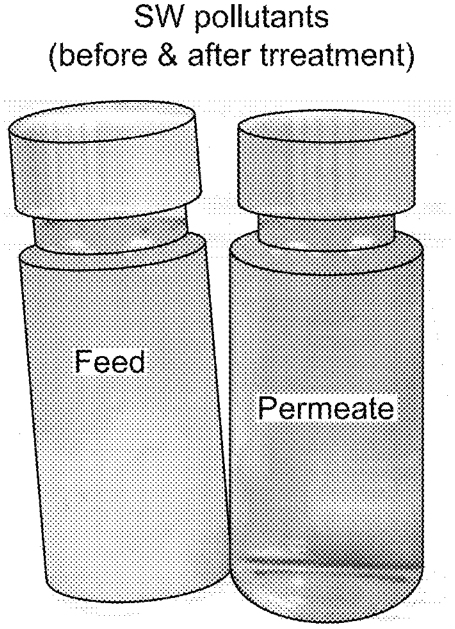
FIG. 15D shows a cloudy white feed (before filtration) and permeate (after filtration with the M-0.2 nanocomposite membrane) for the SW pollutants, according to certain embodiments.

FIG. 15A illustrates the dye sample flux rates and dye rejection rates for the dyes (MB, MG, EBT, and MBMGEBT) against the M-0.2 nanocomposite membrane for three successive cycles over a total time period of six hours (2 hours for each cycle). After 120 minutes of continuous filtration run, M-0.2 was thoroughly washed with DI water to examine the membrane reusability in terms of flux and pollutant rejection effects. During each cycle, it was observed that the dye permeance gradually declined with time due to blockage of membrane pores caused by dye molecules. The flux recovery after membrane reusability was found to be reasonable for the dyes as minor decline (around 3-5%) was observed throughout the three cycles. A flux rate decreased from 280 L/$m^2$ h to 266 L/$m^2$ h for MB, 288 L/$m^2$ h to 278 L/$m^2$ h for MG, 272 L/$m^2$ h to 258 L/$m^2$ h for EBT, and 264 L/$m^2$ h to 253 L/$m^2$ h for MBMGEBT was observed with the M-0.2 membrane. Furthermore, the rejection efficiency of the dyes throughout the continuous three cycle filtration run depicts a slight drop (around 1-3%) with the passage of time. A rejection efficiency of 97.7% to 95.6% was observed for MB, 99.2% to 98.1% for MG, 96.1% to 92.8% for EBT, and 94.3% to 92% for MBMGEBT with the M-0.2 membrane. FIG. 15B exhibits the synthetic water flux along with the pollutant rejection efficiency for the SW pollutants (TDS, TOC, turbidity, Cd, Pb, and Cr) using M-0.2 nanocomposite membrane during three continuous cycles for an overall period of six hours (2 hours for each cycle). It can be seen that the flux rate slightly declined (about 3%) throughout the period of the filtration run, from 260.5 L/$m^2$ h to 252.3 L/$m^2$ h. Additionally, the rejection of the pollutants decreased less than 8% throughout the filtration cycles (63.4% to 58.2% for TDS, 81.3% to 76% for TOC, 98% to 93.5% for turbidity, 100% to 95.7% for Cd, 100% to 96.3% for Pb, and 100% to 94.3% for Cr. FIG. 15C presents the photographic representation of freshly fabricated and experimentally tested membranes, including neat PVDF (M-0) and nanocomposite membranes (M-0.1, M-0.2, and M-0.3), against the removal of dyes (MB, MG, EBT and, MBMGEBT). It is evident that M-0.2 retained maximum dye molecules for each dye, thus revealing the best dye rejection efficiency across the tested membranes (as discussed in FIG. 13B). Furthermore, M-0.2 displayed the lowest fouling resistances and best flux recovery among the membranes (as discussed in FIG. 15B). The cloudy white feed solution (before filtration) containing SW pollutants (TDS, TOC, turbidity, Cd, Pb, and Cr) has been shown in FIG. 15D, along with the transparent permeate obtained after the filtration run using M-0.2 nanocomposite membrane, which shows good rejection of SW pollutants (as discussed in FIG. 14A).

Figure 16A:
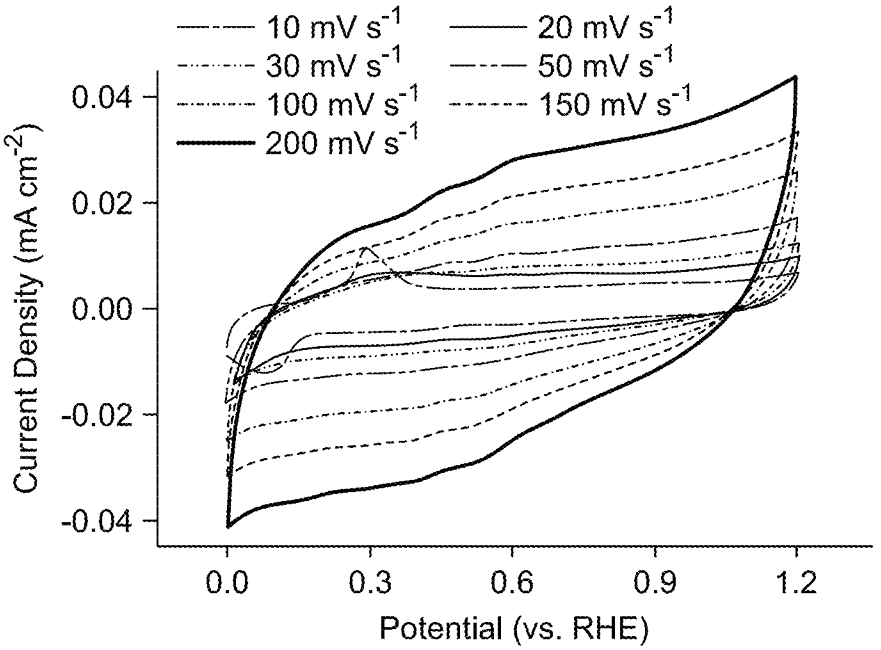
FIG. 16A shows cyclic voltammetric (CV) curves at different scan rates for MoFe paste within a potential range (0-1.2V), according to certain embodiments.
Figure 16B:
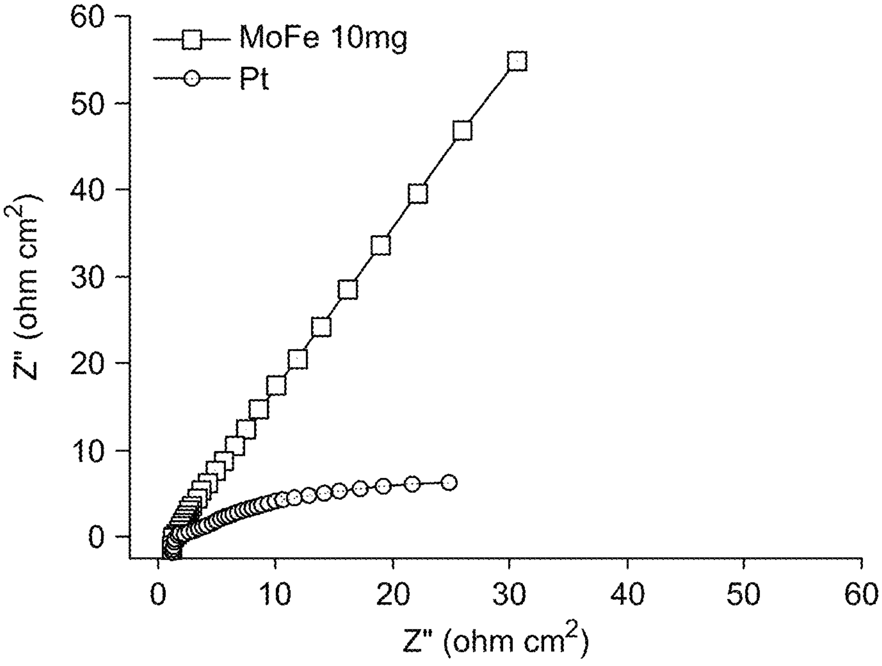
FIG. 16B shows Nyquist plots exhibiting real and imaginary impedance values for MoFe and Pt electrodes, according to certain embodiments.
Figure 16C:
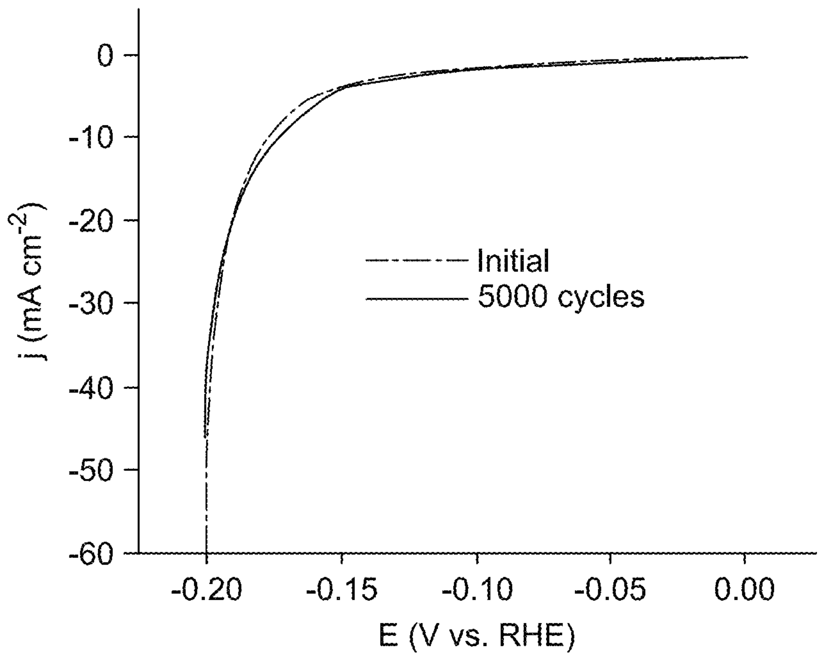
FIG. 16C shows cyclic stability of MoFe paste (before and after 5000 cycles), according to certain embodiments.
Figure 16D:
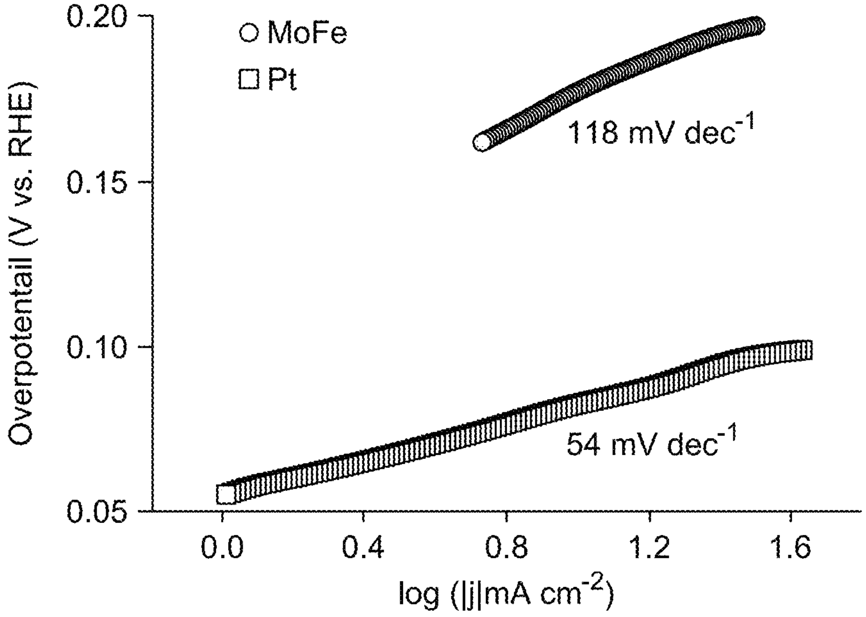
FIG. 16D shows Tafel plots of MoFe and Pt electrodes, according to certain embodiments.
Figure 16E:
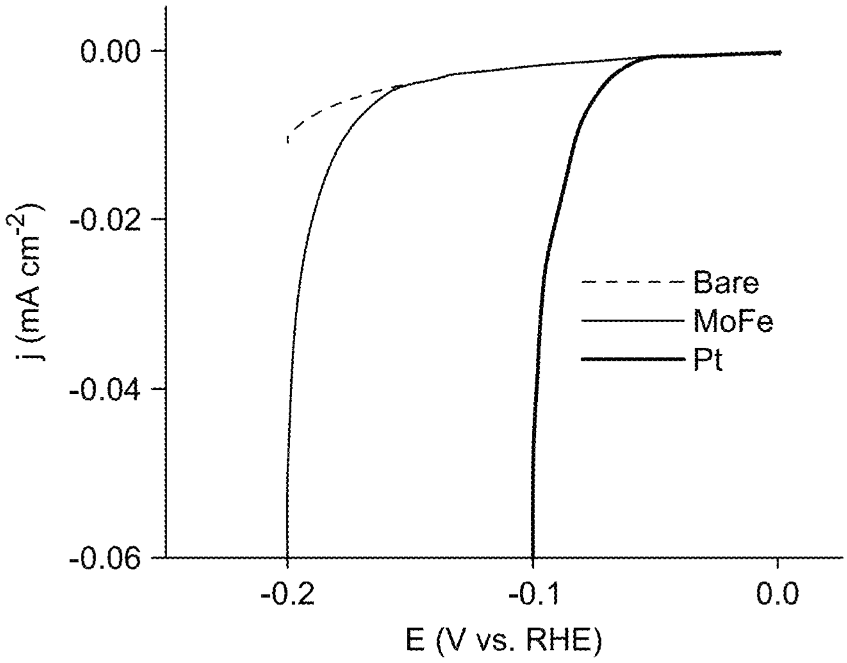
FIG. 16E shows polarization curves of bare, MoFe, and Pt electrodes depicting hydrogen evolution activity.

The electrochemically active surface area of the synthesized catalyst (MoFe paste) was determined by the double-layer capacitance ($C_{dl}$), which was determined through CV curves (FIG. 16A) at various scan rates (10 mV $s^{-1}$ to 150 mV $s^{-1}$) within a test voltage (non-faradic) range of 0 V to 1.2 V. The Cal value obtained for MoFe was 10.2 mF $cm^{-2}$. To evaluate the charge transfer resistance of hydrogen evolution reaction (HER) on MoFe and Pt electrodes, electrochemical impedance spectroscopy (EIS) was performed and Nyquist plots have been presented in FIG. 16B. Z' and Z" exhibit real and imaginary impedance, respectively. Efficient HER kinetics activity and favorable electron transport get better with the decline in the impedance of the hydrogen evolution material. The low-frequency plot (for MoFe) can be attributed to the charge transfer mechanism, whereas high frequency corresponds to the mass transfer activity of the adsorbed species at the cathode. The MoFe paste depicts the charge transfer resistance of 2.7 $\Omega cm^2$, which is similar to Pt (2.5 $\Omega cm^2$), demonstrating fast charge transfer during the HER process. FIG. 16C shows the polarization curves to assess the cyclic stability of MoFe paste before and after 5000 cycles. It is seen in the FIG. 16C that a minor deterioration in the cathodic current was noticed after 5000 cycles, verifying the stability of the catalyst in the operating conditions. A similar trend was observed when FeP/$Ni_2P$ hybrid was used as catalyst during HER depicting its outstanding stability during 5000 cycling scans [F. Yu, H. Zhou, Y. Huang, J. Sun, F, Qin, J. Bao, W. A Goddard III, S. Chen, Z. Ren, High-performance bifunctional porous non-noble metal phosphide catalyst for overall water splitting, *Nature Communications,* 9 (2018) 2551, incorporated herein by reference in its entirety] FIG. 16D represents the Tafel plot of hydrogen evolution material depicting good electrochemical kinetics for MoFe material by the slope (118 mV $dec^{-1}$), which is compared to the slope of Pt (54 mV $dec^{-1}$). FIG. 16E depicts the polarization curves of bare, MoFe, and Pt electrodes. Negligible hydrogen evolution activity was observed for the bare electrode, whereas MoFe material depicted a high overpotential with $H_2$ evolving performance that is comparable to the Pt electrode. Sandwiched nanosheets of MoFe lead to expose a larger surface area and active area, which favored the transfer of protons and electrons in the HER reaction.

Comparison of overpotential and Tafel slopes of catalysts used is hydrogen evolution reactions are presented in Table 4.

TABLE 4

Comparison of the overpotential and Tafel slope of catalysts used in hydrogen evolution reactions with the results reported in previous studies

| Catalyst | Tafel slope (mV $dec^{-1}$) | References |
|---|---|---|
| NiFe LDH | 153 | a |
| $MOS_2$/GO | 133 | b |
| CuFe | 123 | c |
| NiCo LDH | 129 | d |

TABLE 4-continued

Comparison of the overpotential and Tafel slope of catalysts used in hydrogen evolution reactions with the results reported in previous studies

| Catalyst | Tafel slope (mV $dec^{-1}$) | References |
|---|---|---|
| NiMo | 180 | e |
| This work | 118 | |

'a' refers to Ochiai, E., 2011. Chemicals for Life and Living. Springer Science & Business Media. Vancouver, Canada; 'b' refers to Ravula, S., Chi Z., Essner, J. B., Robertson, J. D., Lin, J., Baker, G. A. Ionic Liquid-Assisted Synthesis of Nanoscale $(MoS_2)_x(SnO_2)_{1-x}$ on Reduced Graphene Oxide for the Electrocatalytic Hydrogen Evolution Reaction. *ACS Appl. Mater. Interfaces.,* 2017, 9, 8065-8074; 'c' refers to Bhavanari, M., Lee, K., Tseng, C., Tang, I., Chen, H., 2021. CuFe Electrocatalyst for Hydrogen Evolution Reaction in Alkaline Electrolysis. *Int. J. Hydrog. Energy.,* 2021, 46, 35886-35895; 'd' refers to Li, D., Zhang, B., Li, Y., Chen, R., Hu, S., Ni, S. Boosting Hydrogen Evolution Activity in Alkaline Media with Dispersed Ruthenium Clusters in NiCo-Layered Double Hydroxide. *Electrochem commun.,* 2019, 101, 23-27; and 'e' refers to Videa, M., Crespo, D., Casillas, G., Zavala. G., Electrodeposition of Nickel-Molybdenum Nanoparticles for Their Use as Electrocatalyst for The Hydrogen Evolution Reaction. *J. New Mater. Electrochem. Syst.,* 2010, 13, 239-244, all of which are incorporated herein by reference in their entireties.

In summary, according to the present disclosure, molybdenum iron nanosheets and nanocompoiste membranes were synthesized. The potential of MoFe nanosheets for water treatment through membrane filtration and in hydrogen production during HER was investigated. The filtration studies demonstrated that MoFe nanosheets incorporated nanocomposite membranes operated efficiently, as the rejection efficiency for textile dyes, turbidity, TOC, TDS, and toxic metals reached values of up to 99%, 63.4%, 81.3%, 98.7%, and 100%, respectively. Flux rates of up to 280 L/$m^2$ h for dyes and 260 L/$m^2$ h for other water pollutants were seen along with low fouling issues. The long-term filtration studies exhibited stability in pollutant separation and permeance rates throughout three consecutive cycles, with only a slight drop in rejection efficiency (<8%) and flux rates (<5%) for water pollutants witnessed. In addition, the application of recycled MoFe nanocomposite membrane (used in water treatment) as an electrode during HER depicted high overpotential and $H_2$ evolution. Moreover, a stability of MoFe nanosheets was observed up to 5000 cycling scans.

Numerous modifications and variations of the present disclosure are possible in light of the above teachings. It is therefore to be understood that within the scope of the appended claims, the invention may be practiced otherwise than as specifically described herein.

The invention claimed is:

1. Molybdenum iron composition, comprising:

55 to 60 weight percent $MoFe_2$, 33 to 37 weight percent $Mo_{5.08}Fe_{7.92}$, and 5 to 10 weight percent $MoO_3$ based on a total weight of the composition, wherein the composition is in the form of nanosheets.

2. A nanocomposite membrane, comprising:

the molybdenum iron composition of claim 1 in an amount of 0.01 to 0.5% by weight uniformly distributed in a polyvinylidene fluoride polymeric matrix based on a total weight of the nanocomposite membrane.

3. The membrane of claim 2, wherein the nanosheets are formed of a plurality of overlaying layers with exposed ridges between layers.

4. The membrane of claim 3, wherein the overlapping layers have particles with a size of 0.1 to 3.0 μm on the surface.

5. The membrane of claim 2, wherein the membrane has a membrane porosity of 70 to 85% based on a ratio of a volume of pores to a total volume of the membrane.

6. The membrane of claim 2, wherein the membrane has an average pore size diameter of 0.1 to 2.0 μm.

7. The membrane of claim 2, wherein the membrane has a water contact angle of 75 to 100°.

8. A method of filtration, comprising:

contacting the membrane of claim 2 with a contaminated feed mixture, wherein the contaminated feed mixture comprises at least water and one or more pollutants, collecting a permeate passing through the membrane to obtain a purified composition having a reduced amount of the pollutants.

9. The method of claim 8, wherein the membrane has a flux rate of 140 to 300 L $m^{-2}$ $h^{-1}$.

10. The method of claim 8, wherein the membrane has a removal efficiency of total organic carbon of 50 to 85% by weight based on an initial weight of the pollutants.

11. The method of claim 8, wherein the membrane has a flux recovery ratio of 85 to 99%.

12. The method of claim 8, wherein the one or more pollutants is selected from the group consisting of methylene blue, malachite green, eriochrome black T, and a combination thereof.

13. The method of claim 12, wherein the membrane has a removal efficiency of 80 to 100% by weight based on an initial weight of the pollutants.

14. The method of claim 8, wherein the one or more pollutants is selected from the group consisting of one or more barium salts, one or more aluminum salts, one or more nickel salts, one or more copper salts, one or more chromium salts, one or more cadmium salts, one or more lead salts, one or more potassium salts, one or more zinc salts, one or more magnesium salts, one or more calcium salts, one or more sodium salts, one or more silicates, one or more acids, and a combination thereof.

15. The method of claim 14, wherein the membrane has a removal efficiency of total dissolved solids of 40 to 70% by weight based on an initial weight of the pollutants.

16. The method of claim 14, wherein the membrane has a removal efficiency of turbidity of 95 to 100% by weight based on an initial weight of the pollutants.

17. The method of claim 14, wherein the membrane has a removal efficiency of the one or more chromium salts, the one or more cadmium salts, and the one or more lead salts of 80 to 100% by weight based on an initial weight of the one or more chromium salts, the one or more cadmium salts, and the one or more lead salts.

18. A method of hydrogen evolution, comprising:

contacting an electrochemically active surface comprising the molybdenum iron composition of claim 1 with a solution comprising at least water and an electrolyte, applying a potential to the electrochemically active surface to generate a hydrogen gas.

19. The method of claim 18, wherein the electrochemically active surface area has a double-layer capacitance of 8 to 12 mF $cm^{-2}$.

20. The method of claim 18, wherein the electrochemically active surface area has a Tafel plot slope of 110 to 130 mV $dec^{-1}$.

* * * * *